US012666024B2

(12) United States Patent
Zhang et al.

(10) Patent No.: US 12,666,024 B2
(45) Date of Patent: Jun. 23, 2026

(54) SIGNALING OF QUANTIZATION PARAMETERS IN VIDEO CODING

(71) Applicants: BEIJING BYTEDANCE NETWORK TECHNOLOGY CO., LTD., Beijing (CN); Bytedance Inc., Los Angeles, CA (US)

(72) Inventors: Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 87 days.

(21) Appl. No.: 17/864,011

(22) Filed: Jul. 13, 2022

(65) Prior Publication Data

US 2023/0007256 A1     Jan. 5, 2023

Related U.S. Application Data

(63) Continuation of application No. PCT/CN2021/071659, filed on Jan. 14, 2021.

(30) Foreign Application Priority Data

Jan. 14, 2020    (WO) ................ PCT/CN2020/072105

(51) Int. Cl.
| | |
|---|---|
| *H04N 19/70* | (2014.01) |
| *H04N 19/124* | (2014.01) |

(Continued)

(52) U.S. Cl.
CPC ......... *H04N 19/124* (2014.11); *H04N 19/176* (2014.11); *H04N 19/186* (2014.11); *H04N 19/70* (2014.11)

(58) Field of Classification Search
None
See application file for complete search history.

(56) References Cited

U.S. PATENT DOCUMENTS

| | | | |
|---|---|---|---|
| 5,512,953 | A | 4/1996 | Nahumi |
| 6,016,163 | A | 1/2000 | Rodriguez |

(Continued)

FOREIGN PATENT DOCUMENTS

| | | |
|---|---|---|
| CN | 101616329 A | 12/2009 |
| CN | 104137545 A | 11/2014 |

(Continued)

OTHER PUBLICATIONS

US 11,902,518 B2, 02/2024, Zhu et al. (withdrawn)

(Continued)

*Primary Examiner* — Mohammad J Rahman
(74) *Attorney, Agent, or Firm* — Conley Rose, P.C.

(57) ABSTRACT

A method of video processing includes determining, for a current video block of a video coded using an adaptive color transform mode, whether a joint coding of chroma residuals (JCCR) coding tool is enabled for the current video block, and performing, based on the determining, a conversion between the video and a bitstream of the video, wherein the bitstream conforms to a rule, and wherein the rule specifies that one or more quantization parameter (QP) offsets used for coding the current video block are signaled when the JCCR coding tool is enabled.

18 Claims, 16 Drawing Sheets

1200

Determining, for a current video block of a video coded using an adaptive color transform mode, whether a joint coding of chroma residuals (JCCR) coding tool is enabled for the current video block — 1210

Performing, based on the determining, a conversion between the video and a bitstream of the video, the bitstream conforming to a rule that specifies that one or more quantization parameter (QP) offsets used for coding the current video block are signaled when the JCCR coding tool is enabled — 1220

(51) Int. Cl.
     *H04N 19/176*          (2014.01)
     *H04N 19/186*          (2014.01)

(56)                    References Cited

U.S. PATENT DOCUMENTS

| | | | |
|---|---|---|---|
| 6,833,993 | B2 | 12/2004 | Wang |
| 7,474,357 | B1 | 1/2009 | Murdock |
| 7,843,414 | B2 | 11/2010 | Hsu et al. |
| D661,490 | S | 6/2012 | Jin et al. |
| 8,211,570 | B2 | 7/2012 | He et al. |
| 8,252,463 | B2 | 8/2012 | He et al. |
| 8,306,124 | B2 | 11/2012 | Gao et al. |
| 8,817,208 | B2 | 8/2014 | Li et al. |
| 9,137,547 | B2 | 9/2015 | Van der Auwera |
| 9,229,877 | B2 | 1/2016 | Bivens et al. |
| 9,538,200 | B2 | 1/2017 | Van der Auwera |
| 9,591,302 | B2 | 3/2017 | Sullivan |
| 9,723,331 | B2 | 8/2017 | Van der Auwera |
| 9,734,026 | B2 | 8/2017 | Hack et al. |
| 9,807,403 | B2 | 10/2017 | Chong |
| 10,057,574 | B2 | 8/2018 | Li |
| 10,085,024 | B2 * | 9/2018 | Yu ......................... H04N 19/172 |
| 10,095,698 | B2 | 10/2018 | Cullen et al. |
| 10,097,832 | B2 * | 10/2018 | Sullivan ............... H04N 19/124 |
| 10,319,100 | B2 | 6/2019 | Dai et al. |
| 10,321,130 | B2 | 6/2019 | Dong |
| 10,506,230 | B2 | 12/2019 | Zhang |
| 10,582,213 | B2 | 3/2020 | Li |
| 10,708,591 | B2 | 7/2020 | Zhang |
| 10,708,592 | B2 | 7/2020 | Dong |
| 10,778,974 | B2 | 9/2020 | Karczewicz |
| 10,855,985 | B2 | 12/2020 | Zhang |
| 11,184,643 | B2 | 11/2021 | Kotra |
| 11,310,533 | B2 * | 4/2022 | Ray ......................... H04N 19/51 |
| 11,381,819 | B2 * | 7/2022 | Han ..................... H04N 19/463 |
| 11,539,956 | B2 * | 12/2022 | Li ......................... H04N 19/157 |
| 11,622,120 | B2 | 4/2023 | Zhu et al. |
| 11,750,806 | B2 | 9/2023 | Zhu et al. |
| 11,785,260 | B2 | 10/2023 | Zhu et al. |
| 11,863,715 | B2 | 1/2024 | Zhu et al. |
| 11,973,959 | B2 | 4/2024 | Zhu |
| 11,985,329 | B2 | 5/2024 | Zhu |
| 11,991,390 | B2 | 5/2024 | Yoo |
| 12,382,060 | B2 | 8/2025 | Zhu |
| 12,418,647 | B2 | 9/2025 | Zhu |
| 12,425,586 | B2 | 9/2025 | Zhu |
| 2002/0106025 | A1 | 8/2002 | Tsukagoshi et al. |
| 2003/0206585 | A1 | 11/2003 | Kerofsky |
| 2004/0062313 | A1 | 4/2004 | Schoenblum |
| 2004/0101059 | A1 | 5/2004 | Joch |
| 2004/0146108 | A1 | 7/2004 | Hsia |
| 2007/0098799 | A1 | 5/2007 | Zhang et al. |
| 2007/0162591 | A1 | 7/2007 | Mo et al. |
| 2007/0201564 | A1 | 8/2007 | Joch |
| 2009/0219994 | A1 | 9/2009 | Tu |
| 2009/0262798 | A1 | 10/2009 | Chiu |
| 2009/0289320 | A1 | 11/2009 | Cohen |
| 2012/0183052 | A1 | 7/2012 | Lou |
| 2012/0192051 | A1 | 7/2012 | Rothschiller |
| 2013/0016772 | A1 | 1/2013 | Matsunobu |
| 2013/0022107 | A1 | 1/2013 | Van der Auwera |
| 2013/0022113 | A1 | 1/2013 | Chen et al. |
| 2013/0077676 | A1 | 3/2013 | Sato |
| 2013/0101018 | A1 | 4/2013 | Chong |
| 2013/0101025 | A1 | 4/2013 | Van der Auwera |
| 2013/0101031 | A1 | 4/2013 | Van der Auwera |
| 2013/0107970 | A1 | 5/2013 | Wang |
| 2013/0107973 | A1 | 5/2013 | Wang |
| 2013/0188731 | A1 | 7/2013 | Kim |
| 2013/0188733 | A1 | 7/2013 | Van Der Auwera et al. |
| 2013/0259141 | A1 | 10/2013 | Van der Auwera |
| 2013/0294524 | A1 | 11/2013 | Van der Auwera |
| 2013/0329785 | A1 | 12/2013 | Lim |
| 2014/0003497 | A1 | 1/2014 | Sullivan |
| 2014/0003498 | A1 | 1/2014 | Sullivan |

| | | | |
|---|---|---|---|
| 2014/0192904 | A1 | 7/2014 | Rosewarne |
| 2014/0321529 | A1 | 10/2014 | Jung |
| 2014/0321552 | A1 | 10/2014 | He |
| 2014/0355689 | A1 | 12/2014 | Tourapis |
| 2014/0362917 | A1 | 12/2014 | Joshi |
| 2014/0376611 | A1 | 12/2014 | Kim |
| 2015/0003518 | A1 | 1/2015 | Nguyen et al. |
| 2015/0016506 | A1 | 1/2015 | Fu et al. |
| 2015/0043637 | A1 | 2/2015 | Morigami |
| 2015/0071345 | A1 | 3/2015 | Tourapis |
| 2015/0181976 | A1 | 7/2015 | Cooper |
| 2015/0264354 | A1 | 9/2015 | Zhang et al. |
| 2015/0264374 | A1 | 9/2015 | Xiu |
| 2015/0264402 | A1 | 9/2015 | Zhang |
| 2015/0319438 | A1 | 11/2015 | Shima |
| 2015/0358631 | A1 | 12/2015 | Zhang |
| 2015/0365671 | A1 | 12/2015 | Pu |
| 2015/0365695 | A1 | 12/2015 | Pu |
| 2015/0373327 | A1 | 12/2015 | Zhang |
| 2016/0065991 | A1 | 3/2016 | Chen |
| 2016/0100167 | A1 | 4/2016 | Rapaka |
| 2016/0100168 | A1 | 4/2016 | Rapaka |
| 2016/0100175 | A1 | 4/2016 | Laroche et al. |
| 2016/0179521 | A1 | 6/2016 | Jha |
| 2016/0212373 | A1 | 7/2016 | Aharon |
| 2016/0227224 | A1 | 8/2016 | Hsieh et al. |
| 2016/0241853 | A1 | 8/2016 | Lim |
| 2016/0241858 | A1 | 8/2016 | Li |
| 2016/0261864 | A1 | 9/2016 | Samuelsson |
| 2016/0261884 | A1 | 9/2016 | Li |
| 2016/0269733 | A1 | 9/2016 | Tourapis |
| 2016/0286226 | A1 | 9/2016 | Ridge |
| 2016/0286235 | A1 | 9/2016 | Yamamoto |
| 2016/0337661 | A1 | 11/2016 | Pang |
| 2016/0360198 | A1 | 12/2016 | Chang |
| 2017/0034532 | A1 | 2/2017 | Yamamoto |
| 2017/0048525 | A1 | 2/2017 | Lim |
| 2017/0070754 | A1 | 3/2017 | Lim |
| 2017/0085891 | A1 | 3/2017 | Seregin |
| 2017/0099487 | A1 | 4/2017 | Jun |
| 2017/0105014 | A1 | 4/2017 | Lee |
| 2017/0127077 | A1 | 5/2017 | Chuang |
| 2017/0127090 | A1 | 5/2017 | Rosewarne |
| 2017/0134728 | A1 | 5/2017 | Sullivan |
| 2017/0150151 | A1 | 5/2017 | Samuelsson |
| 2017/0150157 | A1 | 5/2017 | Yamori |
| 2017/0180737 | A1 | 6/2017 | Ye |
| 2017/0238020 | A1 | 8/2017 | Karczewicz |
| 2017/0310969 | A1 | 10/2017 | Chen |
| 2017/0318301 | A1 | 11/2017 | Li |
| 2017/0332075 | A1 | 11/2017 | Karczewicz |
| 2018/0027246 | A1 | 1/2018 | Liu et al. |
| 2018/0041778 | A1 | 2/2018 | Zhang |
| 2018/0041779 | A1 | 2/2018 | Zhang |
| 2018/0048901 | A1 | 2/2018 | Zhang |
| 2018/0063527 | A1 | 3/2018 | Chen |
| 2018/0084284 | A1 | 3/2018 | Rosewarne et al. |
| 2018/0091812 | A1 | 3/2018 | Guo |
| 2018/0091829 | A1 | 3/2018 | Liu |
| 2018/0109794 | A1 | 4/2018 | Wang et al. |
| 2018/0115787 | A1 | 4/2018 | Koo |
| 2018/0146197 | A1 | 5/2018 | Yi |
| 2018/0160112 | A1 | 6/2018 | Gamei |
| 2018/0199057 | A1 | 7/2018 | Chuang |
| 2018/0205949 | A1 | 7/2018 | Hsiang |
| 2018/0278934 | A1 | 9/2018 | Andersson |
| 2018/0324427 | A1 | 11/2018 | Cheong |
| 2018/0338161 | A1 | 11/2018 | Zhai |
| 2018/0352246 | A1 | 12/2018 | Laroche |
| 2018/0352264 | A1 | 12/2018 | Guo |
| 2018/0373710 | A1 | 12/2018 | Cullen et al. |
| 2019/0020875 | A1 | 1/2019 | Liu |
| 2019/0089984 | A1 | 3/2019 | He |
| 2019/0098307 | A1 | 3/2019 | Sullivan |
| 2019/0116358 | A1 | 4/2019 | Zhang |
| 2019/0124330 | A1 | 4/2019 | Chien |
| 2019/0158831 | A1 | 5/2019 | Jung et al. |
| 2019/0208206 | A1 | 7/2019 | Nakagami |
| 2019/0230353 | A1 | 7/2019 | Gadde |

(56) References Cited

U.S. PATENT DOCUMENTS

| | | | |
|---|---|---|---|
| 2019/0238845 A1 | 8/2019 | Zhang | |
| 2019/0238849 A1 | 8/2019 | Fang | |
| 2019/0273923 A1 | 9/2019 | Huang | |
| 2019/0289320 A1 | 9/2019 | Chuang et al. | |
| 2019/0306502 A1 | 10/2019 | Gadde | |
| 2020/0021845 A1 | 1/2020 | Lin | |
| 2020/0029072 A1 | 1/2020 | Xu et al. | |
| 2020/0177910 A1 | 6/2020 | Li | |
| 2020/0213570 A1 | 7/2020 | Shih | |
| 2020/0236370 A1 | 7/2020 | Galpin et al. | |
| 2020/0236381 A1 | 7/2020 | Chujoh et al. | |
| 2020/0267381 A1 | 8/2020 | Vanam | |
| 2020/0329239 A1 | 10/2020 | Hsiao | |
| 2020/0396467 A1 | 12/2020 | Lai | |
| 2020/0413038 A1 | 12/2020 | Zhang et al. | |
| 2020/0413100 A1 | 12/2020 | Hsiang et al. | |
| 2021/0006792 A1* | 1/2021 | Han | H04N 19/96 |
| 2021/0021841 A1 | 1/2021 | Xu | |
| 2021/0021863 A1 | 1/2021 | Kalva | |
| 2021/0044820 A1 | 2/2021 | Furht | |
| 2021/0051320 A1 | 2/2021 | Tourapis | |
| 2021/0058643 A1 | 2/2021 | Zhao | |
| 2021/0076032 A1 | 3/2021 | Hu | |
| 2021/0084343 A1 | 3/2021 | Ramasubramonian et al. | |
| 2021/0099727 A1 | 4/2021 | Deng et al. | |
| 2021/0099732 A1* | 4/2021 | Ray | H04N 19/70 |
| 2021/0120239 A1 | 4/2021 | Zhu | |
| 2021/0160479 A1 | 5/2021 | Hsiang | |
| 2021/0176464 A1* | 6/2021 | Ray | H04N 19/186 |
| 2021/0176479 A1 | 6/2021 | Liao | |
| 2021/0176501 A1 | 6/2021 | Chen | |
| 2021/0195201 A1 | 6/2021 | Li | |
| 2021/0195209 A1 | 6/2021 | Lim et al. | |
| 2021/0211700 A1* | 7/2021 | Li | H04N 19/70 |
| 2021/0266550 A1* | 8/2021 | Li | H04N 19/70 |
| 2021/0266552 A1 | 8/2021 | Kotra | |
| 2021/0266556 A1 | 8/2021 | Choi et al. | |
| 2021/0314628 A1 | 10/2021 | Zhang | |
| 2021/0314630 A1 | 10/2021 | Misra et al. | |
| 2021/0321095 A1 | 10/2021 | Zhang et al. | |
| 2021/0321098 A1 | 10/2021 | Chuang et al. | |
| 2021/0321121 A1 | 10/2021 | Zhang | |
| 2021/0321138 A1* | 10/2021 | Samuelsson | H04N 19/82 |
| 2021/0329233 A1 | 10/2021 | Tsai et al. | |
| 2021/0329270 A1* | 10/2021 | Yea | H04N 19/172 |
| 2021/0337239 A1 | 10/2021 | Zhang | |
| 2021/0344903 A1 | 11/2021 | Yu et al. | |
| 2021/0368171 A1 | 11/2021 | Zhang | |
| 2021/0377524 A1 | 12/2021 | Zhang | |
| 2021/0385446 A1 | 12/2021 | Liu | |
| 2021/0385454 A1 | 12/2021 | Fleureau | |
| 2021/0385459 A1* | 12/2021 | Zhu | H04N 19/70 |
| 2021/0392381 A1 | 12/2021 | Wang | |
| 2021/0409701 A1 | 12/2021 | Zhu | |
| 2022/0014782 A1 | 1/2022 | Chon | |
| 2022/0038687 A1* | 2/2022 | Zhu | H04N 19/11 |
| 2022/0038693 A1* | 2/2022 | Zhang | H04N 19/176 |
| 2022/0070460 A1* | 3/2022 | Ikonin | H04N 19/126 |
| 2022/0078433 A1 | 3/2022 | Yoo et al. | |
| 2022/0141495 A1 | 5/2022 | Kim | |
| 2022/0159282 A1 | 5/2022 | Sim | |
| 2022/0182641 A1 | 6/2022 | Nam | |
| 2022/0191496 A1 | 6/2022 | Kotra | |
| 2022/0201294 A1 | 6/2022 | Nam | |
| 2022/0210408 A1 | 6/2022 | Zhu | |
| 2022/0210433 A1 | 6/2022 | Zhu et al. | |
| 2022/0210448 A1 | 6/2022 | Zhu | |
| 2022/0217410 A1 | 7/2022 | Wang | |
| 2022/0264122 A1 | 8/2022 | Zhu | |
| 2022/0272347 A1 | 8/2022 | Zhu | |
| 2022/0295091 A1 | 9/2022 | Chujoh | |
| 2022/0303567 A1 | 9/2022 | Jung | |
| 2022/0312042 A1* | 9/2022 | Deshpande | H04N 19/44 |
| 2022/0321916 A1 | 10/2022 | Zhu | |
| 2022/0329794 A1 | 10/2022 | Kotra | |
| 2022/0337836 A1 | 10/2022 | Zhao | |
| 2022/0345697 A1 | 10/2022 | Choi | |
| 2022/0345726 A1 | 10/2022 | Zhao et al. | |
| 2022/0353537 A1 | 11/2022 | Deshpande | |
| 2022/0368898 A1 | 11/2022 | Zhu et al. | |
| 2023/0007255 A1 | 1/2023 | Tsukuba | |
| 2023/0018055 A1 | 1/2023 | Hendry | |
| 2023/0040376 A1* | 2/2023 | Samuelsson | H04N 19/70 |
| 2023/0068404 A1* | 3/2023 | Deshpande | H04N 19/172 |
| 2023/0085937 A1* | 3/2023 | Deshpande | H04N 19/70 |
| 2023/0118055 A1 | 4/2023 | Kamei | |
| 2023/0130131 A1* | 4/2023 | Chiang | H04N 19/157 375/240.18 |
| 2023/0156194 A1 | 5/2023 | Sullivan | |
| 2024/0048733 A1* | 2/2024 | Zhao | H04N 19/184 |
| 2024/0064315 A1 | 2/2024 | Zhu et al. | |
| 2024/0098259 A1* | 3/2024 | Misra | H04N 19/70 |

FOREIGN PATENT DOCUMENTS

| | | | |
|---|---|---|---|
| CN | 104205836 A | 12/2014 | |
| CN | 104221376 A | 12/2014 | |
| CN | 104221378 A | 12/2014 | |
| CN | 104427339 A | 3/2015 | |
| CN | 104584559 A | 4/2015 | |
| CN | 104584560 A | 4/2015 | |
| CN | 104782125 A | 7/2015 | |
| CN | 105359521 A | 2/2016 | |
| CN | 105472388 A | 4/2016 | |
| CN | 105960802 A | 9/2016 | |
| CN | 105979271 A | 9/2016 | |
| CN | 106105202 A | 11/2016 | |
| CN | 106105203 A | 11/2016 | |
| CN | 106105205 A | 11/2016 | |
| CN | 106162186 A | 11/2016 | |
| CN | 106233726 A | 12/2016 | |
| CN | 106331709 A | 1/2017 | |
| CN | 106416249 A | 2/2017 | |
| CN | 106464881 A | 2/2017 | |
| CN | 106464885 A | 2/2017 | |
| CN | 106797465 A | 5/2017 | |
| CN | 107079150 A | 8/2017 | |
| CN | 107079157 A | 8/2017 | |
| CN | 107079164 A | 8/2017 | |
| CN | 107211122 A | 9/2017 | |
| CN | 107409215 A | 11/2017 | |
| CN | 107431826 A | 12/2017 | |
| CN | 107534782 A | 1/2018 | |
| CN | 107534783 A | 1/2018 | |
| CN | 107846591 A | 3/2018 | |
| CN | 108012152 A | 5/2018 | |
| CN | 108293124 A | 7/2018 | |
| CN | 109076210 A | 12/2018 | |
| CN | 109196862 A | 1/2019 | |
| CN | 109691102 A | 4/2019 | |
| CN | 110121884 A | 8/2019 | |
| CN | 110447225 A | 11/2019 | |
| CN | 114946180 B | 8/2022 | |
| CN | 114946187 A | 8/2022 | |
| CN | 114402611 B | 3/2025 | |
| CN | 114946185 B | 3/2025 | |
| CN | 114651442 B | 6/2025 | |
| CN | 114788279 B | 6/2025 | |
| CN | 114930818 B | 6/2025 | |
| CN | 114402609 B | 7/2025 | |
| EP | 3104606 A1 | 12/2016 | |
| EP | B425911 F | 1/2019 | |
| EP | 3507984 A1 | 7/2019 | |
| GB | 2506852 A | 4/2014 | |
| GB | 2506852 B | 9/2015 | |
| GB | 2575090 A | 1/2020 | |
| IN | 554029 | 11/2024 | |
| IN | 561019 | 2/2025 | |
| JP | 2015512600 A | 4/2015 | |
| JP | 2017536730 A | 12/2017 | |
| JP | 2019525679 A | 9/2019 | |
| JP | 2020017970 A | 1/2020 | |
| JP | 2022542851 A | 10/2022 | |
| JP | 2022544164 A | 10/2022 | |

(56) References Cited

FOREIGN PATENT DOCUMENTS

| JP | 2023011955 A | 1/2023 |
| JP | 2023500644 A | 1/2023 |
| JP | 7508558 B2 | 7/2024 |
| JP | 7622153 B2 | 1/2025 |
| JP | 7639106 B2 | 3/2025 |
| JP | 7662142 B2 | 4/2025 |
| KR | 20040052150 A | 6/2004 |
| KR | 1020150003246 A | 1/2015 |
| KR | 102750625 B1 | 1/2025 |
| RU | 2636103 C2 | 11/2017 |
| TW | 201424378 A | 6/2014 |
| WO | 2008016219 A1 | 2/2008 |
| WO | 2012117744 A1 | 9/2012 |
| WO | 2012177202 A1 | 12/2012 |
| WO | 2014008212 A1 | 1/2014 |
| WO | 2014039547 A1 | 3/2014 |
| WO | 2014205561 A1 | 12/2014 |
| WO | 2015015058 A1 | 2/2015 |
| WO | 2015053697 A1 | 4/2015 |
| WO | 2015187978 A1 | 12/2015 |
| WO | 2016040865 A1 | 3/2016 |
| WO | 2016048186 A1 | 3/2016 |
| WO | 2016049894 A1 | 4/2016 |
| WO | 2016057665 A1 | 4/2016 |
| WO | 2016123232 A1 | 8/2016 |
| WO | 2017052440 A1 | 3/2017 |
| WO | 2018171751 A1 | 9/2018 |
| WO | 2018234716 A1 | 12/2018 |
| WO | 2018237146 A1 | 12/2018 |
| WO | 2019009776 A1 | 1/2019 |
| WO | 2019069950 A1 | 4/2019 |
| WO | 2019147910 A1 | 8/2019 |
| WO | 2019173522 A1 | 9/2019 |
| WO | 2020243206 A1 | 12/2020 |

OTHER PUBLICATIONS

US 12,244,819 B2, 03/2025, Zhu (withdrawn)
Document: JVET-Q0241-v3, Jung, J., et al., "On QP adjustment in adaptive color transform," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Notice of Allowance dated Aug. 10, 2023, 14 pages, U.S. Appl. No. 17/842,025, filed Jun. 16, 2022.
Notice of Allowance dated Jul. 6, 2023, 9 pages, U.S. Appl. No. 17/857,874, filed Jul. 5, 2022.
Document: JVET-P2001-vE, Bross, B., et al., "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Suehring, K., et al., Retrieved from the Internet: https://vcgit.hhi.fraunhofer.de/jvet/VVCSoftware_VTM/tags/VTM-7.0, Sep. 25, 2022, 2 pages.
Document: JVET-M0413, Said, A., et al., "CE5: Per-context CABAC initialization with single window (Test 5.1.4)," Joint Video Experts Team (JVET) of ITU-T SG 16 WP 3 and ISO/IEC JTC 1/SC 29/WG 11 13th Meeting: Marrakech, MA, Jan. 9-18, 2019, 3 pages.
"Series H: Audiovisual and Multimedia Systems Infrastructure of audiovisual services—Coding of moving video High efficiency video coding," ITU-T and ISO/IEC, "High efficiency video coding", Rec. ITU-T H.265 | ISO/IEC 23008-2, Feb. 2018, 692 pages.
Document: JCTVC-Y1002, Rosewarne, C., et al., "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG11 25th Meeting: Chengdu, CN, Oct. 14-21, 2016, 70 pages.
Document: JVET-G1001, Chen, J., et al., "Algorithm description of JointExploration Test Model 7 (JEM7)," Joint Video Exploration Team (JVET) of ITU-T SG 16 WP 3 and ISO/IEC JTC 1/SC 29/WG 11 7th Meeting: Torino, IT, Jul. 13-21, 2017, 50 pages.

JEM-7.0 Retrieved from the internet: https://jvet.hhi.fraunhofer.de/svn/svn_HMJEMSoftware/tags/ HM-16.6-JEM-7.0. Sep. 19, 2022, 1 page.
Document: JVET-O2001, Bross, B., et al., "Versatile Video Coding (Draft 6)", Joint Video Experts Team (JVET) of ITU-T SG 16 WP 3 and ISO/IEC JTC 1/SC 29/WG 11 15th Meeting: Gothenburg, SE, Jul. 3-12, 2019, 455 pages.
Document: JVET-Q0041-v2, Wang, Y.K., et al. "AHG2: Editorial input on VVC draft text," Joint Video Experts Team (JVET) of ITU-T SG 16 WP 3 and ISO/IEC JTC 1/SC 29/WG 11 17th Meeting: Brussels, BE, Jan. 7-17, 2020, 2 pages.
Document: JVET-Q0513_r2, Xiu, X., et al., "AHG 16: Clipping residual samples for ACT," Joint Video Experts Team (JVET) of ITU-T SG 16 WP 3 and ISO/IEC JTC 1/SC 29/WG 11 17th Meeting: Brussels, BE, Jan. 7-17, 2020, 11 pages.
Document: JVET-Q0820-v3, Lagrange P., et al., "ACT: common text for bug fixes and transform change," Joint Video Experts Team (JVET) of ITU-T SG 16 WP 3 and ISO/IEC JTC 1/SC 29/WG 11 17th Meeting: Brussels, BE, Jan. 7-17, 2020, 7 pages.
Document: JVET-Q0521-V1, Zhu, et al., "Alignment of BDPCM for ACT," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-P0517-R1, Xiu, X., et al., "Support of adaptive color transform for 444 video coding in VVC," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JVET-O0166, Clare, G., et al., "CE8-related: BDPCM for chroma," Joint Video Experts Team (JVET) of ITU-T SG 16 WP 3 and ISO/IEC JTC 1/SC 29/WG 11 15th Meeting: Gothenburg, SE, Jul. 3-12, 2019, 5 pages.
Document: JVET-L0553, Li, X., et al., "Fix of Initial QP Signaling," Joint Video Experts Team (JVET) of ITU-T SG 16 WP 3 and ISO/IEC JTC 1/SC 29/WG 11 12th Meeting: Macao, CN, Oct. 3-12, 2018, 2 pages.
Document: JVET-N0368, Zhao, X., et al., "An implementation of adaptive color transform in VVC, "Joint Video Experts Team (JVET) of ITU-T SG 16 WP 3 and ISO/IEC JTC 1/SC 29/WG 11 14th Meeting: Geneva, CH, Mar. 19-27, 2019, 3 pages.
Document: JVET-R0058-v5, Wang, Y-K., et al., "AHG8/AHG9/AHG12: On the combination of RPR, subpictures, and scalability," Joint Video Experts Team (JVET) of ITU-T SG 16 WP 3 and ISO/IEC JTC 1/SC 29/WG 11 18th Meeting: by teleconference, Apr. 15-24, 2020, 10 pages.
Document: JVET-S0105 McCarthy, S., et al., "AHG9: Modification of general constraint information," Joint Video Experts Team (JVET) of ITU-T SG 16 WP 3 and ISO/IEC JTC 1/SC 29/WG 11 19th Meeting: by teleconference, Jun. 22-Jul. 1, 2020, 16 pages.
Document: JVET-Q0423-V1, Li, L., et al., "Interaction between ACT and BDPCM chroma," Joint Video Experts Team (JVET) of ITU-T SG 16 WP 3 and ISO/[EC JTC 1/SC 29/WG 11 17th Meeting: Brussels, BE, Jan. 7-17, 2020, 3 pages.
Document: JVET-QO520-v1, Wang, Y., et al., "AHG9: Cleanups on signaling for CC-ALF, BDPCM, ACT and Palette," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-P0436, Zhao, J., et al., "AHG15: On CU Adaptive Chroma QP Offset Signalling," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-Q0305-v2, Dou, L., et al., "Disallowing JCCR mode for ACT coded CUs," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.
Document: JVET-P2002, Chen, J., et al., "Algorithm description for Versatile Video Coding and Test Model 7 (VTM 7)," Joint Video Experts Team (JVET) of ITU-T SG 16 WP 3 and ISO/IEC JTC 1/SC 29/WG 11 16th Meeting: Geneva, CH, Oct. 1-11, 2019, 90 pages.
Document: JVET-Q0420-V1, Li, L., et al., "AHG12: Signaling of chroma presence in PPS and APS," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.

(56)          References Cited

OTHER PUBLICATIONS

Document: JVET-Q0815, Zhang, L., et al., "BoG on ACT," Joint Video Experts Team (JVET) of ITU-T SG 16 WP 3 and ISO/[EC JTC 1/SC 29/WG 11 17th Meeting: Brussels, BE, Jan. 7-17, 2020, 3 pages.
Document: JVET-P1001, Kotra, A., et al., "Non-CE5: Chroma QP derivation fix for deblocking filter (Combination of JVET-P0105 and JVET-P0539)," Joint Video Experts Team (JVET) of ITU-T SG 16 WP 3 and ISO/IEC JTC 1/SC 29/WG 11 16th Meeting: Geneva, CH, Oct. 1-11, 2019, 7 pages.
Document: JVET-Q0114-v1, Wang, Y., "AHG9: A few more general contraints flags," Joint Video Experts Team (JVET) of ITU-T SG 16 WP 3 and ISO/IEC JTC 1/SC 29/WG 11, 17th Meeting: Brussels, BE, Jan. 7-17, 2020, 3 pages.
Document: JVET-R0286, Chang, Y., et al., "AhG9: On general contraint information syntax," Joint Video Experts Team (JVET) of ITU-T SG 16 WP 3 and ISO/IEC JTC 1/SC 29/WG 11, 18th Meeting: by teleconference, Apr. 15-24, 2020, 5 pages.
Final Office Action dated Jan. 13, 2023, 23 pages, U.S. Appl. No. 17/842,025, filed Jun. 16, 2022.
Foreign Communication From a Related Counterpart Application, European Application No. 21736195.5, Extended European Search Report dated Mar. 15, 2023, 14 pages.
Notice of Allowance dated Jan. 26, 2023, 23 pages, U.S. Appl. No. 17/857,874, filed Jul. 5, 2022.
Non-Final Office Action dated Feb. 3, 2023, 23 pages, U.S. Appl. No. 17/857,924, filed Jul. 5, 2022.
Foreign Communication From a Related Counterpart Application, International Application No. PCT/CN2020/137941, English Translation of International Search Report dated Mar. 22, 2021, 10 pages.
Foreign Communication From a Related Counterpart Application, International Application No. PCT/CN2020/137946, English Translation of International Search Report dated Mar. 22, 2021, 9 pages.
Foreign Communication From a Related Counterpart Application, International Application No. PCT/CN2021/070265, English Translation of International Search Report dated Mar. 26, 2021, 14 pages.
Foreign Communication From a Related Counterpart Application, International Application No. PCT/CN2021/070279, English Translation of International Search Report dated Apr. 1, 2021, 11 pages.
Foreign Communication From a Related Counterpart Application, International Application No. PCT/CN2021/070282, English Translation of International Search Report dated Mar. 23, 2021, 13 pages.
Foreign Communication From a Related Counterpart Application, International Application No. PCT/CN2021/070580, English Translation of International Search Report dated Mar. 22, 2021, 12 pages.
Foreign Communication From a Related Counterpart Application, International Application No. PCT/CN2021/071659, English Translation of International Search Report dated Apr. 6, 2021, 14 pages.
Foreign Communication From a Related Counterpart Application, International Application No. PCT/CN2021/071660, English Translation of International Search Report dated Mar. 31, 2021, 11 pages.
Foreign Communication From a Related Counterpart Application, International Application No. PCT/CN2021/072017, English Translation of International Search Report dated Apr. 19, 2021, 14 pages.
Foreign Communication From a Related Counterpart Application, International Application No. PCT/CN2021/072396, English Translation of International Search Report dated Mar. 29, 2021, 14 pages.
Office Action dated Sep. 13, 2022, 11 pages, U.S. Appl. No. 17/842,025, filed Jun. 16, 2022.
Vietnamese Office Action from Vietnamese Patent Application No. 1-2022-01641 dated Aug. 30, 2024, 4 pages.
Non-Final Office Action from U.S. Appl. No. 17/810,187 dated Aug. 1, 2024, 34 pages.
Non-Final Office Action from U.S. Appl. No. 17/856,631 dated Sep. 26, 2024, 26 pages.
Non-Final Office Action from U.S. Appl. No. 18/498,665 dated Sep. 26, 2024, 106 pages.
Non-Final Office Action from U.S. Appl. No. 18/519,994 dated Aug. 14, 2024, 125 pages.

Non-Final Office Action from U.S. Appl. No. 17/864,011 dated Apr. 25, 2024, 38 pages.
Non-Final Office Action from U.S. Appl. No. 18/524,994 dated Jun. 21, 2024, 56 pages.
Final Office Action from U.S. Appl. No. 17/856,631 dated Jun. 4, 2024, 45 pages.
International Search Report and Written Opinion from International Patent Application No. PCT/US2020/055332 dated Jan. 29, 2021 (9 pages).
International Search Report and Written Opinion from International Patent Application No. PCT/US2020/063746 dated Apr. 8, 2021 (14 pages).
International Search Report and Written Opinion from International Patent Application No. PCT/US2020/067264 dated Mar. 23, 2021 (11 pages).
International Search Report and Written Opinion from International Patent Application No. PCT/US2020/067651 dated Mar. 30, 2021 (10 pages).
International Search Report and Written Opinion from International Patent Application No. PCT/US2020/067655 dated Mar. 30, 2021 (10 pages).
Non-Final Office Action from U.S. Appl. No. 17/694,305 dated Jun. 9, 2022, 8 pages.
Extended European Search Report from European Patent Application No. 20862153.2 dated Oct. 5, 2022 (12 pages).
Extended European Search Report from European Patent Application No. 20876422.5 dated Oct. 20, 2022 (7 pages).
Partial Supplementary European Search Report from European Patent Application No. 20877874.6 dated Oct. 31, 2022 (15 pages).
Non Final Office Action from U.S. Appl. No. 17/856,631 dated Nov. 10, 2022, 28 pages.
Non Final Office Action from U.S. Appl. No. 17/852,934 dated Jan. 12, 2023, 37 pages.
Extended European Search Report from European Patent Application No. 20899673.6 dated Dec. 15, 2022 (10 pages).
Non Final Office Action from US Patent Application No. 17/810, 187 dated Jan. 9, 2023, 33 pages.
Extended European Search Report from European Application No. 20909161.0 dated Feb. 7, 2023, 10 pages.
Extended European Search Report from European Application No. 20877874.6 dated Feb. 10, 2023, 17 pages.
Chinese Office Action from Chinese Application No. 202080088208.7 dated May 31, 2024, 17 pages. With English Translation.
Japanese Office Action from Japanese Application No. 2022-540684 dated Aug. 22, 2023, 18 pages. With English Translation.
Japanese Notice of Allowance from Japanese Application No. 2022-540684 dated Jan. 30, 2024, 6 pages. With English Translation.
Non Final Office Action from U.S. Appl. No. 17/835,647 dated Aug. 17, 2022, 11 pages.
Japanese Office Action from Japanese Application No. 2022-534625 dated May 16, 2023, 27 pages. With English Translation.
Chinese Notice of Allowance from Chinese Application No. 202080072432.7 dated Mar. 30, 2023, 62 pages. With English Translation.
Chinese Notice of Allowance from Chinese Application No. 202080072432.7 dated Oct. 28, 2023, 6 pages. With English Translation.
Chinese Office Action from Chinese Application No. 202080072268.X dated Mar. 30, 2023, 48 pages. With English Translation.
Chinese Office Action from Chinese Application No. 202080072268.X dated Oct. 31, 2023, 7 pages. With English Translation.
Non Final Office Action from U.S. Appl. No. 17/716,447 dated Aug. 4, 2022, 27 pages.
International Search Report and Written Opinion from International Patent Application No. PCT/US2020/51689 dated Dec. 17, 2020 (9 pages).
Chinese Office Action from Chinese Application No. 202080066216.1 dated Jun. 29, 2023, 17 pages. With English Translation.
Non Final Office Action from U.S. Appl. No. 17/720,634 dated Jul. 19, 2022, 25 pages.
Final Office Action from U.S. Appl. No. 17/694,305 dated Sep. 30, 2022, 31 pages.

(56) References Cited

OTHER PUBLICATIONS

International Search Report and Written Opinion from International Patent Application No. PCT/US2020/050644 dated Dec. 18, 2020 (9 pages).
Non-Final Office Action from U.S. Appl. No. 17/694,253 dated Jul. 12, 2022, 43 pages.
Russian Office Action from Russian Application No. 2022108234 dated Dec. 19, 2023, 11 pages. With English Translation.
Japanese Office Action from Japanese Application No. 2022-515999 dated Feb. 21, 2023, 10 pages. With English Translation.
Indian Office Action from Indian Application No. 202247013800 dated Jul. 21, 2022, 7 pages.
Abdoli et al. "Intra Block-DPCM with Layer Separation of Screen Content in VVC," 2019 IEEE International Conference on Image Processing (ICIP), IEEE, 2019, Sep. 25, 2019, retrieved on Feb. 21, 2021 from https://ieeexplore.ieee.org/abstract/Document/8803389.
Document: JVET-P2001-vE, "Versatile Video Coding (Draft 7)," Joint Video Experts Team (JVET) of ITU-T SG 16 WP 3 and ISO/IEC JTC 1/SC 29/WG 11 16th Meeting: Geneva, CH, Oct. 1-11, 2019, 491 pages.
Gao et al. "AVS—The Chinese Next-Generation Video Coding Standard," National Association Broadcasters, 2004, retrieved on Dec. 16, 2020 from http://www.avs.org.cn/reference/AVS%20NAB%Paper%20Final03.pdf.
Gordon et al. "Mismatch on BDPCM Luma/Chroma Contect Indices Between VTM7 and Spec," in Fraunhofer.de [online] Nov. 14, 2019, retrieved Mar. 1, 2021, retrieved from the internet URL: https://jvet.hhi.fraunhofer.de/trac/vvc/ticket/708.
"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.
Marpe et al. "An Adaptive Color Transform Approach and its Application in 4:4:4 Video Coding," 2006 14th European Signal Processing Conference, IEEE, 2006, Sep. 8, 2006, retrieved on Feb. 21, 2021 from https://ieeexplore.ieee.org/abstract/Document/7071266.
Misra et al. "On Cross Component Adaptive Loop Filter for Video Compression," 2019 Picture Coding Symposium (PCS), Nov. 12-15, 2019, Ningbo, China, retrieved from the internet URL:https://ieeexplore.ieee.org/Document/8954547.
Document JVET-Q0058, Misra et al. "CE5 Common Base: Cross Component Adaptive Loop Filter," Joint Video Experts Team (JVET) of ITU-T SG 16 WP 3 and ISO/IEC JTC 1/SC 29/WG 11 17th Meeting: Brussels, BE, Jan. 7-17, 2020, Document JVET-Q0058, 2020.
Norkin et al. "HEVC Deblocking Filter," IEEE Transactions on Circuits and Systems for Video Technology, Dec. 2012, 22(12):1746-1754.
JVET-O0650-v4, Ramasubramonian et al. "AHG15: On Signalling of Chroma QP Tables," Joint Video Experts Team (JVET) of ITU-T SG 16 WP 3 and ISO/IEC JTC 1/SC 29/WG 11 15th Meeting: Gothenburg, SE, Jul. 3-12, 2019, Document JVET-O0650, 2019.
Sullivan et al. "Standardized Extensions of High Efficiency Video Coding (HEVC)," IEEE Journal of Selected Topics in Signal Processing, Dec. 2013, 7(6):1001-1016.
Bossen, F., et al., Retrieved from the Internet: https://vcgit.hhi.fraunhofer.de/jvetAA/CSoftware_VTM/tagsA/TM-6-0, Sep. 19, 2022, 2 pages.
JEM-7.0: https://jvet.hhi.fraunhofer.de/svn/svn_HMJEMSoftware/tags/ HM-16.6-JEM-7.0, Sep. 19, 2022, 1 page.
Wan W et al: "Consistent chroma QP derivation in deblocking and inverse quantization processes", 102.MPEG Meeting; Oct. 15, 2012-Oct. 19, 2012;Shanghai; (Motion Picture Expert Group or ISO/IEC JTC1/SC29/WG11), No. m26439, Oct. 9, 2012(Oct. 9, 2012), XP030054772.
JCTVC-K0220, Kanumuri et al. "Use of Chroma QP Offsets in Deblocking," Joint Collaborative Team on Video Coding (JCT-VC)

of ITU-T SG 16 WP 3 and ISO/IEC JTC 1/SC 29/WG 11 11th Meeting, Shanghai, CN, Oct. 10-19, 2012, Document JCTVC-K0220, 2012.
JVET-P1002, Xu et al. "Non-CE5: Chroma QP Derivation Fix for Deblocking Filter (Combination of JVET-P0105 and JVET-P0539)," Joint Video Experts Team (JVET) of ITU-T SG WP 3 and SI/IEC JTC 1/SC 29/WG 11 16th Meeting, Geneva, CH, Oct. 1-11, 2019, Document JVET-P1002, 2019.
JVET-O2002-v2, Chen, J., et al., "Algorithm description for Versatile Video Coding and Test Model 6 (VTM 6)," Joint Video Experts Team (JVET) of ITU-T SG 16 WP 3 and ISO/IEC JTC 1/SC 29/WG 11 15th Meeting: Gothenburg, SE, Jul. 3-12, 2019, 89 pages.
JVET-O2001-vE, "Versatile Video Coding (Draft 6), "Joint Video Experts Team (JVET) of ITU-T SG 16 WP 3 and ISO/IEC JTC 1/SC 29/WVG 11 15th Meeting: Gothenburg, SE, Jul. 3-12, 2019, 455 pages.
JVET-O1168, Han et al. "Cu Level Chroma QP Control for VVC," Joint Video Experts Team (JVET) of ITU-T SG WP 3 and SI/IEC JTC 1/SC 29/WG 11 15th Meeting, Gothenburg, SE, Jul. 3-12, 2019, Document JVET-01168, 2019.
Document JCTVC-O0089, Kim et al. "AhG5: Deblocking Filter in 4:4:4 Chroma Format," Joint Collaborative Team on Video Coding (JCT-VC) of ITU-T SG 16 WP 3 and ISO/IEC JTC 1/SC 29/WG 11 15th Meeting: Geneva, CH, Oct. 23-Nov. 1, 2013. Document JCTVC-O0089, 2013.
Document: JVET-P1006-v2, Wan, W., et al., "AHG17: Text for picture header," Joint Video Experts Team (JVET) of ITU-T SG 16 WP 3 and ISO/IEC JTC 1/SC 29/WG 11 16th Meeting: Geneva, CH, Oct. 1-11, 2019, 5 pages. p. 136.
Document JVET-N0473-r2, MISRA et al. "Non-CE11: On ISP Transform Boundary Deblocking," Joint Video Experts Team (JVET) of ITU-T SG 16 WP 3 and ISO/IEC JTC 1/SC 29/WG 11 14th Meeting: Geneva, CH, Mar. 19-27, 2019, Document JVET-N0473-r2, 2019.
Sjoberg et al. "HEVC High-Level Syntax" In: "High Efficiency Video Coding (HEVC) : Algorithms and Architectures," Aug. 23, 2014 (Aug. 23, 2014), Springer, ISBN: 978-3-319-06895-4 pp. 13-48, DOI:10.1007/978-3-319-06895-4.2.
Document JVET-P0517, Xiu et al. "Support of Adaptive Color Transform for 444 Video Coding in VVC," Joint Video Experts Team (JVET) of ITU-T SG 16 WP 3 and ISO/IEC JTC 1/SC 29/WG 11 16th Meeting, Geneva, CH, Oct. 1-11, 2019, Document JVET-P0517, 2019.
Document JVET-N0401-v5, De-Luxian-Hernandez et al. "Non-CE3/Non-CE8: Enable Transform Skip in CUs Using ISP," Joint Video Experts Team (JVET) of ITU-T SG 16 WP 3 and ISO/IEC JTC 1/SC 29/WG 11 14th Meeting, Geneva, CH, Mar. 19-27, 2019, Document JVET-N0401-v5, 2019.
Document JCTVC-U0106, Xiu et al. "On Signaling Adaptive Color Transform at TU Level," Joint Collaborative Team on Video Coding (JCT-VC) of ITU-T SG 16 WP 3 and ISO/IEC JTC 1/SC 29/WG 11 21st Meeting, Warsaw, PL, Jun. 19-26, 2015, Document JCTVC-U0106, 2015.
Document JVET-O0566, Xu et al. "Non-CE5: Consistent Deblocking for Chroma Components," Joint Video Experts Team (JVET) of ITU-T SG 16 WP 3 and ISO/IEC JTC 1/SC 29/WG 11 15th Meeting: Gothenburg, SE, Jul. 3-12, 2019, Document JVET-O0566, 2019.
Document JVET-P0105-v2, Kotra et al. "Non-CE5: Modified Chroma QP Derivation for Deblocking Filter ," Joint Video Experts Team (JVET) of ITU-T SG 16 WP 3 and ISO/IEC JTC 1/SC 29/WG 11 16th Meeting: Geneva, CH, Oct. 1-11, 2019, Document JVET-P0105-v2, 2019.
Kotra priority Document PCT/EP2019/072643, 2019.
JVET-O0413-v3 Morigami et al. "Chroma Deblocking Filter Adjustments for 4:4:4 and 4:2:2 Format," Joint Video Experts Team (JVET) of ITU-T SG 16 WP 3 and ISO/IEC JTC 1/SC 29/WG 11 15th Meeting: Gothenburg, SE, Jul. 3-12, 2019, Document JVET-O0413, 2019.
JVET-Q0253-v1, Meher, A., et al., "CE5-related: High level syntax modifications for CCALF," Joint Video Experts Team (JVET)of ITU-T SG 16 WP 3 and ISO/IEC JTC 1/SC 29/WG 11 17th Meeting: Brussels, BE, Jan. 7-17, 2020.

(56)        References Cited

OTHER PUBLICATIONS

JVET-Q0190-v1, Chubach, O., et al., "CE5-related: On CC-ALF modifications related to coefficients and signalling," Joint Video Experts Team (JVET)of ITU-T SG 16 WP 3 and ISO/IEC JTC 1/SC 29/WG 11 17th Meeting: Brussels, BE, Jan. 7-17, 2020.
JCTVC-Y1002—Rosewarne et al. "High Efficiency Video Coding (HEVC) Test Model 16 (HM 16) Improved Encoder Description Update 7," Joint Collaborative Team on Video Coding (JCT-VC) of ITU-T SG16 WP3 and ISO/IEC JTC1/SC29/WG1125th Meeting: Chengdu, CN, Oct. 14-21, 2016, document JCTVC-Y1002, 2016.
JVET-G1001—Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.
Document: JVET-P0436, Zhao, J., et al., "AHG15: On CU Adaptive Chroma QP Offset Signalling," Joint Video Experts Team (JVET) of ITU-T SG 16 WP 3 and ISO/IEC JTC 1/SC 29/WVG 11 16th Meeting: Geneva, CH, Oct. 1-11, 2019, 5 pages.
JVET-P1001-v1—Kotra et al. "Non-CE5: Chroma QP Derivation Fix for Deblocking Filter (Combination of JVET-P0105 and JVET-P0539)," Joint Video Experts Team (JVET of ITU-T SG 16 WP 3 an ISO/IEC JTC 1/SC 29/WG 1 16th Meeting: Geneva, CH, Oct. 1-11, 2019, document JVET-P1001, 2019.
Notice of Allowance from U.S. Appl. No. 17/694,305 dated Feb. 23, 2023, 13 pages.
Non-Final Office Action from U.S. Appl. No. 17/694,253 dated Mar. 24, 2023, 36 pages.
Non Final Office Action from U.S. Appl. No. 17/810,187 dated Nov. 16, 2023, 26 pages.
Final Office Action from U.S. Appl. No. 17/694,305 dated Dec. 11, 2023, 13 pages.
Non-Final Office Action from U.S. Appl. No. 17/856,631 dated Nov. 24, 2023, 32 pages.
Non-Final Office Action from U.S. Appl. No. 17/694,305 dated Mar. 27, 2024, 16 pages.
Notice of Allowance from U.S. Appl. No. 17/694,305 dated Apr. 7, 2023, 14 pages.
Advisory Action from U.S. Appl. No. 17/720,582 dated Jun. 1, 2023, 13 pages.
Non Final Office Action from U.S. Appl. No. 17/720,582 dated Nov. 14, 2022, 47 pages.
Non Final Office Action from U.S. Appl. No. 17/694,305 dated Aug. 10, 2023, 13 pages.
International Search Report and Written Opinion from International Patent Application No. PCT/US2020/050638 dated Nov. 30, 2020 (8 pages).
International Search Report and Written Opinion from International Patent Application No. PCT/US2020/050649 dated Feb. 12, 2021 (11 pages).
International Search Report and Written Opinion from International Patent Application No. PCT/US2020/054959 dated Feb. 12, 2021 (11 pages).
International Search Report and Written Opinion from International Patent Application No. PCT/US2020/055329 dated Jan. 19, 2021 (10 pages).
Advisory Action from U.S. Appl. No. 18/498,652 dated Jan. 2, 2025, 3 pages.
Bross B., et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1, 2019-Oct. 11, 2019, Document: JVET-P2001-v1, 456 Pages, Retrieved from URL: http://phenix.it-sudparis.eu/jvet/doc_end_user/current_document.phpid=8857.
Bross B., et al., "Versatile Video Coding (Draft 7)," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P2001-v9, 495 Pages.
Chinese Notice of Allowance from Chinese Patent Application No. 202080088208.7 dated Jan. 8, 2025, 5 pages.

Chinese Notice of Allowance from Chinese Patent Application No. 202080091580.3 dated Jan. 10, 2025, 5 pages.
International Search Report and Written Opinion for International Application No. PCT/US2020/050638, mailed Nov. 30, 2020, 08 Pages.
International Search Report and Written Opinion for International Application No. PCT/US2020/050644, mailed Dec. 18, 2020, 09 Pages.
International Search Report and Written Opinion for International Application No. PCT/US2020/050649, mailed Feb. 12, 2021, 11 Pages.
International Search Report and Written Opinion for International Application No. PCT/US2020/055332, mailed Jan. 29, 2021, 09 Pages.
International Search Report and Written Opinion for International Application No. PCT/US2020/063746, mailed Apr. 8, 2021, 14 pages.
International Search Report and Written Opinion for International Application No. PCT/US2020/067655, mailed Mar. 30, 2021, 10 Pages.
International Search Report and Written Opinion from International Patent Application No. PCT/US2020/067651, mailed Mar. 30, 2021, 10 Pages.
Kotra, et al., Priority Document for International Application No. PCT/EP2019/072643, dated Aug. 23, 2019, 181 Pages.
Misra K., et al., "On Cross Component Adaptive Loop Filter for Video Compression," IEEE, Picture Coding Symposium, Published on Nov. 12-15, 2019, 5 Pages, (Entire Document, Especially pp. 2-4), [online], [Retrieved on Jan. 26, 2021], Retrieved from URL: https://ieeexplore.ieee.org/document/8954547.
MPEG: "Verbal Reports from Subgroups at 128th Meeting 128," (Motion Picture Expert Group or ISO/IEC JTC1/SC29/WG11) MPEG Meeting, Geneva, Oct. 7, 2019-Oct. 11, 2019, 10 Pages, Nov. 27, 2019, Retrieved from URL: http://phenix.int-evry.fr/mpeg/doc_end_user/documents/128_Geneva/wg11/w18748-v2-w18748.zip.
Non-Final Office Action for U.S. Appl. No. 17/867,284, mailed Sep. 19, 2022, 7 Pages.
Notice of Allowance for U.S. Appl. No. 17/867,284, mailed Jan. 11, 2023, 17 Pages.
Notice of Allowance for U.S. Appl. No. 17/857,924, mailed Apr. 17, 2024, 14 pages.
Notice of Allowance for U.S. Appl. No. 17/867,284, mailed Jun. 9, 2023, 10 Pages.
Notice of Allowance from U.S. Appl. No. 17/694,305 dated Nov. 5, 2024, 28 pages.
Wan W., et al., "AHG17: Text for Picture Header," Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P1006-v2, 5 Pages.
Non-Final Office Action for U.S. Appl. No. 18/506,313, mailed Dec. 4, 2024, 66 Pages.
Notice of Allowance for U.S. Appl. No. 18/323,149, mailed Dec. 20, 2024, 20 pages.
Notice of Opinion on the First Review for Chinese Application No. 202180008570.3, mailed on Jan. 16, 2025, 16 pages.
Final Office Action from U.S. Appl. No. 18/524,994 dated Nov. 21, 2024, 26 pages.
Notice of Allowance for U.S. Appl. No. 17/857,924, mailed Nov. 29, 2024, 13 pages.
Document: JVET-P0239-v1, Wan, W., et al., "AHG17: Picture Header," Joint Video Experts Team (JVET) of ITU-T SG 16 WP 3 and ISO/IEC JTC 1/SC 29/WG 11 16th Meeting: Geneva, CH, Oct. 1-11, 2019, 9 pages.
Chinese Notice of Allowance from Chinese Patent Application No. 202080091580.3 dated Jan. 10, 2025, 1 page.
Korean Notice of Allowance from Korean Patent Application No. 10-2022-7005307 dated Jan. 22, 2025, 5 pages.
European Office Action from European Patent Application No. 20899673.6 dated Feb. 3, 2025, 6 pages.
Chinese Office Action from Chinese Patent Application No. 202080088215.7 dated Feb. 5, 2025, 18 pages.

(56)            References Cited

OTHER PUBLICATIONS

Final Office Action from U.S. Appl. No. 18/498,665 dated Feb. 6, 2025, 74 pages.
Notice of Allowance from U.S. Appl. No. 18/524,994 dated Feb. 18, 2025, 8 pages.
Document: JVET-N0276-v1, Boyce, J., et al., "AHG15: On interoperability point signalling," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.
Document: JVET-N0276-v2, Boyce, J., et al., "AHG15: On interoperability point signalling," Joint Video Experts Team (JVET) of ITU-T SG 16 WP 3 and ISO/IEC JTC 1/SC 29/WG 11 14th Meeting: Geneva, CH, Mar. 19-27, 2019, 16 pages.
Document: JVET-O0643-v1,"Modification on Delta QP for Deblocking," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-O0643-v2,"Modification on Delta QP for Deblocking," Joint Video Experts Team (JVET) of ITU-T SG 16 WP 3 and ISO/IEC JTC 1/SC 29/WG 11 15th Meeting: Gothenburg, SE, Jul. 3-12, 2019, 4 pages.
Document: JVET-Q0162-v1, Kondo, K., et al., "A memory issue on adaptive color transform," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.
Document: JVET-Q0162-v2, Kondo, K., et al., "A memory issue on adaptive color transform," Joint Video Experts Team (JVET) of ITU-T SG 16 WP 3 and ISO/IEC JTC 29/WG 11 17th Meeting: Brussels, BE, Jan. 7-17, 2020, 4 pages.
Document: JVET-Q0162-v3, Kondo, K., et al., "A memory issue on adaptive color transform," Joint Video Experts Team (JVET) of ITU-T SG 16 WP 3 and ISO/IEC JTC 1/SC 29/WG 11 17th Meeting: Brussels, BE, Jan. 7-17, 2020, 4 pages.
Document: JVET-Q0162-v4, Kondo, K., et al., "A memory issue on adaptive color transform," Joint Video Experts Team (JVET) of ITU-T SG 16 WP 3 and ISO/IEC JTC 29/WG 11 17th Meeting: Brussels, BE, Jan. 7-17, 2020, 5 pages.
Document: JVET-Q0162-v5, Kondo, K., et al., "A memory issue on adaptive color transform," Joint Video Experts Team (JVET) of ITU-T SG 16 WP 3 and ISO/IEC JTC 1/SC 29/WG 11 17th Meeting: Brussels, BE, Jan. 7-17, 2020, 5 pages.
Chinese Office Action from Chinese Patent Application No. 202180008244.2 dated May 27, 2025, 12 pages.
Chinese Notice of Allowance from Chinese Patent Application No. 202180008254.6 dated May 23, 2025, 6 pages.
Chinese Office Action from Chinese Patent Application No. 202180009289.1 dated May 27, 2025, 12 pages.
Advisory Action from U.S. Appl. No. 18/506,313 dated Jul. 22, 2025, 4 pages.
Document: JVET-P0436-v4, Zhao, J., et al., "AHG15: On CU Adaptive Chroma QP Offset Signalling," Joint Video Experts Team (JVET) of ITU-T SG 16 WP 3 and ISO/IEC JTC 29/WG 11 16th Meeting: Geneva, CH, Oct. 1-11, 2019, 5 pages.

Korean Office Action from Korean Patent Application No. 10-2022-7010299 dated Sep. 25, 2025, 14 pages.
Document: JVET-P2024-v1, CHEN, et al., "Description of Core Experiment 4 (CE4): Inter Prediction with Geometric Partitioning," Joint Video Experts Team (JVET) of ITU-T SG 16 WP 3 and ISO/IEC JTC 1/SC 29/WG 11 16th Meeting: Geneva, CH, Oct. 1-11, 2019, 4 pages.
Document: JVET-P2024-v2, Chen, C-C., et al., "Description of Core Experiment 4 (CE4): Inter Prediction with Geometric Partitioning," Joint Video Experts Team (JVET) of ITU-T SG 16 WP 3 and ISO/IEC JTC 1/SC 29/WG 11 16th Meeting: Geneva, CH, Oct. 1-11, 2019, 5 pages.
Document: JVET-O0566-v1, Xu, J., et al., "Non-CE5: Consistent Deblocking for Chroma Components," Joint Video Experts Team (JVET) of ITU-T SG 16 WP 3 and ISO/IEC JTC 1/SC 29/WG 11, 15th Meeting: Gothenburg, SE, Jul. 3-12, 2019, 4 pages.
Document: JVET-Q0166, Huang, H., et al., "On the adaptive color transform," Joint Video Experts Team (JVET) of ITU-T SG 16 WP 3 and ISO/IEC JTC 1/SC 29/WG 11, 17th Meeting: Brussels, Jan. 6-17, 2020, 5 pages.
Document: JCTVC-R1014, Joshi, R., et al., "Screen Content Coding Test Model 2 (SCM 2)," Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, 10 Pages.
Document: JVET-Q0513-v1, Xiu, X., et al., "AHG16: Clipping residual samples for ACT," Joint Video Experts Team (JVET) of ITU-T SG 16 WP 3 and ISO/IEC JTC 1/SC 29/WG 11 17th Meeting: Brussels, BE, Jan. 7-17, 2020, 3 pages.
Document: JVET-Q0513-v2, Xiu, X., et al., "AHG16: Clipping residual samples for ACT," Joint Video Experts Team (JVET) of ITU-T SG 16 WP 3 and ISO/IEC JTC 1/SC 29/WG 11 17th Meeting: Brussels, BE, Jan. 7-17, 2020, 6 pages.
Document: JVET-Q0513-v3, Xiu, X., et al., "AHG16: Clipping residual samples for ACT," Joint Video Experts Team (JVET) of ITU-T SG 16 WP 3 and ISO/IEC JTC 1/SC 29/WG 11 17th Meeting: Brussels, BE, Jan. 7-17, 2020, 11 pages.
Document: JVET-Q0513-v4, Xiu, X., et al., "AHG16: Clipping residual samples for ACT," Joint Video Experts Team (JVET) of ITU-T SG 16 WP 3 and ISO/IEC JTC 1/SC 29/WG 11 17th Meeting: Brussels, BE, Jan. 7-17, 2020, 19 pages.
Document: JVET-Q0513-v5, Xiu, X., et al., "AHG16: Clipping residual samples for ACT," Joint Video Experts Team (JVET) of ITU-T SG 16 WP 3 and ISO/IEC JTC 1/SC 29/WG 11 17th Meeting: Brussels, BE, Jan. 7-17, 2020, 11 pages.
Document: JVET-T2001-v2, Bross, B., et al., "Versatile Video Coding Editorial Refinements on Draft 10," Joint Video Experts Team (JVET) of ITU-T SG 16 WP 3 and ISO/IEC JTC 1/SC 29 20th Meeting, by teleconference, Oct. 7-16, 2020, 512 pages.
Chinese Office Action from Chinese Patent Application No. 202080088215.7 dated Jan. 9, 2026, 10 pages.
Chinese Office Action from Chinese Patent Application No. 202180009358.9 dated Jan. 19, 2026, 12 pages.

* cited by examiner current palette

| Pred flag | Index | G/Y | B/Cb | R/Cr |
|---|---|---|---|---|
| 1 | 0 | G0 | B0 | R0 |
| 0 | | | | |
| 1 | 1 | G2 | B2 | R2 |
| 1 | 2 | G3 | B3 | R3 |
| 0 | | | | |
| 0 | 3 | G3N | B3N | R3N |
| | 4 | G4N | B4N | R4N | previous palette

| Index | G/Y | B/Cb | R/Cr |
|---|---|---|---|
| 0 | G0 | B0 | R0 |
| 1 | G1 | B1 | R1 |
| 2 | G2 | B2 | R2 |
| 3 | G3 | B3 | R3 |
| 4 | G4 | B4 | R4 |
| 5 | G5 | B5 | R5 |

Re-used palette entries (3)

New palette entries (2), signalled

Figure 12:
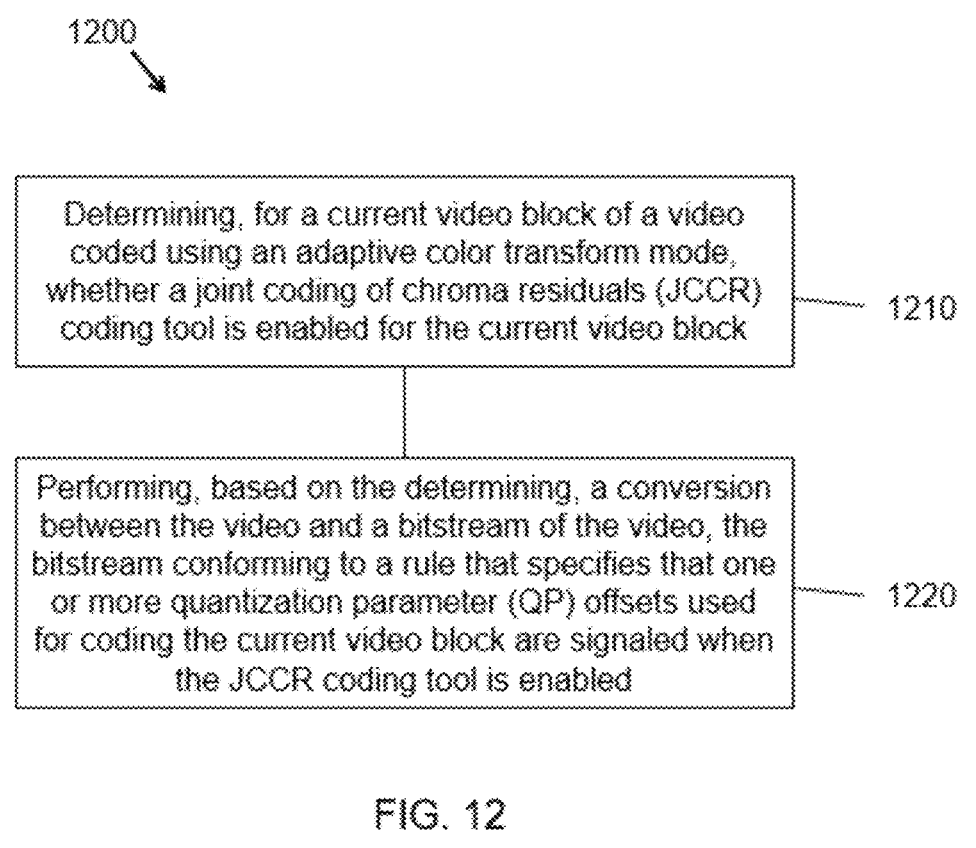

Determining, for a current video block of a video coded using an adaptive color transform mode, whether a joint coding of chroma residuals (JCCR) coding tool is enabled for the current video block — 1210

Performing, based on the determining, a conversion between the video and a bitstream of the video, the bitstream conforming to a rule that specifies that one or more quantization parameter (QP) offsets used for coding the current video block are signaled when the JCCR coding tool is enabled — 1220

Figure 13:
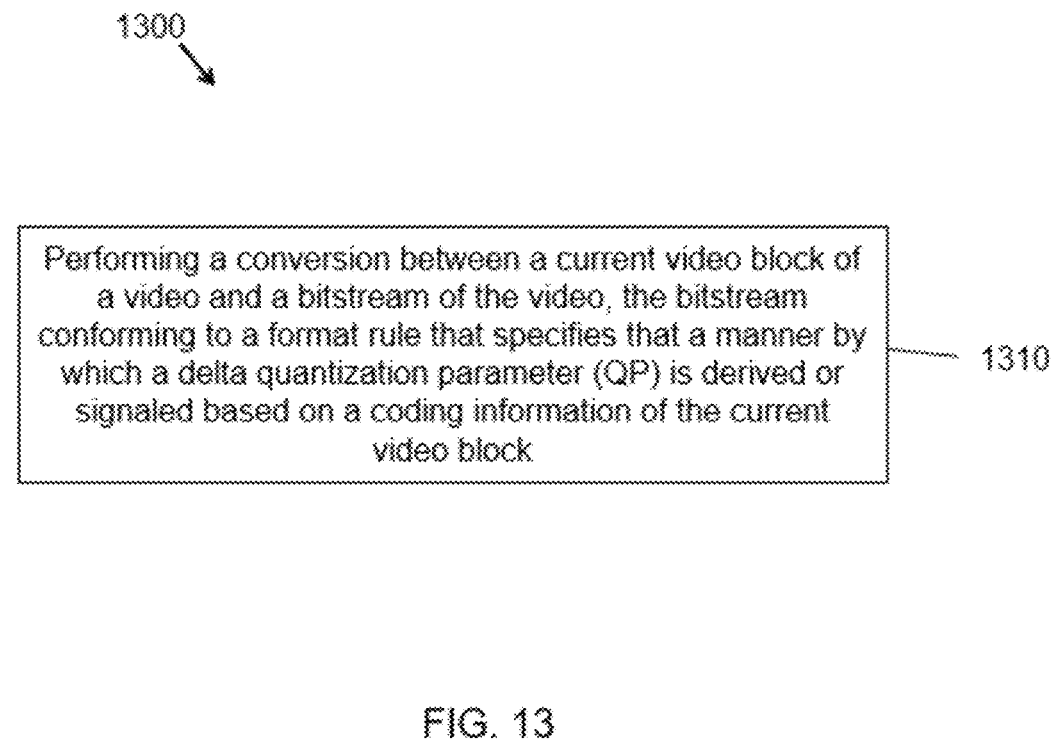

Performing a conversion between a current video block of
a video and a bitstream of the video, the bitstream
conforming to a format rule that specifies that a manner by
which a delta quantization parameter (QP) is derived or
signaled based on a coding information of the current
video block

Figure 14:
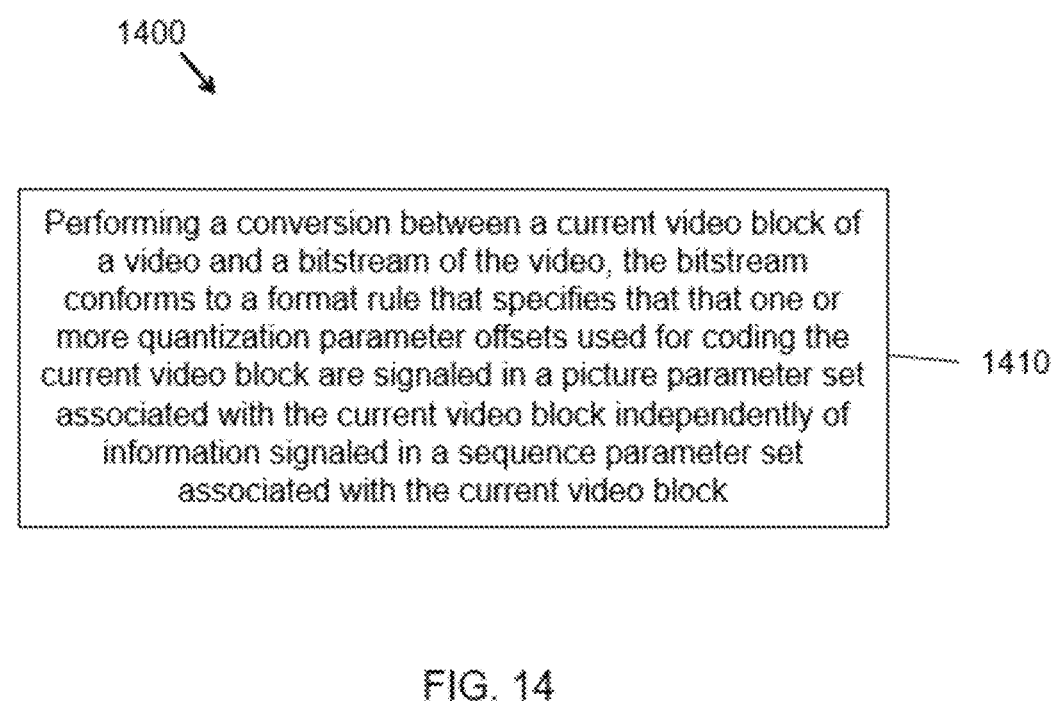

Performing a conversion between a current video block of a video and a bitstream of the video, the bitstream conforms to a format rule that specifies that that one or more quantization parameter offsets used for coding the current video block are signaled in a picture parameter set associated with the current video block independently of information signaled in a sequence parameter set associated with the current video block

Figure 15:
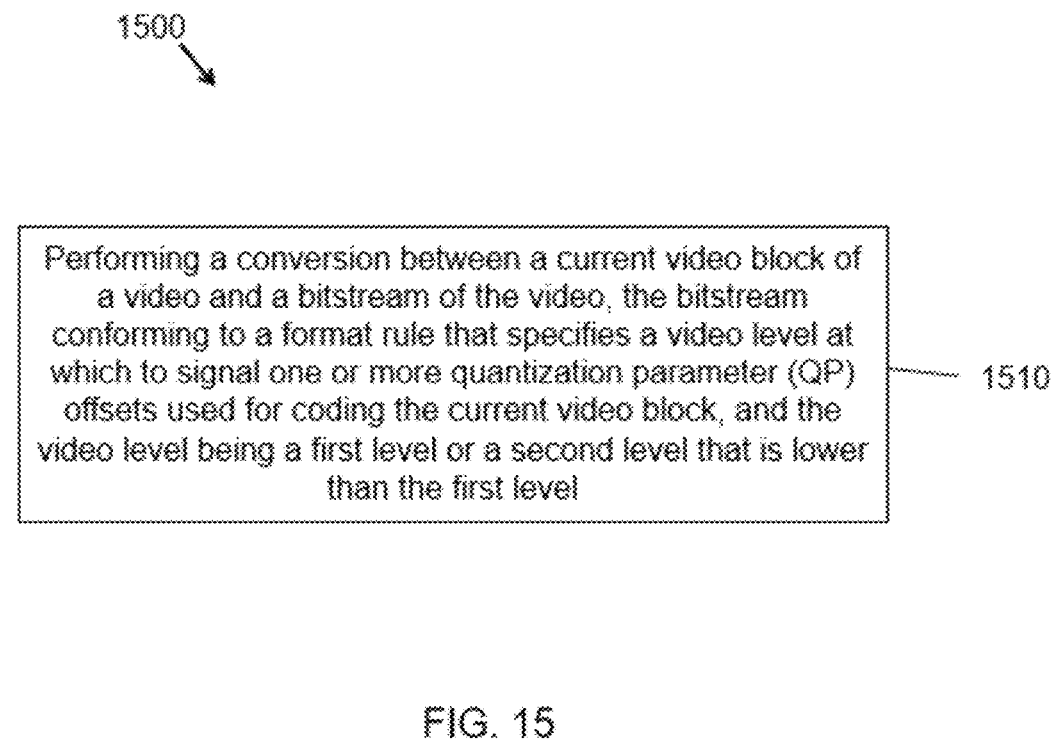

Performing a conversion between a current video block of
a video and a bitstream of the video, the bitstream
conforming to a format rule that specifies a video level at
which to signal one or more quantization parameter (QP)
offsets used for coding the current video block, and the
video level being a first level or a second level that is lower
than the first level

Figure 16:
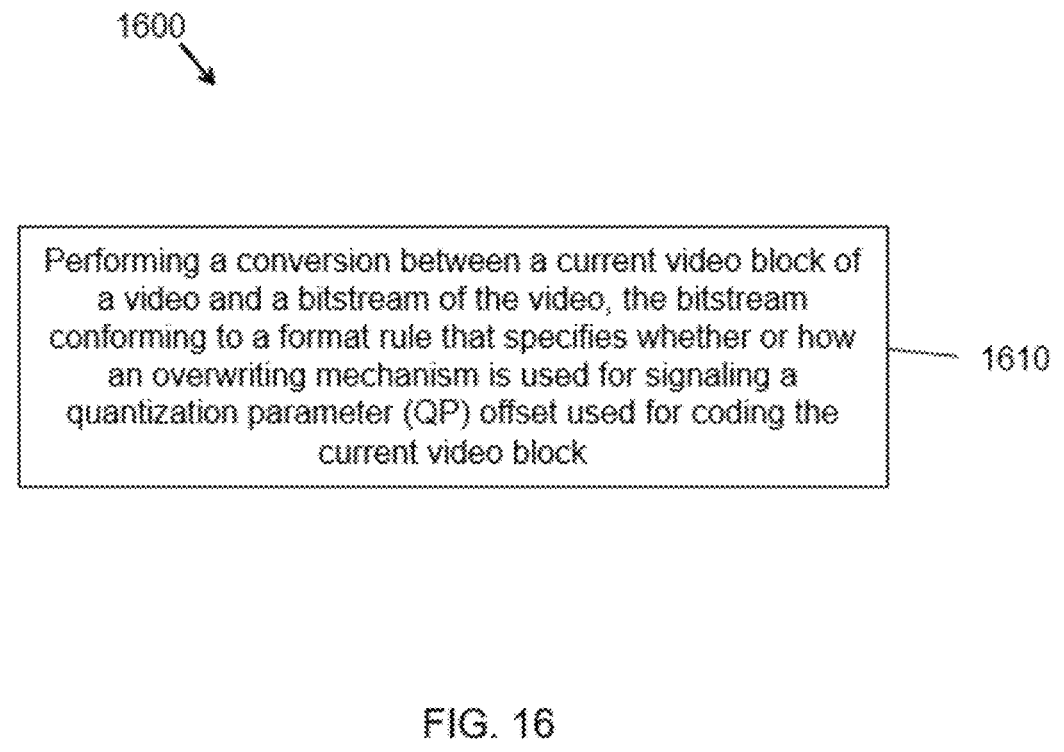

Performing a conversion between a current video block of a video and a bitstream of the video, the bitstream conforming to a format rule that specifies whether or how an overwriting mechanism is used for signaling a quantization parameter (QP) offset used for coding the current video block

SIGNALING OF QUANTIZATION PARAMETERS IN VIDEO CODING

CROSS-REFERENCE TO RELATED APPLICATION

This application is a continuation of International Patent Application No. PCT/CN2021/071659, filed on Jan. 14, 2021 which claims the priority to and benefits of International Patent Application No. PCT/CN2020/072105 filed on Jan. 14, 2020. All the aforementioned patent applications are hereby incorporated by reference in their entireties.

TECHNICAL FIELD

This patent document relates to image and video coding and decoding.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The present document discloses system, methods and devices for video encoding and decoding that include the signaling and overwriting of quantization parameters.

In one example aspect, a method of video processing is disclosed. The method includes determining, for a current video block of a video coded using an adaptive color transform (ACT) mode, whether a joint coding of chroma residuals (JCCR) coding tool is enabled for the current video block, and performing, based on the determining, a conversion between the video and a bitstream of the video, wherein the bitstream conforms to a rule, and wherein the rule specifies that one or more quantization parameter (QP) offsets used for coding the current video block are signaled when the JCCR coding tool is enabled.

In another example aspect, a method of video processing is disclosed. The method includes performing a conversion between a current video block of a video and a bitstream of the video, wherein the bitstream conforms to a format rule, and wherein the format rule specifies that a manner by which a delta quantization parameter (QP) is derived or signaled based on a coding information of the current video block.

In yet another example aspect, a method of video processing is disclosed. The method includes performing a conversion between a current video block of a video and a bitstream of the video, wherein the bitstream conforms to a format rule, and wherein the format rule specifies that that one or more quantization parameter (QP) offsets used for coding the current video block are signaled in a picture parameter set (PPS) associated with the current video block independently of information signaled in a sequence parameter set (SPS) associated with the current video block.

In yet another example aspect, a method of video processing is disclosed. The method includes performing a conversion between a current video block of a video and a bitstream of the video, wherein the bitstream conforms to a format rule, and wherein the format rule specifies a video level at which to signal one or more quantization parameter (QP) offsets used for coding the current video block, wherein the video level is a first level or a second level that is lower than the first level.

In yet another example aspect, a method of video processing is disclosed. The method includes performing a conversion between a current video block of a video and a bitstream of the video, wherein the bitstream conforms to a format rule, and wherein the format rule specifies whether or how an overwriting mechanism is used for signaling a quantization parameter (QP) offset used for coding the current video block.

In yet another example aspect, a video encoder apparatus is disclosed. The video encoder comprises a processor configured to implement the above-described methods.

In yet another example aspect, a video decoder apparatus is disclosed. The video decoder comprises a processor configured to implement the above-described methods.

In yet another example aspect, a non-transitory computer readable medium having code stored thereon is disclose. The code embodies one of the methods described herein in the form of processor-executable code.

These, and other, features are described throughout the present document.

BRIEF DESCRIPTION OF DRAWINGS

FIG. 4 shows an example of using of palette predictor to signal palette entries.

FIGS. 12-16 show flowcharts for example methods of video processing.

DETAILED DESCRIPTION

Section headings are used in the present document for ease of understanding and do not limit the applicability of techniques and embodiments disclosed in each section only to that section. Furthermore, H.266 terminology is used in some description only for ease of understanding and not for limiting scope of the disclosed techniques. As such, the techniques described herein are applicable to other video codec protocols and designs also.

1. Initial Discussion

This patent document is related to image/video coding technologies. Specifically, it is related to adaptive color transform in image/video coding. It may be applied to the standard under development, e.g. Versatile Video Coding (VVC). It may be also applicable to future video coding standards or video codec.

2. Video Coding Introduction

Video coding standards have evolved primarily through the development of the well-known International Telecommunication Union (ITU) Telecommunication Standardization Sector (ITU-T) and International Organization for Standardization (ISO)/International Electrotechnical Commission (IEC) standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by video coding experts group (VCEG) and moving pictures experts group (MPEG) jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

The latest version of VVC draft, i.e., Versatile Video Coding (Draft 7) could be found at: http://phenix.it-sudparis.eu/jvet/doc_end_user/documents/16_Geneva/wg11/JVET-P2001-v14.zip The latest reference software of VVC, named VVC Test Model (VTM), could be found at: https://vcgit.hhi.fraunhofer.de/jvet/VVCSoftware_VTM/tags/VTM-7.0

2.1. Adaptive Colour Transform (ACT) in HEVC-SCC

Figure 1:
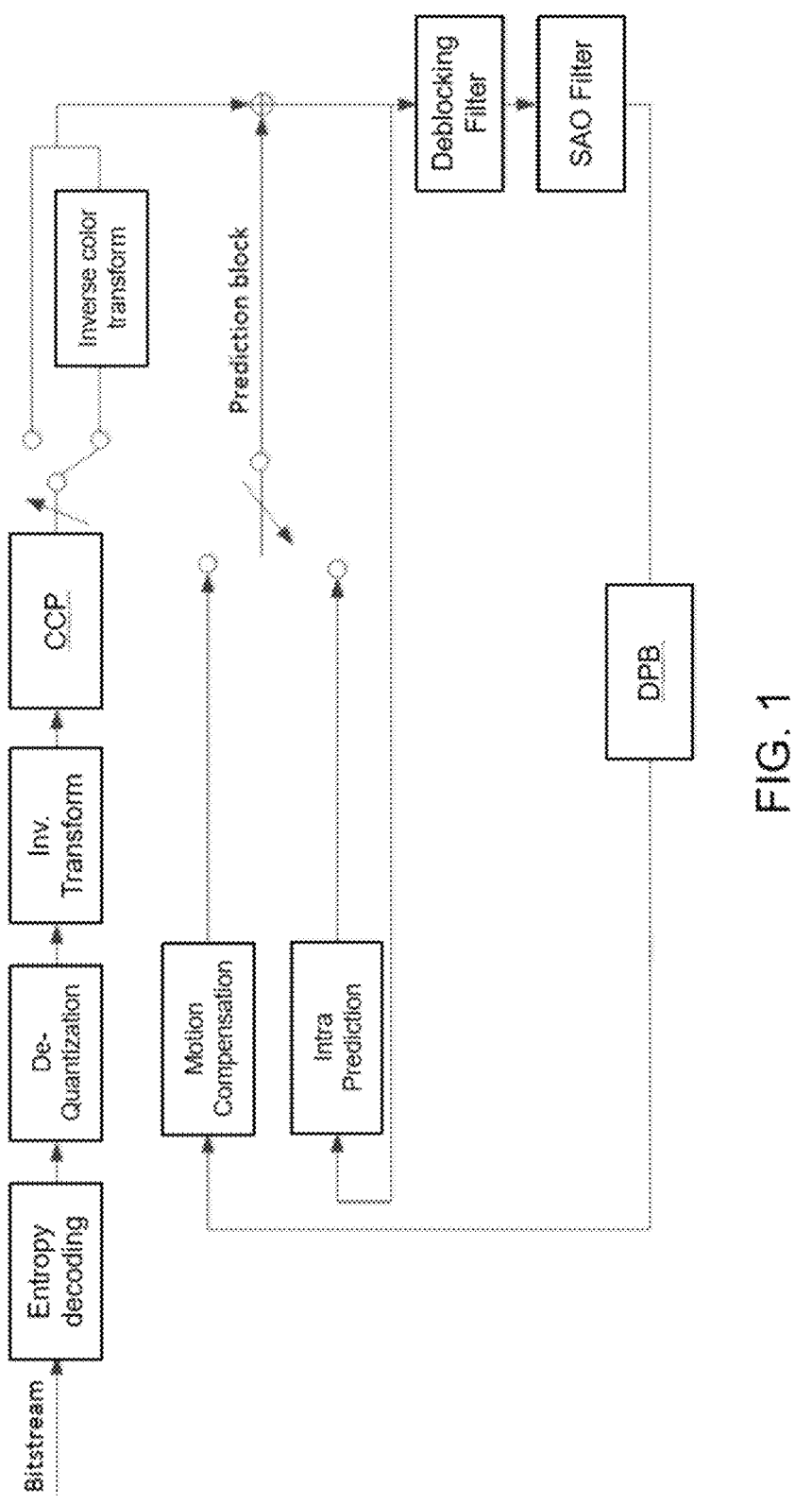
FIG. 1 shows a screen content coding (SCC) decoder flow of in-loop adaptive color transform (ACT).

The Adaptive Colour Transform (ACT) was adopted into the HEVC Screen Content Coding (SCC) test model 2 at the 18th JCT-VC meeting (Jun. 30 to Jul. 9, 2014, Sapporo, Japan). ACT performs in-loop colour space conversion in the prediction residual domain using colour transform matrices based on the YCoCg and YCoCg-R colour spaces. ACT is turned on or off adaptively at the CU level using the flag cu_residual_act_flag. ACT can be combined with Cross Component Prediction (CCP), which is another inter component de-correlation method already supported in HEVC. When both are enabled, ACT is performed after CCP at the decoder, as shown in FIG. 1.

2.1.1. Color Space Conversion in ACT

The colour space conversion in ACT is based on the YCoCg-R transform. Both lossy coding and lossless coding (cu_transquant_bypass_flag=0 or 1) use the same inverse transform, but an additional 1-bit left shift is applied to the Co and Cg components in the case of lossy coding. Specifically, the following colour space transforms are used for forward and backward conversion for lossy and lossless coding:

Forward transform for lossy coding (non-normative):

$$\begin{bmatrix} Y \\ Co \\ Cg \end{bmatrix} = \begin{bmatrix} 1 & 2 & 1 \\ 2 & 0 & -2 \\ -1 & 2 & -1 \end{bmatrix} \begin{bmatrix} R \\ G \\ B \end{bmatrix} / 4$$

Forward transform for lossless coding (non-normative):

$$Co = R - B$$

$$t = B + (Co >> 1)$$

$$Cg = (G - t)$$

$$Y = t + (Cg >> 1)$$

Backward transform (normative):

```
if(lossy){
    Co = Co << 1
    Cg = Cg << 1
}
t   =   Y - (Cg >> 1)
G   =     Cg + t
B   =   t - (Co >> 1)
R   =     Co + b
```

The forward colour transform is not normalized, with its norm being roughly equal to $\sqrt{6}/4$ for Y and Cg and equal to $\sqrt{2}/2$ for Co. In order to compensate for the non-normalized nature of the forward transform, delta QPs of $(-5, -3, -5)$ are applied to (Y, Co, Cg), respectively. In other words, for a given "normal" QP for the CU, if ACT is turned on, then the quantization parameter is set equal to (QP−5, QP−3, QP−5) for (Y, Co, Cg), respectively. The adjusted quantization parameter only affects the quantization and inverse quantization of the residuals in the CU. For deblocking, the "normal" QP value is still used. Clipping to 0 is applied to the adjusted QP values to ensure that they will not become negative. Note that this QP adjustment is only applicable to lossy coding, as quantization is not performed in lossless coding (cu_transquant_bypass_flag=1). In SCM 4, PPS/slice-level signaling of additional QP offset values is introduced. These QP offset values may be used instead of (−5, −3, −5) for CUs when adaptive colour transform is applied.

When the input bit-depths of the colour components are different, appropriate left shifts are applied to align the sample bit-depths to the maximal bit-depth during ACT, and appropriate right shifts are applied to restore the original sample bit-depths after ACT.

2.2. ACT in VVC

Figure 2:
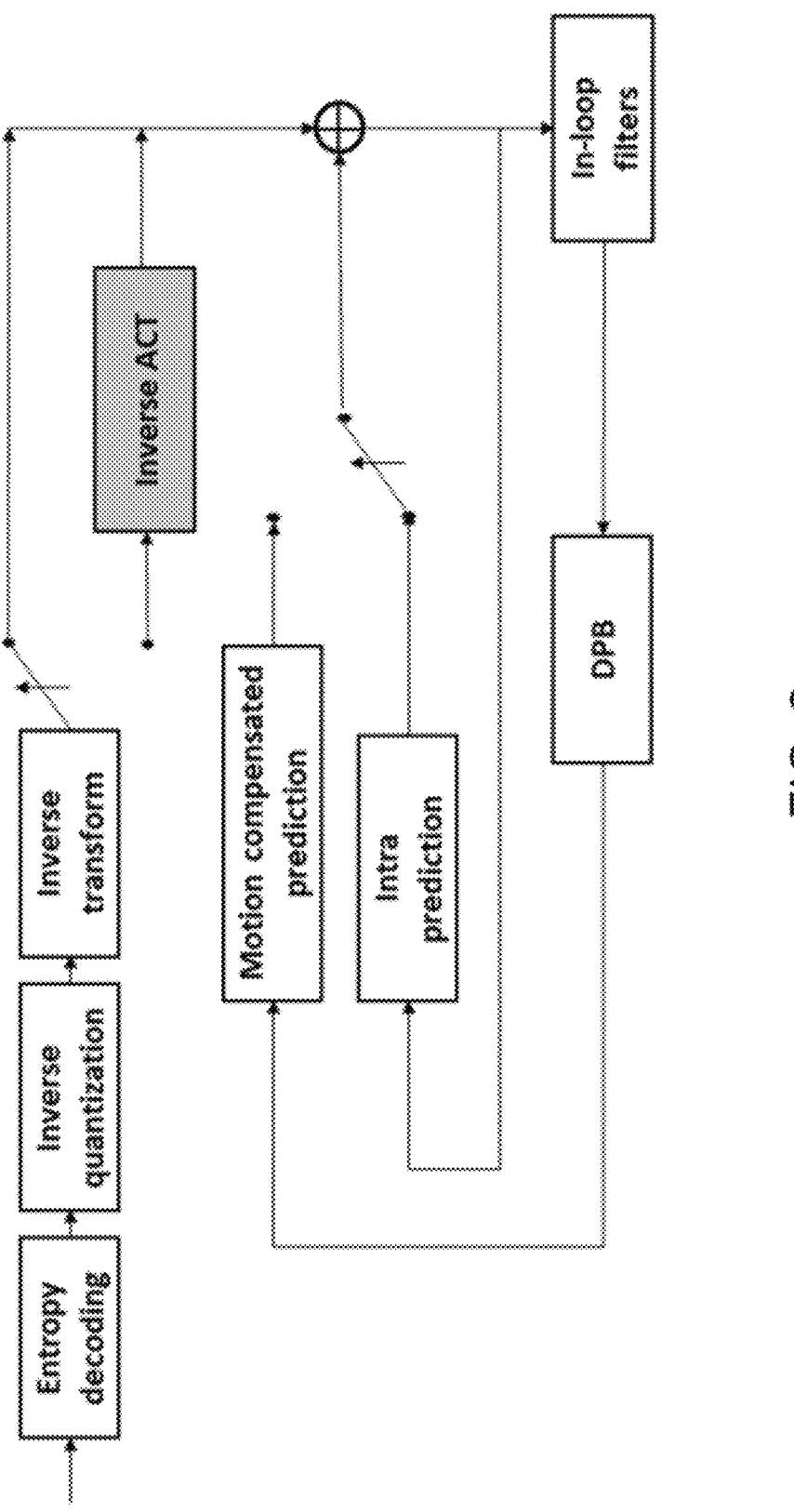
FIG. 2 illustrates a decoding process with the ACT.

FIG. 2 illustrates the decoding flowchart of VVC with the ACT be applied. As illustrated in FIG. 2, the colour space conversion is carried out in residual domain. Specifically, one additional decoding module, namely inverse ACT, is introduced after inverse transform to convert the residuals from YCgCo domain back to the original domain.

In the VVC, unless the maximum transform size is smaller than the width or height of one coding unit (CU), one CU leaf node is also used as the unit of transform processing. Therefore, in the proposed implementation, the ACT flag is signaled for one CU to select the colour space for coding its residuals. Additionally, following the HEVC ACT design, for inter and IBC CUs, the ACT is only enabled when there is at least one non-zero coefficient in the CU. For intra CUs, the ACT is only enabled when chroma components select the same intra prediction mode of luma component, i.e., derived mode (DM).

The core transforms used for the colour space conversions are kept the same as that used for the HEVC. Additionally, same with the ACT design in HEVC, to compensate the dynamic range change of residuals signals before and after colour transform, the QP adjustments of (−5, −5, −3) are applied to the transform residuals.

On the other hand, the forward and inverse colour transforms may access the residuals of all three components. Correspondingly, in the proposed implementation, the ACT may be disabled in the following two scenarios where not all residuals of three components are available.

1. Separate-tree partition: when separate-tree is applied, luma and chroma samples inside one CTU are partitioned by different structures. This results in that the CUs in the luma-tree only contains luma component and the CUs in the chroma-tree only contains two chroma components.

2. Intra sub-partition prediction (ISP): the ISP sub-partition is only applied to luma while chroma signals are coded without splitting. In the current ISP design, except the last ISP sub-partitions, the other sub-partitions only contain luma component.

The texts of a coding unit in the VVC draft are shown as below.

| | Descriptor |
|---|---|
| coding_unit( x0, y0, cbWidth, cbHeight, cqtDepth, treeType, modeType ) { | |
|    chType = treeType = = DUAL_TREE_CHROMA ? 1 : 0 | |
|    if( slice_type != I \| sps_ibc_enabled_flag ) { | |
|      if( treeType != DUAL_TREE_CHROMA && | |
|       ( ( !( cbWidth = = 4 && cbHeight == 4 ) && modeType != | |
| MODE_TYPE_INTRA ) | |
|          \| ( sps_ibc_enabled_flag && cbWidth <= 64 && cbHeight <= 64 ) ) | |
| ) | |
|        cu_skip_flag[ x0 ][ y0 ] | ae(v) |
|      if( cu_skip_flag[ x0 ][ y0 ] == 0 && slice_type != I | |
|       && !( cbWidth == 4 && cbHeight == 4 ) && modeType = = | |
| MODE_TYPE_ALL ) | |
|       pred_mode_flag | ae(v) |
|      if( ( ( slice_type == I && cu_skip_flag[ x0 ][ y0 ] = =0 ) \| | |
|         ( slice_type != I && ( CuPredMode[ chType ][ x0 ][ y0 ] != | |
| MODE_INTRA \| | |
|           ( ( ( cbWidth = = 4 && cbHeight = = 4 ) \| modeType = = | |
| MODE_TYPE_INTRA ) | |
|             && cu_skip_flag[ x0 ][ y0 ] == 0 ) ) ) ) && | |
|          cbWidth <= 64 && cbHeight <= 64 && modeType != | |
| MODE_TYPE_INTER && | |
|         sps_ibc_enabled_flag && treeType != DUAL_TREE_CHROMA ) | |
|       pred_mode_ibc_flag | ae(v) |
|    } | |
|    if( CuPredMode[ chType ][ x0 ][ y0 ] == MODE_INTRA && | |
| sps_palette_enabled_flag && | |
|     cbWidth <= 64 && cbHeight <= 64 && cu_skip_flag[ x0 ][ y0 ] = = 0 | |
| && | |
|      modeType != MODE_TYPE_INTER ) | |
|       pred_mode_plt_flag | ae(v) |
|    } | |
|    if( CuPredMode[ chType ][ x0 ][ y0 ] = = MODE_INTRA && | |
| sps_act_enabled_flag && | |
|     treeType == SINGLE_TREE ) | |
|     cu_act_enabled_flag | |
|    if( CuPredMode[ chType ][ x0 ][ y0 ] = = MODE_INTRA \| | |
|    CuPredMode[ chType ][ x0 ][ y0 ] = = MODE_PLT ) { | |
|     if( treeType = = SINGLE_TREE \| treeType = = DUAL_TREE_LUMA ) { | |
|      if( pred_mode_plt_flag ) { | |
|       palette_coding( x0, y0, cbWidth, cbHeight, treeType ) | |
|      } else { | |
|       if( sps_bdpcm_enabled_flag && | |
|         cbWidth <= MaxTsSize && cbHeight <= MaxTsSize ) | |
|         intra_bdpcm_luma_flag | ae(v) |
|       if( intra_bdpcm_luma_flag ) | |
|         intra_bdpcm_luma_dir_flag | ae(v) |
|       else { | |
|         if( sps_mip_enabled_flag ) | |
|           intra_mip_flag[ x0 ][ y0 ] | ae(v) |
|         if( intra_mip_flag[ x0 ][ y0 ] ) { | |
|           intra_mip_transposed[ x0 ][ y0 ] | ae(v) |
|           intra_mip_mode[ x0 ][ y0 ] | ae(v) |
|         } else { | |
|           if( sps_mrl_enabled_flag && ( ( y0 % CtbSizeY ) > 0 ) ) | |
|             intra_luma_ref_idx[ x0 ][ y0 ] | ae(v) |
|           if( sps_isp_enabled_flag && intra_luma_ref_idx[ x0 ][ y0 ] == 0 | |
| && | |
|             (cbWidth <= MaxTbSizeY && cbHeight <= MaxTbSizeY ) | |
|             && | |
|             ( cbWidth * cbHeight > MinTbSizeY * MinTbSizeY ) && | |
| !cu_act_enabled_flag ) | |
|             intra_subpartitions_mode_flag[ x0 ][ y0 ] | ae(v) |
|           if( intra_subpartitions_mode_flag[ x0 ][ y0 ] = = 1 ) | |
|             intra_subpartitions_split_flag[ x0 ][ y0 ] | ae(v) |
|           if( intra_luma_ref_idx[ x0 ][ y0 ] = = 0 ) | |

-continued

| | Descriptor |
|---|---|
| intra_luma_mpm_flag[ x0 ][ y0 ] | ae(v) |
| if( intra_luma_mpm_flag[ x0 ][ y0 ] ) { | |
| if( intra_luma_ref_idx[ x0 ][ y0 ] = = 0 ) | |
| intra_luma_not_planar_flag[ x0 ][ y0 ] | ae(v) |
| if( intra_luma_not_planar_flag[ x0 ][ y0 ] ) | |
| intra_luma_mpm_idx[ x0 ][ y0 ] | ae(v) |
| } else | |
| intra_luma_mpm_remainder[ x0 ][ y0 ] | ae(v) |
| } | |
| } | |
| } | |
| } | |
| if( ( treeType == SINGLE_TREE \|\| treeType == DUAL_TREE_CHROMA | |
| ) && | |
| ChromaArrayType != 0 ) { | |
| if( pred_mode_plt_flag && treeType = = DUAL_TREE_CHROMA ) | |
| palette_coding( x0, y0, cbWidth / SubWidthC, cbHeight / SubHeightC, | |
| treeType ) | |
| else { | |
| if( !cu_act_enabled_flag ) { | |
| if( cbWidth <= MaxTsSize && cbHeight <= MaxTsSize && | |
| sps_bdpcm_chroma_enabled_flag ) { | |
| intra_bdpcm_chroma_flag | ae(v) |
| if( intra_bdpcm_chroma_flag ) | |
| intra_bdpcm_chroma_dir_flag | ae(v) |
| } else { | |
| if( CclmEnabled ) | |
| cclm_mode_flag | ae(v) |
| if( cclm_mode_flag ) | |
| cclm_mode_idx | ae(v) |
| else | |
| intra_chroma_pred_mode | ae(v) |
| } | |
| } | |
| } | |
| } | |
| } else if( treeType != DUAL_TREE_CHROMA ) { /* MODE_INTER or | |
| MODE_IBC */ | |
| if( cu_skip_flag[ x0 ][ y0 ] = = 0 ) | |
| general_merge_flag[ x0 ][ y0 ] | ae(v) |
| if( general_merge_flag[ x0 ][ y0 ] ) | |
| merge_data( x0, y0, cbWidth, cbHeight, chType ) | |
| else if( CuPredMode[ chType ][ x0 ][ y0 ] = = MODE_IBC ) { | |
| mvd_coding( x0, y0, 0, 0 ) | |
| if( MaxNumIbcMergeCand > 1 ) | |
| mvp_l0_flag[ x0 ][ y0 ] | ae(v) |
| if( sps_amvr_enabled_flag && | |
| ( MvdL0[ x0 ][ y0 ][ 0 ] != 0 \|\| MvdL0[ x0 ][ y0 ][ 1 ] != 0 ) ) | |
| amvr_precision_idx[ x0 ][ y0 ] | ae(v) |
| } else { | |
| if( slice_type = = B ) | |
| inter_pred_idc[ x0 ][ y0 ] | ae(v) |
| if( sps_affine_enabled_flag && cbWidth >= 16 && cbHeight >= 16 ) { | |
| inter_affine_flag[ x0 ][ y0 ] | ae(v) |
| if( sps_affine_type_flag && inter_affine_flag[ x0 ][ y0 ] ) | |
| cu_affine_type_flag[ x0 ][ y0 ] | ae(v) |
| } | |
| if( sps_smvd_enabled_flag && !mvd_l1_zero_flag && | |
| inter_pred_idc_[ x0 ][ y0 ] = = PRED_BI && | |
| !inter_affine_flag[ x0 ][ y0 ] && RefIdxSymL0 > −1 && | |
| RefIdxSymL1 > −1 ) | |
| sym_mvd_flag[ x0 ][ y0 ] | ae(v) |
| if( inter_pred_idc[ x0 ][ y0 ] != PRED_L1 ) { | |
| if( NumRefIdxActive[ 0 ] > 1 && !sym_mvd_flag[ x0 ][ y0 ] ) | |
| ref_idx_l0[ x0 ][ y0 ] | ae(v) |
| mvd_coding( x0, y0, 0, 0 ) | |
| if( MotionModelIdc[ x0 ][ y0 ] > 0 ) | |
| mvd_coding( x0, y0, 0, 1 ) | |
| if(MotionModelIdc[ x0 ][ y0 ] > 1 ) | |
| mvd_coding( x0, y0, 0, 2 ) | |
| mvp_l0_flag[ x0 ][ y0 ] | ae(v) |
| } else { | |
| MvdL0[ x0 ][ y0 ][ 0 ] = 0 | |
| MvdL0[ x0 ][ y0 ][ 1 ] = 0 | |
| } | |
| if( inter_pred_idc[ x0 ][ y0 ] != PRED_L0 ) { | |
| if( NumRefIdxActive[ 1 ] > 1 && !sym_mvd_flag[ x0 ][ y0 ] ) | |

-continued

| | Descriptor |
|---|---|
| ref_idx_l1[ x0 ][ y0 ] | ae(v) |

```
            if( mvd_l1_zero_flag && inter_pred_idc[ x0 ][ y0 ] = = PRED_BI ) {
                MvdL1[ x0 ][ y0 ][ 0 ] = 0
                MvdL1[ x0 ][ y0 ][ 1 ] = 0
                MvdCpL1[ x0 ][ y0 ][ 0 ][ 0 ] = 0
                MvdCpL1[ x0 ][ y0 ][ 0 ][ 1 ] = 0
                MvdCpL1[ x0 ][ y0 ][ 1 ][ 0 ] = 0
                MvdCpL1[ x0 ][ y0 ][ 1 ][ 1 ] = 0
                MvdCpL1[ x0 ][ y0 ][ 2 ][ 0 ] = 0
                MvdCpL1[ x0 ][ y0 ][ 2 ][ 1 ] = 0
            } else {
                if( sym_mvd_flag[ x0 ][ y0 ] ) {
                    MvdL1[ x0 ][ y0 ][ 0 ] = −MvdL0[ x0 ][ y0 ][ 0 ]
                    MvdL1[ x0 ][ y0 ][ 1 ] = −MvdL0[ x0 ][ y0 ][ 1 ]
                } else
                    mvd_coding( x0, y0, 1, 0 )
                if( MotionModelIdc[ x0 ][ y0 ] > 0 )
                    mvd_coding( x0, y0, 1, 1 )
                if(MotionModelIdc[ x0 ][ y0 ] > 1 )
                    mvd_coding( x0, y0, 1, 2 )
            }
```

| mvp_l1_flag[ x0 ][ y0 ] | ae(v) |

```
        } else {
            MvdL1[ x0 ][ y0 ][ 0 ] = 0
            MvdL1[ x0 ][ y0 ][ 1 ] = 0
        }
        if( ( sps_amvr_enabled_flag && inter_affine_flag[ x0 ][ y0 ] = = 0 &&
                ( MvdL0[ x0 ][ y0 ][ 0 ] != 0 | | MvdL0[ x0 ][ y0 ][ 1 ] != 0 | |
                    MvdL1[ x0 ][ y0 ][ 0 ] != 0 | | MvdL1[ x0 ][ y0 ][ 1 ] != 0 ) ) | |
                ( sps_affine_amvr_enabled_flag && inter_affine_flag[ x0 ][ y0 ] = = 1
&&
                    ( MvdCpL0[ x0 ][ y0 ][ 0 ][ 0 ] != 0 | | MvdCpL0[ x0 ][ y0 ][ 0 ]
                    [ 1 ] != =
0 | |
                        MvdCpL1[ x0 ][ y0 ][ 0 ][ 0 ] != 0 | | MvdCpL1[ x0 ][ y0 ][ 0 ]
                        [ 1 ] != =
0 | |
                        MvdCpL0[ x0 ][ y1 ][ 1 ][ 0 ] != 0 | | MvdCpL0[ x0 ][ y0 ][ 1 ]
                        [ 1 ] != =
0 | |
                        MvdCpL1[ x0 ][ y0 ][ 1 ][ 0 ] != 0 | | MvdCpL1[ x0 ][ y0 ][ 1 ]
                        [ 1 ] != =
0 | |
                        MvdCpL0[ x0 ][ y0 ][ 2 ][ 0 ] != 0 | | MvdCpL0[ x0 ][ y0 ][ 2 ]
                        [ 1 ] != =
0 | |
                        MvdCpL1[ x0 ][ y0 ][ 2 ][ 0 ] != 0 | | MvdCpL1[ x0 ][ y0 ][ 2 ]
                        [ 1 ] != =
0 ) ) {
```

| amvr_flag[ x0 ][ y0 ] | ae(v) |

```
            if( amvr_flag[ x0 ][ y0 ] )
```

| amvr_precision_idx[ x0 ][ y0 ] | ae(v) |

```
        }
        if( sps_bcw_enabled_flag && inter_pred_idc[ x0 ][ y0 ] = = PRED_BI &&
                luma_weight_l0_flag[ ref_idx_l0 [ x0 ][ y0 ] ] = = 0 &&
                luma_weight_l1_flag[ ref_idx_l1 [ x0 ][ y0 ] ] == 0 &&
                chroma_weight_l0_flag[ ref_idx_l0 [ x0 ][ y0 ] ] = = 0 &&
                chroma_weight_l1_flag[ ref_idx_l1 [ x0 ][ y0 ] ] = = 0 &&
                cbWidth * cbHeight >= 256 )
```

| bcw_idx[ x0 ][ y0 ] | ae(v) |

```
        }
    }
    if( CuPredMode[ chType ][ x0 ][ y0 ] != MODE_INTRA
&& !pred_mode_plt_flag &&
        general_merge_flag[ x0 ][ y0 ] = = 0 )
```

| cu_cbf | ae(v) |

```
    if( cu_cbf ) {
        if( CuPredMode[ chType ][ x0 ][ y0 ] == MODE_INTER &&
sps_sbt_enabled_flag
                && !ciip_flag[ x0 ][ y0 ] && !MergeTriangleFlag[ x0 ][ y0 ]
                && cbWidth <= MaxTbSizeY && cbHeight <= MaxTbSizeY ) {
            allowSbtVerH = cbWidth >= 8
            allowSbtVerQ = cbWidth >= 16
```

-continued

| | Descriptor |
|---|---|
| allowSbtHorH = cbHeight >= 8 | |
| allowSbtHorQ = cbHeight >= 16 | |
| if( allowSbtVerH \| \| allowSbtHorH ) | |
| cu_sbt_flag | ae(v) |
| if( cu_sbt_flag ) { | |
| if( ( allowSbtVer \| \| allowSbtHorH ) && ( allowSbtVerQ \| \| | |
| allowSbtHorQ ) ) | |
| cu_sbt_quad_flag | ae(v) |
| if( ( cu_sbt_quad_flag && allowSbtVerQ && allowSbtHorQ ) \| \| | |
| ( !cu_sbt_quad_flag && allowSbtVerH && allowSbtHorH ) ) | |
| cu_sbt_horizontal_flag | ae(v) |
| cu_sbt_pos_flag | ae(v) |
| } | |
| } | |
| if( sps_act_enabled_flag && CuPredMode[ chType ][ x0 ][ y0 ] != | |
| MODE_INTRA && | |
| treeType == SINGLE_TREE ) | |
| cu_act_enabled_flag ae(v) | |
| LfnstDcOnly = 1 | |
| LfnstZeroOutSigCoeffFlag = 1 | |
| MtsZeroOutSigCoeffFlag = 1 | |
| transform_tree( x0, y0, cbWidth, cbHeight, treeType, chType ) | |
| lfnstWidth = ( treeType = = | |
| DUAL_TREE_CHROMA ) ? cbWidth / SubWidthC | |
| : ( ( IntraSubPartitionsSplitType = = | |
| ISP_VER_SPLIT) ? cbWidth / | |
| NumIntraSubPartitions : cbWidth ) | |
| lfnstHeight = ( treeType = = | |
| DUAL_TREE_CHROMA ) ? cbHeight / SubHeightC | |
| : ( ( IntraSubPartitionsSplitType = = | |
| ISP_HOR_SPLIT) ? cbHeight/ | |
| NumIntraSubPartitions : cbHeight ) | |
| if( Min( lfnstWidth, lfnstHeight) >= 4 && sps_lfnst_enabled_flag = = 1 | |
| && | |
| CuPredMode[ chType ][ x0 ][ y0 ] == MODE_INTRA && | |
| transform_skip_flag[ x0 ][ y0 ][ 0 ] == 0 && | |
| (treeType != DUAL_TREE_CHROMA \| \| !intra_mip_flag[ x0 ][ y0 ] \| \| | |
| Min( lfnstWidth, lfnstHeight ) >= 16 ) && | |
| Max( cbWidth, cbHeight) <= MaxTbSizeY) { | |
| if( ( IntraSubPartitionsSplitType != ISP_NO_SPLIT \| \| LfnstDcOnly = = | |
| 0 ) && | |
| LfnstZeroOutSigCoeffFlag = = 1 ) | |
| lfnst_idx | ae(v) |
| } | |
| if( treeType != DUAL_TREE_CHROMA && lfnst idx == 0 && | |
| transform_skip_flag[ x0 ][ y0 ][ 0 ] == 0 && Max( cbWidth, cbHeight ) | |
| <= 32 && | |
| IntraSubPartitionsSplit[ x0 ][ y0 ] == ISP_NO_SPLIT && cu_sbt_flag | |
| = = 0 && | |
| MtsZeroOutSigCoeffFlag = = 1 && tu_cbf_luma[ x0 ][ y0 ] ) { | |
| if( ( ( CuPredMode[ chType ][ x0 ][ y0 ]= = MODE_INTER && | |
| sps_explicit_mts_inter_enabled_flag ) \| \| | |
| ( CuPredMode[ chType ][ x0 ][ y0 ] == MODE_INTRA && | |
| sps_explicit_mts_intra_enabled_flag ) ) ) | |
| mts_idx | ae(v) |
| } | |
| } | | cu_act_enabled_flag equal to 1 specifies that the residuals of the current coding unit are coded in $YC_gC_o$ colour space. cu_act_enabled_flag equal to 0 specifies that the residuals of the current coding unit are coded in original colour space. When cu_act_enabled_flag is not present, it is inferred to be equal to 0.

2.3. Transform Skip Mode in VVC

As in HEVC, the residual of a block can be coded with transform skip mode which completely skip the transform process for a block. In addition, for transform skip blocks, a minimum allowed Quantization Parameter (QP) signaled in SPS is used, which is set equal to 6*(internalBitDepth−inputBitDepth)+4 in VTM7.0.

2.4. Block-Based Delta Pulse Code Modulation (BDPCM)

In JVET-M0413, a block-based Delta Pulse Code Modulation (BDPCM) is proposed to code screen contents efficiently and then adopted into VVC.

The prediction directions used in BDPCM can be vertical and horizontal prediction modes. The intra prediction is done on the entire block by sample copying in prediction direction (horizontal or vertical prediction) similar to intra prediction. The residual is quantized and the delta between the quantized residual and its predictor (horizontal or vertical) quantized value is coded. This can be described by the following: For a block of size M (rows)×N (cols), let $r_{i,j}$, $0 \le i \le M-1$, $0 \le j \le N-1$ be the prediction residual after performing intra prediction horizontally (copying left neighbor pixel value across the predicted block line by line) or vertically (copying top neighbor line to each line in the predicted block) using unfiltered samples from above or left block boundary samples. Let $Q(r_{i,j})$, $0 \le i \le M-1$, $0 \le j \le N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signaled:

$$\tilde{r}_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases}.$$

For horizontal prediction, similar rules apply, and the residual quantized samples are obtained by $$\tilde{r}_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases}.$$

The residual quantized samples $\tilde{r}_{i,j}$ are sent to the decoder.

On the decoder side, the above calculations are reversed to produce $Q(r_{i,j})$, $0 \le i \le M-1$, $0 \le j \le N-1$.

For vertical prediction case, $$Q(r_{i,j}) = \sum_{k=0}^{i} \tilde{r}_{k,j}, \quad 0 \le i \le (M-1), \quad 0 \le j \le (N-1).$$

For horizontal case, $$Q(r_{i,j}) = \sum_{k=0}^{j} \tilde{r}_{i,k}, \quad 0 \le i \le (M-1), \quad 0 \le j \le (N-1).$$

The inverse quantized residuals, $Q^{-1}(Q(r_{i,j}))$, are added to the intra block prediction values to produce the reconstructed sample values.

The main benefit of this scheme is that the inverse BDPCM can be done on the fly during coefficient parsing simply adding the predictor as the coefficients are parsed or it can be performed after parsing.

In VTM7.0, the BDPCM also can be applied on chroma blocks and the chroma BDPCM has a separate flag and BDPCM direction from the luma BDPCM mode.

2.5. Scaling Process for Transform Coefficients

The texts related to scaling process for transform coefficients in JVET-P2001-vE is given as follows.

Inputs to this process are:

a luma location (xTbY, yTbY) specifying the top-left sample of the current luma transform block relative to the top-left luma sample of the current picture, a variable nTbW specifying the transform block width, a variable nTbH specifying the transform block height, a variable predMode specifying the prediction mode of the coding unit, a variable cIdx specifying the colour component of the current block.

Output of this process is the (nTbW)×(nTbH) array d of scaled transform coefficients with elements d[x][y].

The quantization parameter qP is derived as follows:

If cIdx is equal to 0, the following applies:

$$qP = Qp'_Y \tag{1129}$$

Otherwise, if TuCResMode[xTbY][yTbY] is equal to 2, the following applies:

$$qP = Qp'_{CbCr} \tag{1130}$$

Otherwise, if cIdx is equal to 1, the following applies:

$$qP = Qp'_{Cb} \tag{1131}$$

Otherwise (cIdx is equal to 2), the following applies:

$$qP = Qp'_{Cr} \tag{1132}$$

The quantization parameter qP is modified and the variables rectNonTsFlag and bdShift are derived as follows:

If transform_skip_flag[xTbY][yTbY][cIdx] is equal to 0, the following applies:

$$qP = qP - (cu\_act\_enabled\_flag[xTbY][yTbY]?5:0) \tag{1133}$$

$$rectNonTsFlag = (((\text{Log } 2(nTbW) + \text{Log } 2(nTbH)) \& 1) == 1)?1:0 \tag{1134}$$

$$bdShift = BitDepth + rectNonTsFlag + ((\text{Log } 2(nTbW) + \text{Log } 2(nTbH))/2) - 5 + pic\_dep\_quant\_enabled\_flag \tag{1135}$$

Otherwise (transform_skip_flag[xTbY][yTbY][cIdx] is equal to 1), the following applies:

$$qP = Max(QpPrimeTs \text{ Min,qP}) - (cu\_act\_enabled\_flag[xTbY][yTbY]?5:0) \tag{1136}$$

$$rectNonTsFlag = 0 \tag{1137}$$

$$bdShift = 10 \tag{1138}$$

The variable bdOffset is derived as follows:

$$bdOffset = (1 << bdShift) >> 1 \tag{1139}$$

The list levelScale[ ][ ] is specified as levelScale[j][k]={{40, 45, 51, 57, 64, 72}, {57, 64, 72, 80, 90, 102}} with j=0 . . . 1, k=0 . . . 5.

The (nTbW)×(nTbH) array dz is set equal to the (nTbW)×(nTbH) array TransCoeffLevel[xTbY][yTbY][cIdx].

For the derivation of the scaled transform coefficients d[x][y] with x=0 . . . nTbW−1, y=0 . . . nTbH−1, the following applies:

The intermediate scaling factor m[x][y] is derived as follows:

If one or more of the following conditions are true, m[x][y] is set equal to 16:

sps_scaling_list_enabled_flag is equal to 0.

pic_scaling_list_present_flag is equal to 0.

transform_skip_flag[xTbY][yTbY][cIdx] is equal to 1.

scaling_matrix_for_lfnst_disabled_flag is equal to 1 and lfnst_idx[xTbY][yTbY] is not equal to 0.

Otherwise, the following applies:

The variable id is derived based on predMode, cIdx, nTbW, and nTbH as specified in Table 36 and the variable log 2MatrixSize is derived as follows:

$$\text{log } 2MatrixSize = (id < 2)?1:(id < 8)?2:3 \tag{1140}$$

The scaling factor m[x][y] is derived as follows:

$$m[x][y] = ScalingMatrixRec[id][i][j] \text{ with } i = (x << \text{log } 2MatrixSize) >> \text{Log } 2(nTbW), j = (y << \text{log } 2MatrixSize) >> \text{Log } 2(nTbH) \tag{1141}$$

If id is greater than 13 and both x and y are equal to 0, m[0][0] is further modified as follows:

$$m[0][0]=\text{ScalingMatrixDCRec}[id-14] \qquad (1142)$$

NOTE—A quantization matrix element m[x][y] can be zeroed out when any of the following conditions is true x is greater than 32 y is greater than 32

The decoded tu is not coded by default transform mode (i.e. transform type is not equal to 0) and x is greater than 16

The decoded tu is not coded by default transform mode (i.e. transform type is not equal to 0) and y is greater than 16

The scaling factor ls[x][y] is derived as follows:

If pic_dep_quant_enabled_flag is equal to −1 and transform_skip_flag[xTbY][yTbY][cIdx] is equal to 0, the following applies:

$$ls[x][y]=(m[x][y]*\text{levelScale}[\text{rectNon}Ts\text{Flag}][(qP+1) \\ \%6])<<((qP+1)/6) \qquad (1143)$$

Otherwise (pic_dep_quant_enabled_flag is equal to 0 or transform_skip_flag[xTbY][yTbY][cIdx] is equal to 1), the following applies:

$$ls[x][y]=(m[x][y]*\text{levelScale}[\text{rectNon}Ts\text{Flag}][qP\ \%6]) \\ <<(qP/6) \qquad (1144)$$

When BdpcmFlag[xTbY][yTbY][cIdx] is equal to 1, dz[x][y] is modified as follows:

If BdpcmDir[xTbY][yTbY][cIdx] is equal to 0 and x is greater than 0, the following applies:

$$dz[x][y]=\text{Clip3}(\text{CoeffMin},\text{CoeffMax},dz[x-1][y]+dz[x] \\ [y]) \qquad (1145)$$

Otherwise, if BdpcmDir[xTbY][yTbY][cIdx] is equal to 1 and y is greater than 0, the following applies:

$$dz[x][y]=\text{Clip3}(\text{CoeffMin},\text{CoeffMax},dz[x][y-1]+dz[x] \\ [y]) \qquad (1146)$$

The value dnc[x][y] is derived as follows:

$$dnc[x][y]=(dz[x][y]*ls[x][y]+bd\text{Offset})>>bd\text{Shift} \qquad (1147)$$

The scaled transform coefficient d[x][y] is derived as follows:

$$d[x][y]=\text{Clip3}(\text{CoeffMin},\text{CoeffMax},dnc[x][y]) \qquad (1148)$$

TABLE 36

| Specification of the scaling matrix identifier variable id according to predMode, cIdx, nTbW, and nTbH | | | | | | | |
| --- | --- | --- | --- | --- | --- | --- | --- |
| max( nTbW, nTbH ) | | 2 | 4 | 8 | 16 | 32 | 64 |
| predMode = | cIdx = 0 (Y) | | 2 | 8 | 14 | 20 | 26 |
| MODE_INTRA | cIdx = 1 (Cb) | | 3 | 9 | 15 | 21 | 21 |
| | cIdx = 2 (Cr) | | 4 | 10 | 16 | 22 | 22 |
| predMode = | cIdx = 0 (Y) | | 5 | 11 | 17 | 23 | 27 |
| MODE_INTER | cIdx = 1 (Cb) | 0 | 6 | 12 | 18 | 24 | 24 |
| (INTER, IBC) | cIdx = 2 (Cr) | 1 | 7 | 13 | 19 | 25 | 25 |

2.6. Palette Mode

2.6.1. Concept of Palette Mode

Figure 3:
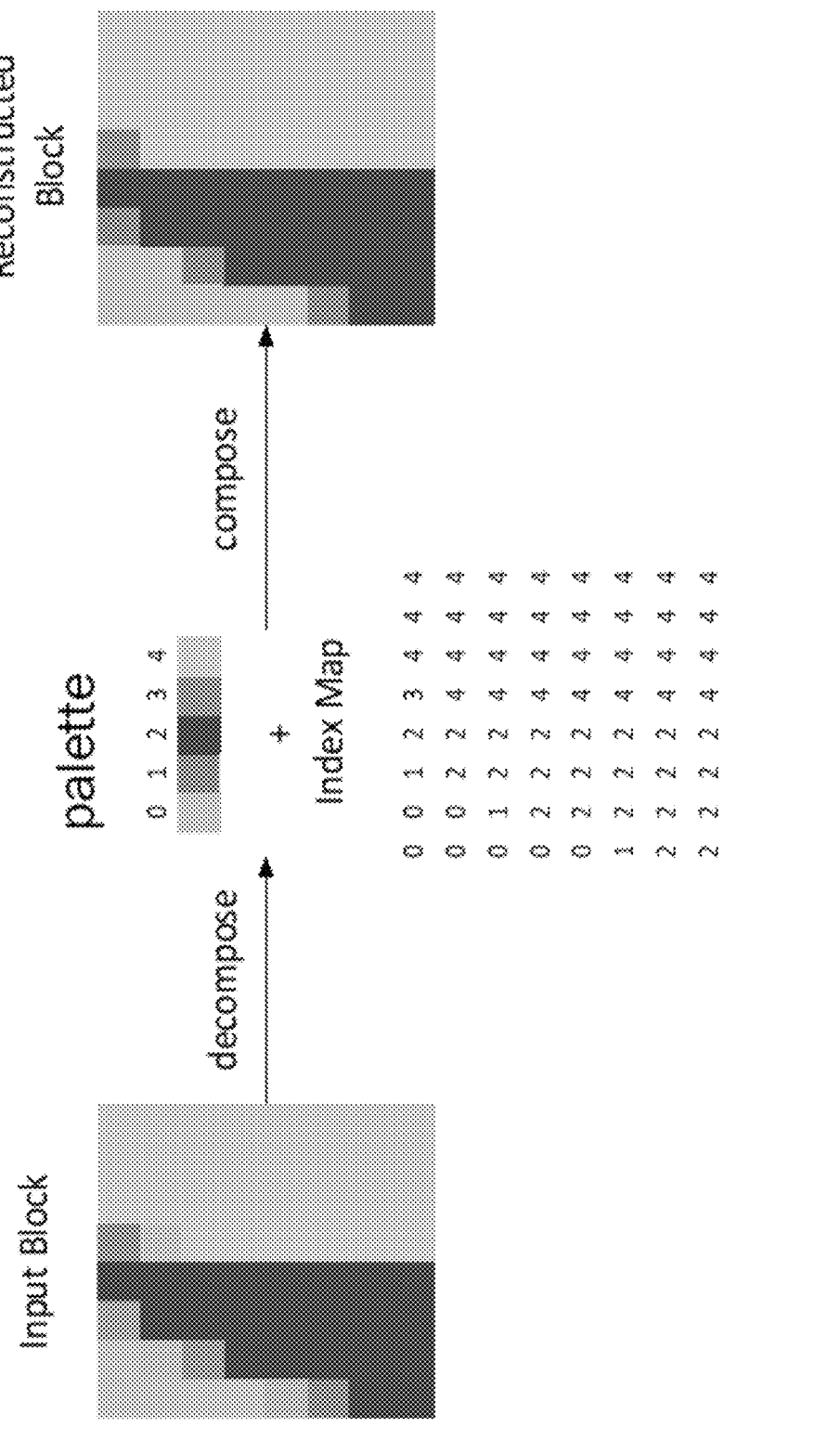
FIG. 3 shows an example of a block coded in palette mode.

The basic idea behind a palette mode is that the pixels in the CU are represented by a small set of representative colour values. This set is referred to as the palette. And it is also possible to indicate a sample that is outside the palette by signaling an escape symbol followed by (possibly quantized) component values. This kind of pixel is called escape pixel. The palette mode is illustrated in FIG. 3. As depicted in FIG. 3, for each pixel with three color components (luma, and two chroma components), an index to the palette is founded, and the block could be reconstructed based on the founded values in the palette.

2.6.2. Coding of the Palette Entries

For coding of the palette entries, a palette predictor is maintained. The maximum size of the palette as well as the palette predictor is signaled in the SPS. In HEVC-SCC, a palette_predictor_initializer_present_flag is introduced in the PPS. When this flag is 1, entries for initializing the palette predictor are signaled in the bitstream. The palette predictor is initialized at the beginning of each CTU row, each slice and each tile. Depending on the value of the palette_predictor_initializer_present_flag, the palette predictor is reset to 0 or initialized using the palette predictor intializer entries signaled in the PPS. In HEVC-SCC, a palette predictor initializer of size 0 was enabled to allow explicit disabling of the palette predictor initialization at the PPS level.

For each entry in the palette predictor, a reuse flag is signaled to indicate whether it is part of the current palette. This is illustrated in FIG. 4. The reuse flags are sent using run-length coding of zeros. After this, the number of new palette entries are signaled using Exponential Golomb (EG) code of order 0, i.e., EG-0. Finally, the component values for the new palette entries are signaled.

2.6.3. Coding of Palette Indices

Figure 5:
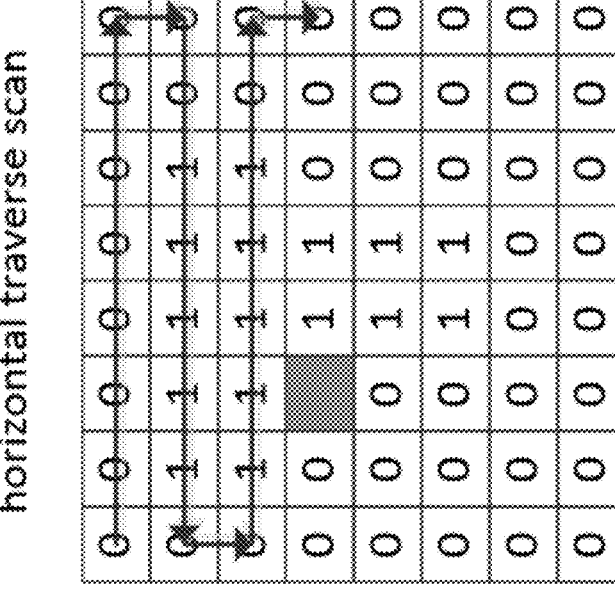
FIG. 5 shows an example of horizontal and vertical traverse scans.

The palette indices are coded using horizontal and vertical traverse scans as shown in FIG. 5. The scan order is explicitly signaled in the bitstream using the palette_transpose_flag. For the rest of the subsection it is assumed that the scan is horizontal.

The palette indices are coded using two palette sample modes: 'COPY_LEFT' and 'COPY_ABOVE'. In the 'COPY_LEFT' mode, the palette index is assigned to a decoded index. In the 'COPY_ABOVE' mode, the palette index of the sample in the row above is copied. For both "COPY_LEFT' and 'COPY_ABOVE' modes, a run value is signaled which specifies the number of subsequent samples that are also coded using the same mode.

Figure 6:
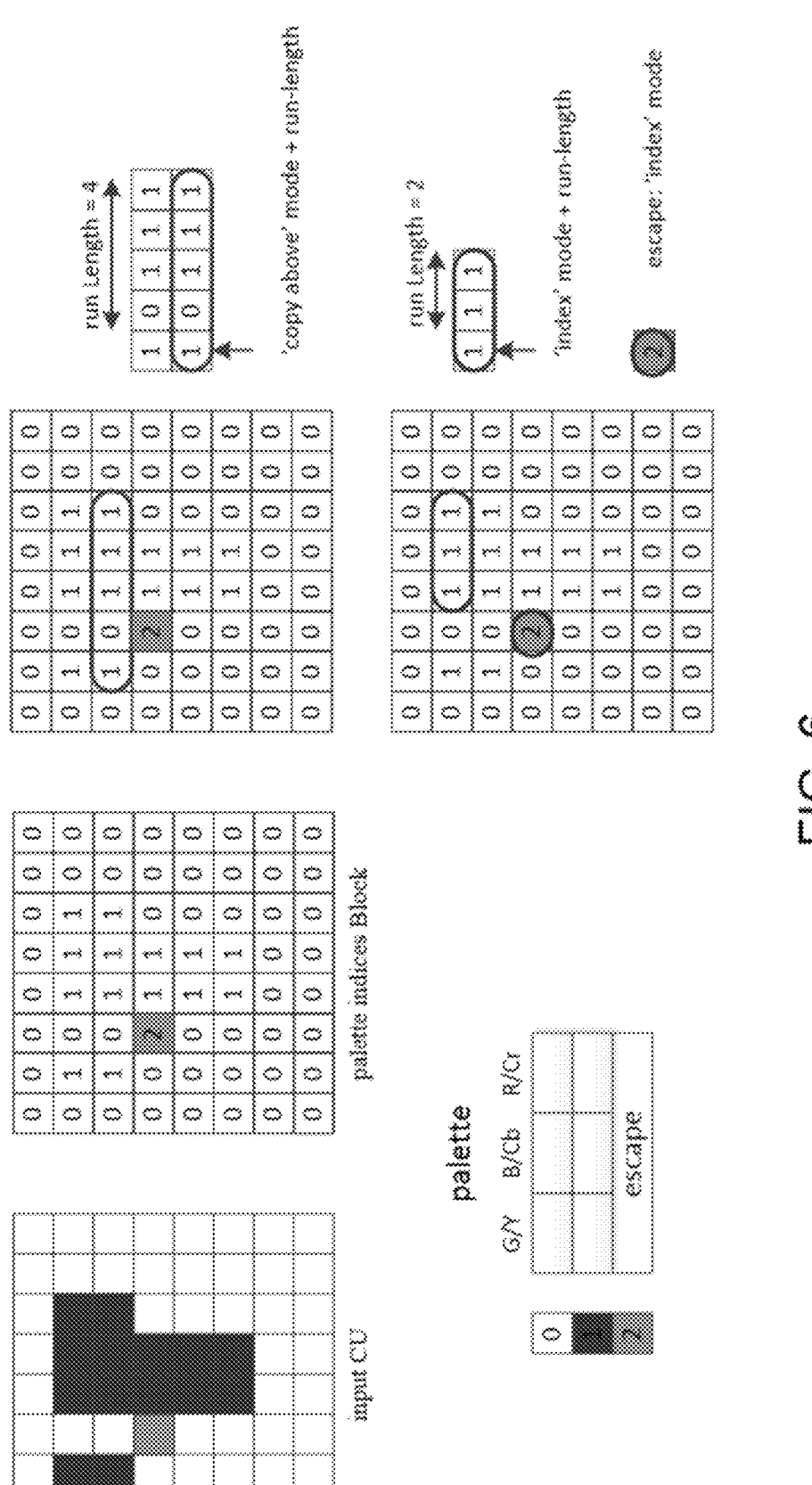
FIG. 6 shows an example of coding of palette indices.

In the palette mode, the value of an index for the escape symbol is the number of palette entries. And, when escape symbol is part of the run in 'COPY_LEFT' or 'COPY_ABOVE' mode, the escape component values are signaled for each escape symbol. The coding of palette indices is illustrated in FIG. 6.

This syntax order is accomplished as follows. First the number of index values for the CU is signaled. This is followed by signaling of the actual index values for the entire CU using truncated binary coding. Both the number of indices as well as the index values are coded in bypass mode. This groups the index-related bypass bins together. Then the palette sample mode (if necessary) and run are signaled in an interleaved manner. Finally, the component escape values corresponding to the escape symbols for the entire CU are grouped together and coded in bypass mode. The binarization of escape symbols is EG coding with 3rd order, i.e., EG-3.

An additional syntax element, last_run_type_flag, is signaled after signaling the index values. This syntax element, in conjunction with the number of indices, eliminates the need to signal the run value corresponding to the last run in the block.

In HEVC-SCC, the palette mode is also enabled for 4:2:2, 4:2:0, and monochrome chroma formats. The signaling of the palette entries and palette indices is almost identical for all the chroma formats. In case of non-monochrome formats, each palette entry consists of 3 components. For the monochrome format, each palette entry consists of a single component. For subsampled chroma directions, the chroma samples are associated with luma sample indices that are divisible by 2. After reconstructing the palette indices for the CU, if a sample has only a single component associated with it, only the first component of the palette entry is used. The only difference in signaling is for the escape component values. For each escape symbol, the number of escape component values signaled may be different depending on the number of components associated with that symbol.

2.6.4. Palette in Dual Tree

In VVC, the dual tree coding structure is used on coding the intra slices, so the luma component and two chroma components may have different palette and palette indices. In addition, the two chroma component shares same palette and palette indices.

2.6.5. Line Based CG Palette Mode

Line based CG palette mode was adopted to VVC. In this method, each CU of palette mode is divided into multiple segments of m samples (m=16 in this test) based on the traverse scan mode. The encoding order for palette run coding in each segment is as follows: For each pixel, 1 context coded bin *run_copy_flag*=0 is signaled indicating if the pixel is of the same mode as the previous pixel, i.e., if the previous scanned pixel and the current pixel are both of run type COPY_ABOVE or if the previous scanned pixel and the current pixel are both of run type INDEX and the same index value. Otherwise, *run_copy_flag*=1 is signaled. If the pixel and the previous pixel are of different mode, one context coded bin *copy_above_palette_indices_flag* is signaled indicating the run type, i.e., INDEX or COPY_ABOVE, of the pixel. Same as the palette mode in VTM6.0, decoder doesn't have to parse run type if the sample is in the first row (horizontal traverse scan) or in the first column (vertical traverse scan) since the INDEX mode is used by default. Also, the decoder does not have to parse run type if the previously parsed run type is COPY_ABOVE. After palette run coding of pixels in one segment, the index values (for INDEX mode) and quantized escape colors are bypass coded and grouped apart from encoding/parsing of context coded bins to improve throughput within each line CG. Since the index value is now coded/parsed after run coding, instead of processed before palette run coding as in VTM, encoder doesn't have to signal the number of index values *num_palette_indices_minus1* and the last run type *copy_above_indices_for_final_run_flag*.

3. Technical Problems Solved by Embodiments and Solutions Described Herein

In some cases, the ACT and luma BDPCM modes can be enabled for one block. However, the chroma BDPCM mode may always be disabled on blocks coded with ACT mode. Therefore, the prediction signal may be derived differently for luma and chroma blocks in the same coding unit, which may be less efficient.

The quantization parameter (QP) of a block may become a minus number when ACT is enabled.

Some designs of ACT may not support lossless coding.

The signaling of usage of ACT may not be block size dependent.

The maximal palette size and the maximal predictor size are fixed numbers, which may limit the flexibility of palette mode.

Escape samples employs Exponential-Golomb (EG) with 3th order as the binarization method, but the binarization for escape samples is not dependent on Quantization Parameter (QP).

4. Technical Solutions

The technical solutions described below should be considered as examples to explain general concepts. These technical solutions should not be interpreted in a narrow way. Furthermore, these technical solutions can be combined in any manner.

In the following description, the term 'block' may represent a video region, such as a coding unit (CU), a prediction unit (PU), and/or a transform unit (TU), which may contain samples in three color components. The term 'BDPCM' is not limited to the design in VVC, but it may present the technologies that coding residuals using different prediction signal generation methods.

In the following description, a video block coded using a joint coding of chroma residuals (JCCR) mode includes signaling only one chroma residual block (e.g., the Cb residual block), and the other chroma residual block (e.g., the Cr residual block) is derived based on the signaled chroma residual block and one or more flags (e.g., at the transform unit level) indicating a specific JCCR mode. As described, the JCCR mode leverages the correlation between the Cb residual and the Cr residual to improve coding efficiency.

Interaction Between ACT and BDPCM (Items 1-4)

1. Whether to enable chroma BDPCM mode may depend on the usage of ACT and/or luma BDPCM mode.
   a. In one example, when ACT is enabled on a block, the indication of the usage of chroma BDPCM mode (e.g. intra_bdpcm_chroma_flag) may be inferred to be the indication of the usage of the luma BDPCM mode (e.g. intra_bdpcm_luma_flag).
      i. In one example, the inferred value of chroma BDPCM mode is defined as (ACT and luma BDPCM modes are enabled? true: false).
         1. In one example, the intra_bdpcm_chroma_flag may be set equal to false when intra_bdpcm_luma_flag is false.
            a. Alternatively, the intra_bdpcm_chroma_flag may be set equal to true when intra_bdpcm_luma_flag is true.
      ii. Alternatively, in one example, the indication of the usage of chroma BDPCM mode may be inferred to be true if the indication of the usage of the luma BDPCM mode and ACT for the block are true.
   b. Alternatively, whether to signal the usage of ACT for a block may be conditionally checked, such as the same BDPCM prediction direction is used for both luma and chroma samples in the block.
      i. Alternatively, furthermore, indication of usage of ACT is signaled after usage of BDPCM modes.
2. When ACT is enabled on a block, the indication of the prediction direction of chroma BDPCM mode (e.g. intra_bdpcm_chroma_dir_flag) may be inferred to be the indication of the prediction direction of the usage of the luma BDPCM mode (e.g. intra_bdpcm_luma_dir_flag).

a. In one example, the inferred value of intra_bdpcm_chroma_dir_flag is defined as (ACT is enabled? intra_bdpcm_luma_dir_flag: 0).
  i. In one example, the indication of the prediction direction of chroma BDPCM mode may be inferred to horizontal if the indication of the prediction direction of the luma BDPCM mode is horizontal.
  ii. Alternatively, in one example, the indication of the prediction direction of chroma BDPCM mode may be inferred to vertical if the indication of the prediction direction of the luma BDPCM mode is vertical.
3. The ACT and BDPCM modes may be exclusively applied.
  a. In one example, when ACT mode is enabled on a block, the BDPCM mode may be disabled on the block.
    i. Alternatively, furthermore, the indication of usage of BDPCM mode may be signaled after the signaling of the indication of usage of ACT mode.
    ii. Alternatively, furthermore, the indication of usage of BDPCM mode may be not signaled and inferred to false (0).
  b. In one example, when BDPCM mode is enabled on a block, the ACT mode may be disabled on the block.
    i. Alternatively, furthermore, the indication of usage of ACT mode may be signaled after the signaling of the indication of usage of BDPCM mode.
    ii. Alternatively, furthermore, the indication of usage of ACT mode may be not signaled and inferred to false (0).
  c. In one example, the BDPCM mode in the above examples may denote luma BDPCM mode and/or chroma BDPCM mode.
4. Inverse ACT may be applied before reverse BDPCM at the decoder.
  a. In one example, ACT may be applied even when luma and chroma BDPCM have a different prediction mode.
  b. Alternatively, at the encoder, forward ACT may be applied after BDPCM.

QP Setting when ACT is Enabled (Item 5)
5. It is proposed to clip the QP when ACT is enabled.
  a. In one example, the clipping function may be defined as (l, h, x), where l is the lowest possible value of the input x and h is the highest possible value of the input x.
    i. In one example, l may be set equal to 0.
    ii. In one example, h may be set equal to 63.
  b. In one example, the QP may be the qP given in Section 2.5.
  c. In one example, the clipping may be performed after the QP adjustment for ACT mode.
  d. In one example, when transform skip is applied, l may be set equal to the minimal allowed QP for transform skip mode.

Palette Mode Related (Item 6-7)
6. The values of maximum allowed palette size and/or maximum allowed predictor size may depend on a coding characteristics. Assume $S_1$ is the maximal palette size (or palette predictor size) associated with a first coding characteristics; and $S_2$ is the maximal palette size (or palette predictor size) associated with a second coding characteristics.
  a. In one example, the coding characteristics may be color component.

i. In one example, the maximum allowed palette size and/or maximum allowed predictor size for different color components may have different values.
    ii. In one example, the values of maximum allowed palette size and/or maximum allowed predictor size for a first color components (e.g., Y in YCbCr, G in RGB) may be different from those for the other two-color components (e.g., Cb and Cr in YCbCr, B and R in RGB) excluding the first color component.
  b. In one example, the coding characteristics may be the quantization parameters (QPs).
    i. In one example, $S_1$ and/or $S_2$ for $QP_1$ may be smaller than the $S_1$ and/or $S_2$ for $QP_2$ if $QP_1$ is greater than $QP_2$
    ii. In one example, the QP may be the slice level QP or block level QP.
  c. In one example, $S_2$ may be greater than or equal to $S_1$.
  d. For a first coding characteristics and a second coding characteristics, indications of maximum palette sizes/palette predictor sizes may be signaled separately or inferred from one to another.
    i. In one example, $S_1$ may be signaled and $S_2$ may be derived based on $S_1$.
      1. In one example, $S_2$ may be inferred to $S_1 - n$.
      2. In one example, $S_2$ may be inferred to $S_1 \gg n$.
      3. In one example, $S_2$ may be inferred to floor $(S_1/n)$, where floor(x) denotes the maximum integer no larger than x.
  e. In one example, $S_1$ and/or $S_2$ may be signaled at a high level (e.g. SPS/PPS/PH/slice header) and adjusted at a lower level (e.g. CU/block).
    i. How to adjust $S_1$ and/or $S_2$ may depend on the coded information.
      1. How to adjust $S_1$ and/or $S_2$ may depend on the current QP.
        a. In one example, the $S_1$ and/or $S_2$ may be reduced if the current QP is increased.
      2. How to adjust $S_1$ and/or $S_2$ may depend on block dimension.
        a. In one example, the $S_1$ and/or $S_2$ may be increased if the current blocks size is increased.
  f. $S_1$ and/or $S_2$ may be dependent on whether LMCS is used.
7. The parameters associated with a binarization method for escape samples/pixels may depend on coded information, e.g., the quantization parameters (QPs).
  a. In one example, EG binarization method may be utilized, and the order of the EG binarization, denoted by k, may be dependent on the coded information.
    i. In one example, k may be reduced when the current QP is increased.

Signaling of ACT Mode (Item 8-10)
8. Indications of the allowed maximum and/or minimum ACT size may be signaled in sequence/video/slice/tile/subpicture/brick/other video processing unit level or derived based on coded information.
  a. In one example, they may be signaled in SPS/PPS/Picture header/slice header.
  b. In one example, they may be conditionally signaled, such as according to the ACT is enabled.
  c. In one example, N-level of allowed maximum and/or minimum ACT size may be signaled/defined, e.g., N=2.

i. In one example, the allowed maximum and/or minimum ACT size may be set to either K0 or K1 (e.g., K0=64, K1=32).

ii. Alternatively, furthermore, indication of the level may be signaled, e.g., when N=2, a flag may be signaled.

d. In one example, indications of the differences between the allowed maximum and/or minimum ACT size and the allowed maximum and/or minimum transform (or transform skip) sizes (e.g., for the luma component) may be signaled.

e. In one example, the allowed maximum and/or minimum ACT size may be derived from the allowed maximum and/or minimum (or transform skip) sizes (e.g., for the luma component).

f. Alternatively, furthermore, whether to and/or how to signal indications of ACT usage and other side information related to ACT may be dependent on the allowed maximum and/or minimum.

9. When a block is greater than the allowed maximum ACT size (or allowed maximum transform size), the block may be automatically split to multiple sub-blocks wherein all sub-blocks share the same prediction mode (e.g., all of them are intra coded), and the ACT may be enabled in the sub-block level, instead of the block level.

10. The indication of the usage of ACT mode may be conditionally signaled based on the block dimensions (e.g., block width and/or height, block width times height, ratios between block width and height, maximum/minimum values of block width and height) and/or maximally allowed ACT sizes.

a. In one example, the indication of the usage of ACT mode may be signaled when certain conditions, e.g., according to block dimension, are satisfied.

i. In one example, the conditions are if the current block width is smaller than or equal to m and/or the current block height is smaller than or equal to n.

ii. In one example, the conditions are if the current block width times height is smaller than or no larger than m.

iii. In one example, the conditions are if the current block width times height is larger than or no smaller than m.

b. Alternatively, in one example, the indication of the usage of ACT mode may be not signaled when certain conditions, e.g., according to block dimension, are NOT satisfied.

i. In one example, the conditions are if the current block width is larger than m and/or the current block height is larger than n.

ii. In one example, the conditions are if the current block width times height is smaller than or no larger than m.

iii. In one example, the conditions are if the current block width times height is larger than or no smaller than m.

iv. Alternatively, furthermore, the indication of the usage of ACT mode may be inferred to 0.

c. In above examples, the variables m, n may be pre-defined (e.g., 4, 64, 128), or signaled, or derived on-the-fly.

i. In one example, m and/or n may be derived based on a decoded message in the SPS/PPS/APS/CTU row/group of CTUs/CU/block.

1. In one example, m and/or n may be set equal to the maximally allowed transform size (e.g. MaxTbSizeY).

Signaling of Constraint Flags in General Constraint Information Syntax (Item 11-16)

The constraint flags below may be signaled in a video unit other than SPS. For example, they may be signaled in the general constraint information syntax specified in JVET-P2001-vE.

11. It is proposed to have a constraint flag to specify whether the SPS ACT enabling flag (e.g., sps_act_enabled_flag) may be equal to 0.

a. In one example, the flag may be denoted as no_act_constraint_flag i. When this flag is equal to 1, the SPS ACT enabling flag (e.g., sps_act_enabled_flag) may be equal to 0.

ii. When this flag is equal to 0, it does not impose such a constraint.

12. It is proposed to have a constraint flag to specify whether the SPS BDPCM enabling flag (e.g., sps_bdpcm_enabled_flag) may be equal to 0.

a. In one example, the flag may be denoted as no_bdpcm_constraint_flag.

i. When this flag is equal to 1, the SPS BDPCM enabling flag (e.g., sps_bdpcm_enabled_flag) may be equal to 0.

ii. When this flag is equal to 0, it does not impose such a constraint.

13. It is proposed to have a constraint flag to specify whether the SPS chroma BDPCM enabling flag (e.g., sps_bdpcm_chroma_enabled_flag) may be equal to 0.

a. In one example, the flag may be denoted as no_bdpcm_chroma_constraint_flag.

i. When this flag is equal to 1, the SPS chroma BDPCM enabling flag (e.g., sps_bdpcm_chroma_enabled_flag) may be equal to 0.

ii. When this flag is equal to 0, it does not impose such a constraint.

14. It is proposed to have a constraint flag to specify whether the SPS palette enabling flag (e.g., sps_palette_enabled_flag) may be equal to 0.

a. In one example, the flag may be denoted as no_palette_constraint_flag.

i. When this flag is equal to 1, the SPS palette enabling flag (e.g. sps_palette_enabled_flag) may be equal to 0.

ii. When this flag is equal to 0, it does not impose such a constraint.

15. It is proposed to have a constraint flag to specify whether the SPS RPR enabling flag (e.g., ref_pic_resampling_enabled_flag) may be equal to 0.

a. In one example, the flag may be denoted as no_ref_pic_resampling_constraint_flag.

i. When this flag is equal to 1, the SPS RPR enabling flag (e.g. ref_pic_resampling_enabled_flag) may be equal to 0.

ii. When this flag is equal to 0, it does not impose such a constraint.

16. In above examples (bullet 11-15), such constraint flags may be conditionally signaled, e.g., according to chroma format (e.g., chroma_format_idc) and/or separate plane coding or ChromaArrayType.

ACT QP Offset (Item 17-19)

17. It is proposed that ACT offsets may be applied after applying other chroma offsets (e.g., those in PPS and/or picture header (PH) and/or slice header (SH)) when ACT is applied on a block.

18. It is proposed to have PPS and/or PH offsets other than −5 for JCbCr mode 2 when YCgCo color transform is applied on a block.
   a. In one example, the offset may be other than −5.
   b. In one example, the offset may be indicated in PPS (e.g., as pps_act_cbcr_qp_offset_plus6) and the offset may be set as pps_act_cbcr_qp_offset_plus6−6.
   c. In one example, the offset may be indicated in PPS (e.g., as pps_act_cbcr_qp_offset_plus7) and the offset may be set as pps_act_cbcr_qp_offset_plus7−7.

19. It is proposed to have PPS and/or PH offsets other than 1 for JCbCr mode 2 when YCgCo-R is applied on a block.
   a. In one example, the offset may be other than −1.
   b. In one example, the offset may be indicated in PPS (e.g., as pps_act_cbcr_qp_offset) and the offset may be set as pps_act_cbcr_qp_offset.
   c. In one example, the offset may be indicated in PPS (e.g., as pps_act_cbcr_qp_offset_plus1) and the offset may be set as pps_act_cbcr_qp_offset_plus1−1.

20. It is proposed that when JCCR is used, the QP offset for ACT with YCgCo transform, denoted as act_qp_offset, may depend on JCCR mode.
   a. In one example, when JCCR mode is 1, act_qp_offset may be −5.
      i. Alternatively, in one example, when JCCR mode is 1, act_qp_offset may be −6.
   b. In one example, when JCCR mode is 2, act_qp_offset may be −7.
      i. Alternatively, in one example, when JCCR mode is 2, act_qp_offset may be (−7−pps_joint_cbcr_qp_offset−slice_joint_cbcr_qp_offset).
      ii. Alternatively, in one example, when JCCR mode is 2, act_qp_offset may be (−7+pps_joint_cbcr_qp_offset+slice_joint_cbcr_qp_offset).
   c. In one example, when JCCR mode is 3, the ACT offset may be −4.
      i. Alternatively, in one example, when JCCR mode is 3, the ACT offset may be −5.

21. It is proposed that when JCCR is used, the QP offset for ACT with YCgCo-R transform, denoted as act_qp_offset, may depend on JCCR mode.
   a. In one example, when JCCR mode is 1, act_qp_offset may be 1.
      i. Alternatively, in one example, when JCCR mode is 1, act_qp_offset may be 0.
   b. In one example, when JCCR mode is 2, act_qp_offset may be −1.
      i. Alternatively, in one example, when JCCR mode is 2, act_qp_offset may be (−1−pps_joint_cbcr_qp_offset−slice_joint_cbcr_qp_offset).
      ii. Alternatively, in one example, when JCCR mode is 2, act_qp_offset may be (−1+pps_joint_cbcr_qp_offset+slice_joint_cbcr_qp_offset).
   c. In one example, when JCCR mode is 3, the ACT offset may be 2.
      i. Alternatively, in one example, when JCCR mode is 3, the ACT offset may be 1.

22. Whether to signal the QP offsets for ACT and JCCR coded blocks (e.g., slice_act_cbcr_qp_offset) may depend on the condition check of whether JCCR is enabled.
   a. Alternatively, furthermore, the indication of whether QP offsets for ACT and JCCR coded blocks are present (e.g., pps_joint_cbcr_qp_offset_present_flag/pps_slice_cbcr_qp_offset_present_flag) may depend on the condition check of whether JCCR is enabled.

23. How to derive/signal delta QPs may depend on the coded information, such as coded mode, usage of a coding tool.
   a. In one example, how to derive/signal delta QPs may depend on usage of ACT for current block and/or previously coded blocks (e.g., above and left neighboring blocks).
   b. In one example, the derivation and/or signaling of delta QPs may depend on whether the current block and previously coded blocks used for QP predictor derivation share the same coded mode or enabling/disabling status of a coding tool (e.g., ACT).
   c. In one example, for a current block coded with coding tool X (e.g., ACT/Transform Skip), the QP predictor derivation process may be different from other blocks with X being disabled.
      i. In one example, the QP predictor for a current block coded with coding tool X may be derived from those blocks with coding tool X being enabled.
      ii. In one example, the QP predictor for a current block coded without coding tool X may be derived from those blocks with coding tool X being disabled.

24. How to signal the QP offsets in PPS may be independent from the SPS.
   a. Alternatively, furthermore, an indication of color format and/or an indication of enabling of ACT may be signaled in PPS.
      i. Alternatively, furthermore, the QP offsets may be signaled under the condition check of the indications.

25. Whether to signal the QP offsets (e.g., applied to ACT coded blocks) in a 1st level (e.g., picture level)
   a. It is proposed that if the QP offsets (e.g., applied to ACT coded blocks) are present in a 2nd level (e.g., slice level), the signaling of the QP offsets in a 1st level is skipped.

26. QPs mentioned in above examples may also be present in picture/slice/tile/subpicture level (e.g., picture header/PPS/slice header).

27. Overwriting mechanism may be used for signaling QP offsets may be utilized. That is, the QP offsets may be signaled in a 1st level (e.g., PPS), but overwritten in a 2nd level (e.g., Picture Header).
   a. Alternatively, furthermore, a flag may be signaled in the 1st level or 2nd level to indicate whether overwriting is enabled.
   b. Alternatively, when overwriting is enabled, there may be no need to signal the related information in the 1st level.
      i. In one example, the QP offsets (e.g., applied to ACT coded blocks) may not be signaled in the 1st level (e.g., PPS) if overwritten is applied for a 2nd level (e.g., slice).

c. Alternatively, furthermore, differences of QP offsets between the 1st and 2nd level may be signaled in the 2nd level.

General Techniques ((Items 20-21)

28. In the above examples, $S_1$, $S_2$, l, h, m, n and/or k are integer numbers and may depend on
   a. A message signaled in the decoding parameter set (DPS)/SPS/video parameter set (VPS)/PPS/adaption parameter set (APS)/picture header/slice header/tile group header/Largest coding unit (LCU)/Coding unit (CU)/LCU row/group of LCUs/TU/PU block/Video coding unit
   b. Position of CU/PU/TU/block/Video coding unit
   c. Coded modes of blocks containing the samples along the edges
   d. Transform matrices applied to the blocks containing the samples along the edges
   e. Block dimension/Block shape of current block and/or its neighboring blocks
   f. Indication of the colour format (such as 4:2:0, 4:4:4, RGB or YUV)
   g. Coding tree structure (such as dual tree or single tree)
   h. Slice/tile group type and/or picture type
   i. Colour component (e.g. may be only applied on Cb or Cr)
   j. Temporal layer ID
   k. Profiles/Levels/Tiers of a standard
   l. Alternatively, $S_1$, $S_2$, l, h, m, n and/or k may be signaled to the decoder.

29. The above proposed methods may be applied under certain conditions.
   a. In one example, the condition is the colour format is 4:2:0 and/or 4:2:2.
   b. In one example, indication of usage of the above methods may be signaled in sequence/picture/slice/tile/brick/a video region-level, such as SPS/PPS/picture header/slice header.
   c. In one example, the usage of above methods may depend on i. Video contents (e.g. screen contents or natural contents)
   ii. A message signaled in the DPS/SPS/VPS/PPS/APS/picture header/slice header/tile group header/Largest coding unit (LCU)/Coding unit (CU)/LCU row/group of LCUs/TU/PU block/Video coding unit
   iii. Position of CU/PU/TU/block/Video coding unit
   iv. Coded modes of blocks containing the samples along the edges
   v. Transform matrices applied to the blocks containing the samples along the edges
   vi. Block dimension of current block and/or its neighboring blocks
   vii. Block shape of current block and/or its neighboring blocks
   viii. Indication of the colour format (such as 4:2:0, 4:4:4, RGB or YUV)
   ix. Coding tree structure (such as dual tree or single tree)
   x. Slice/tile group type and/or picture type
   xi. Colour component (e.g. may be only applied on Cb or Cr)
   xii. Temporal layer ID
   xiii. Profiles/Levels/Tiers of a standard
   xiv. Alternatively, m and/or n may be signaled to the decoder.

5. Embodiments

The embodiments are based on JVET-P2001-vE. The newly added texts are highlight by _bold italicized underlined text_. The deleted texts are marked by italicized text.

5.1. Embodiment #1

This embodiment is related to interaction between ACT and BDPCM modes.

| | Descriptor |
|---|---|
| coding_unit( x0, y0, cbWidth, cbHeight, cqtDepth, treeType, modeType ) { | |
|   chType = treeType = = DUAL_TREE_CHROMA ? 1 : 0 | |
|   ... | |
|   if( CuPredMode[ chType ][ x0 ][ y0 ] == MODE_INTRA && sps_palette_enabled_flag && | |
|     cbWidth <= 64 && cbHeight <= 64 && cu_skip_flag[ x0 ][ y0 ] == 0 | |
|   && | |
|     modeType != MODE_TYPE_INTER ) | |
|     pred_mode_plt_flag | ae(v) |
|   } | |
|   if( CuPredMode[ chType ][ x0 ][ y0 ] == MODE_INTRA && sps_act_enabled_flag && | |
|     treeType == SINGLE_TREE ) | |
|     cu_act_enabled_flag | ae(v) |
|   if( CuPredMode[ chType ][ x0 ][ y0 ] == MODE_INTRA \| \| | |
|     CuPredMode[ chType ][ x0 ][ y0 ] = = MODE_PLT ) { | |
|     if( treeType = = SINGLE_TREE \| \| treeType = = DUAL_TREE_LUMA ) { | |
|       if( pred_mode_plt_flag ) { | |
|         palette_coding( x0, y0, cbWidth, cbHeight, treeType ) | |
|       } else { | |
|         if(sps_bdpcm_enabled_flag && | |
|           cbWidth <= MaxTsSize && cbHeight <= MaxTsSize && | |
|      _**!cu_act_enabled_flag**_ | |
|         intra_bdpcm_luma_flag | ae(v) |
|         if( intra_bdpcm_luma_flag ) | |

-continued

| | Descriptor |
|---|---|
| intra_bdpcm_luma_dir_flag | ae(v) |
|     else { | |
|       ... | |
|         } | |
|       } | |
|     } | |
| ... | |
| } | |

5.2. Embodiment #2

This embodiment is related to interaction between ACT and BDPCM modes.

intra_bdpcm_chroma_flag equal to 1 specifies that BDPCM is applied to the current chroma coding blocks at the location (x0, y0), i.e. the transform is skipped, the intra chroma prediction mode is specified by intra_bdpcm_chroma_dir_flag. intra_bdpcm_chroma_flag equal to 0 specifies that BDPCM is not applied to the current chroma coding blocks at the location (x0, y0).

When intra_bdpcm_chroma_flag is not present _and cu_act_enabled_flag is false_, it is inferred to be equal to 0.

_When intra_bdpcm_chroma_flag is not present and cu_act_enabled_flag is true_, _it is inferred to be equal to intra_bdpcm_luma_flag_.

The variable BdpcmFlag[x][y][cIdx] is set equal to intra_bdpcm_chroma_flag for x=x0 . . . x0+cbWidth−1, y=y0 . . . y0+cbHeight−1 and cIdx=1 . . . 2.

intra_bdpcm_chroma_dir_flag equal to 0 specifies that the BDPCM prediction direction is horizontal. intra_bdpcm_chroma_dir_flag equal to 1 specifies that the BDPCM prediction direction is vertical.

_When cu_act_enabled_flag is true_, _intra_bdpcm_chroma_dir_flag is set equal to intra_bdpcm_luma_dir_flag_.

The variable BdpcmDir[x][y][cIdx] is set equal to intra_bdpcm_chroma_dir_flag for x=x0 . . . x0+cbWidth−1, y=y0 . . . y0+cbHeight−1 and cIdx=1 . . . 2.

5.3. Embodiment #3

This embodiment is related to QP setting.

8.7.3 Scaling Process for Transform Coefficients

Inputs to this process are:

a luma location (xTbY, yTbY) specifying the top-left sample of the current luma transform block relative to the top-left luma sample of the current picture, a variable nTbW specifying the transform block width, a variable nTbH specifying the transform block height, a variable predMode specifying the prediction mode of the coding unit, a variable cIdx specifying the colour component of the current block.

Output of this process is the (nTbW)×(nTbH) array d of scaled transform coefficients with elements d[x][y].

. . . .

The quantization parameter qP is modified and the variables rectNonTsFlag and bdShift are derived as follows:

If transform_skip_flag[xTbY][yTbY][cIdx] is equal to 0, the following applies:

$$qP = qP - (cu\_act\_enabled\_flag[xTbY][yTbY]?5:0) \quad (1133)$$

$$qP = Clip3(\ 0\ ,\ 63,\ qP)$$

$$rectNonTsFlag = (((Log\ 2(nTbW) + Log\ 2(nTbH)) \& 1) == 1)?1:0 \quad (1134)$$

$$bdShift = BitDepth + rectNonTsFlag + ((Log\ 2(nTbW) + Log\ 2(nTbH))/2) - 5 + pic\_dep\_quant\_enabled\_flag \quad (1135)$$

Otherwise (transform_skip_flag[xTbY][yTbY][cIdx] is equal to 1), the following applies:

$$qP = Max(QpPrimeTs\ Min,qP) - (cu\_act\_enabled\_flag[xTbY][yTbY]?5:0) \quad (1136)$$

$$qP = Max(\ QpPrimeTsMin,\ qP - (\ cu\_act\_enabled\_flag[xTbY][yTbY]\ ?\ 5\ :\ 0\ ))$$

$$rectNonTsFlag = 0 \quad (1137)$$

$$bdShift = 10 \quad (1138)$$

. . . .

5.4. Embodiment #4

8.7.1 Derivation Process for Quantization Parameters

. . .

The chroma quantization parameters for the Cb and Cr components, Qp′Cb and Qp′Cr, and joint Cb-Cr coding Qp′CbCr are derived as follows:

$$Qp'Cb = Clip3(-QpBdOffset,63,qPCb + pps\_cb\_qp\_offset + slice\_cb\_qp\_offset + CuQpOffsetCb) + QpBdOffset \quad (1122)$$

$$Qp'Cr = Clip3(-QpBdOffset,63,qPCr + pps\_cr\_qp\_offset + slice\_cr\_qp\_offset + CuQpOffsetCr) + QpBdOffset \quad (1123)$$

$$Qp'CbCr = Clip3(-QpBdOffset,63,qPCbCr + pps\_joint\_cbcr\_qp\_offset + slice\_joint\_cbcr\_qp\_offset + CuQpOffsetCbCr) + QpBdOffset \quad (1124)$$

5.5. Embodiment #5

7.3.9.5 Coding Unit Syntax

| | Descriptor |
|---|---|
| coding_unit( x0, y0, cbWidth, cbHeight, cqtDepth, treeType, modeType ) { | |
|   chType = treeType = = DUAL_TREE_CHROMA ? 1 : 0 | |
|   ... | |

-continued

| | Descriptor |
|---|---|
| if( CuPredMode[ chType ][ x0 ][ y0 ] == MODE_INTRA &&<br>sps_act_enabled_flag &&<br> treeType = = SINGLE_TREE ***&& cbWidth <= K0 && cbHeight <= K1*)*<br> cu_act_enabled_flag<br>...<br>if( cu_cbf) {<br> if( sps_act_enabled_flag && CuPredMode[ chType ][ x0 ][ y0 ] ! =<br>MODE_INTRA&&<br> treeType = = SINGLE_TREE *&& cbWidth <= K0 && cbHeight <= K1*<br> cu_act_enabled_flag**<br>...<br> }<br>} | ae(v)<br><br><br><br><br><br><br>ae(v) |

*K0 and K1 are set equal to 32.*

5.6. Embodiment #6

7.3.9.5 Coding Unit Syntax

| | Descriptor |
|---|---|
| coding_unit( x0, y0, cbWidth, cbHeight, cqtDepth, treeType, modeType ) {<br> chType = treeType = = DUAL TREE CHROMA ? 1 : 0<br>...<br> if( CuPredMode[ chType ][ x0 ][ y0 ] == MODE_INTRA &&<br>sps_act_enabled_flag &&<br> treeType = = SINGLETREE *&& cbWidth <= MaxTbSizeY && cbHeight*<br>***<=*<br>*MaxTbSizeY***<br> cu_act_enabled_flag<br>...<br> if( cu_cbf) {<br> if( sps_act_enabled_flag && CuPredMode[ chType ][ x0 ][ y0 ] !=<br>MODE_INTRA &&<br> treeType = = SINGLE TREE<br>*&& cbWidth <= MaxTbSizeY && cbHeight* ***<=*<br>*MaxTbSizeY***<br> cu_act_enabled_flag<br>...<br> }<br>} | <br><br><br><br><br><br><br>ae(v)<br><br><br><br><br><br><br>ae(v) |

5.7. Embodiment #7

8.7.3 Scaling Process for Transform Coefficients

Inputs to this process are:
- a luma location (xTbY, yTbY) specifying the top-left sample of the current luma transform block relative to the top-left luma sample of the current picture,
- a variable nTbW specifying the transform block width,
- a variable nTbH specifying the transform block height,
- a variable predMode specifying the prediction mode of the coding unit,
- a variable cIdx specifying the colour component of the current block.

Output of this process is the (nTbW)×(nTbH) array d of scaled transform coefficients with elements d[x][y].

If cIdx is equal to 0, the following applies:

*ActQPoffset = -5*

$$qP=Qp'_Y \qquad (1129)$$

Otherwise, if TuCResMode[xTbY][yTbY] is equal to 2, the following applies:

*ActQPoffset = -6*

$$qP=Qp'_{CbCr} \qquad (1130)$$

Otherwise, if cIdx is equal to 1, the following applies:

*ActQPoffset = -5*

$$qP=Qp'_{Cb} \qquad (1131)$$

Otherwise (cIdx is equal to 2), the following applies:

*ActQPoffset = -3*

$$qP=Qp'_{Cr} \qquad (1132)$$

The quantization parameter qP is modified and the variables rectNonTsFlag and bdShift are derived as follows:

If transform_skip_flag[xTbY][yTbY][cIdx] is equal to 0, the following applies:

$$qP=qP-(cu\_act\_enabled\_flag[xTbY][yTbY]?5:0) \qquad (1133)$$

$$\textit{qP = Max(0, qP − (cu\_act\_enabled}$$
$$\textit{flag[ xTbY ][ yTbY ] ? ActQPoffset : 0))}$$

$$rectNonTsFlag=(((Log\ 2(nTbW)+Log\ 2(nTbH))\&1)==1)?1:0 \qquad (1134)$$

$$bdShift=BitDepth+rectNonTsFlag+((Log\ 2(nTbW)+Log\ 2(nTbH))/2)-5+pic\_dep\_quant\_enabled\_flag \qquad (1135)$$

Otherwise (transform_skip_flag[xTbY][yTbY][cIdx] is equal to 1), the following applies:

$$qP=\text{Max(QpPrime}Ts\text{ Min,qP)}-(cu\_act\_enabled\_flag[xTbY][yTbY]?5:0) \quad (1136)$$

*$qP = Max( QpPrimeTsMin, qP - (cu\_act\_enabled\_flag[ xTbY ][ yTbY ] ? ActQPoffset : 0))$*

$$rectNonTsFlag=0 \quad (1137)$$

$$bdShift=10 \quad (1138)$$

The variable bdOffset is derived as follows:

$$bdOffset=(1<<bdShift)>>1 \quad (1139)$$

The list levelScale[ ][ ] is specified as levelScale[j][k]={{40, 45, 51, 57, 64, 72}, {57, 64, 72, 80, 90, 102}} with j=0 . . . 1, k=0 . . . 5.

. . . .

5.8. Embodiment #8

8.7.3 Scaling Process for Transform Coefficients
Inputs to this process are:
    a luma location (xTbY, yTbY) specifying the top-left sample of the current luma transform block relative to the top-left luma sample of the current picture,
    a variable nTbW specifying the transform block width,
    a variable nTbH specifying the transform block height,
    a variable predMode specifying the prediction mode of the coding unit,
    a variable cIdx specifying the colour component of the current block.
Output of this process is the (nTbW)×(nTbH) array d of scaled transform coefficients with elements d[x][y].
    If cIdx is equal to 0, the following applies:

$$qP=Qp'_Y \quad (1129)$$

*$qP = Max(0, Qp'Y - (cu\_act\_enabled\_flag[ xTbY ][ yTbY ] ? -5 : 0))$*

Otherwise, if TuCResMode[xTbY][yTbY] is equal to 2, the following applies:
    – *If cu_act_enabled_flag[ xTbY ][ yTbY ] is equal to 1 , the following applies:*
    *$qP = Clip3( -QpBdOffset, 63 , qPCbCr - 7 + CuQpOffsetCbCr ) + QpBdOffset$*

– *Otherwise*

$$qP=Qp'_{CbCr} \quad (1130)$$

Otherwise, if cIdx is equal to 1, the following applies:
    - *If cu act enabled flag[ xTbY ][ yTbY ] ? is equal to 1 , the following applies:*
    *$qP = Clip3( -QpBdOffset, 63, qPCb - 5 + CuQpOffsetCb ) + QpBdOffset$*

- *Otherwise*

$$qP=Qp'_{Cb} \quad (1131)$$

Otherwise (cIdx is equal to 2), the following applies:
    - *If cu act enabled flag[ xTbY ][ yTbY ] is equal to 1 , the following applies:*
    *$qPCr - 3 +CuQpOffsetCr ) + QpBdOffset$*
    *$qPCr - 3 +CuQpOffsetCr ) + QpBdOffset$*

- *Otherwise*

$$qP=Qp'_{Cr} \quad (1132)$$

The quantization parameter qP is modified and the variables rectNonTsFlag and bdShift are derived as follows:
    If transform_skip_flag[xTbY][yTbY][cIdx] is equal to 0, the following applies:

$$qP=qP-(cu\_act\_enabled\_flag[xTbY][yTbY]?5:0) \quad (1133)$$

$$rectNonTsFlag=(((Log\ 2(nTbW)+Log\ 2(nTbH))\&1)==1)?1:0 \quad (1134)$$

$$bdShift=BitDepth+rectNonTsFlag+((Log\ 2(nTbW)+Log\ 2(nTbH))/2)-5+pic\_dep\_quant\_enabled\_flag \quad (1135)$$

Otherwise (transform_skip_flag[xTbY][yTbY][cIdx] is equal to 1), the following applies:

$$qP=\text{Max(QpPrime}Ts\text{ Min,qP)}-(cu\_act\_enabled\_flag[xTbY][yTbY]?5:0) \quad (1136)$$

*$qP = Max( QpPrimeTsMin, qP )$*

$$rectNonTsFlag=0 \quad (1137)$$

$$bdShift=10 \quad (1138)$$

The variable bdOffset is derived as follows:

$$bdOffset=(1<<bdShift)>>1 \quad (1139)$$

The list levelScale[ ][ ] is specified as levelScale[j][k]={{40, 45, 51, 57, 64, 72}, {57, 64, 72, 80, 90, 102}} with j=0 . . . 1, k=0 . . . 5.

. . . .

5.9. Embodiment #9

7.4.3.4 Picture Parameter Set RBSP Semantics
*pps_act_y_qp_offset_plus5 , pps_act_cb_qp_offset_plus5, pps_act_cr_qp_offset_plus3 and pps_act_jcbcr_qp_offset_plus6 are used to determine the offsets that are applied to the quantization parameter values qP derived in clause 8.6.2 for the luma, Cb and Cr components, respectively, when tu_residual_act_flag[ xTbY ][ yTbY ] is equal to 1. When not present, the values of pps_act_y_qp_offset_plus5, pps_act_cb_qp_offset_plus5 and pps_act_cr_qp_offset_plus3 are inferred to be equal to 0 . The varibale PpsActQpOffsetY is set equal to pps_act_y_qp_offset_plus5 - 5 . The variable PpsActQpOffsetCb is set equal to pps_act_cb_cb_qp_offset_plus5 - 5 The variable PpsActQpOffsetCr is set equal to pps_act_cb_qp_offset_plus3 - 3 The variable PpsActQpOffsetCbCr is set equal to pps_act_cb_qp_offset_plus6 - 6 .*

8.7.3 Scaling Process for Transform Coefficients

Inputs to this process are:

a luma location (xTbY, yTbY) specifying the top-left sample of the current luma transform block relative to the top-left luma sample of the current picture, a variable nTbW specifying the transform block width, a variable nTbH specifying the transform block height, a variable predMode specifying the prediction mode of the coding unit, a variable cIdx specifying the colour component of the current block.

Output of this process is the (nTbW)×(nTbH) array d of scaled transform coefficients with elements d[x][y].

If cIdx is equal to 0, the following applies:

*ActQPoffset = PpsActQpOffsetY*

$qP=Qp'_Y$      (1129)

Otherwise, if TuCResMode[xTbY][yTbY] is equal to 2, the following applies:

*ActQPoffset = PpsActQpOffsetCbCr*

$qP=Qp'_{CbCr}$      (1130)

Otherwise, if cIdx is equal to 1, the following applies:

*ActQPoffset = PpsActQpOffsetCb*

$qP=Qp'_{Cb}$      (1131)

Otherwise (cIdx is equal to 2), the following applies:

*ActQPoffset = PpsActQpOffsetCr*

$qP=Qp'_{Cr}$      (1132)

The quantization parameter qP is modified and the variables rectNonTsFlag and bdShift are derived as follows:

If transform_skip_flag[xTbY][yTbY][cIdx] is equal to 0, the following applies:

qP=qP−(*cu*_act_enabled_flag[*xTbY*][*yTbY*]?5:0)      (1133)

*qP = Max(0,*
    *qP - (cu_act_enabled_flag[ xTbY ][ yTbY ] ?*
    *ActQPoffset : 0))* rectNon*Ts*Flag=(((Log 2(*nTbW*)+Log 2(*nTbH*))&1)
  ==1)?1:0      (1134)

*bd*Shift=BitDepth+rectNon*Ts*Flag+((Log 2(*nTbW*)+
  Log 2(*nTbH*))/2)−5+pic_dep_quant_enabled-
  _flag      (1135)

Otherwise (transform_skip_flag[xTbY][yTbY][cIdx] is equal to 1), the following applies:

qP=Max(QpPrime*Ts* Min,qP)−(*cu*_act_enabled_flag
  [*xTbY*][*yTbY*]?5:0)      (1136)

*qP = Max( QpPrimeTsMin ,*
    *qP - (cu_act_enabled_flag[ xTbY ][ yTbY ] ?*
    *ActQPoffset : 0))* rectNon*Ts*Flag=0      (1137)

*bd*Shift=10      (1138)

The variable bdOffset is derived as follows:

*bd*Offset=(1<<*bd*Shift)>>1      (1139)

The list levelScale[ ][ ] is specified as levelScale[j][k]={{40, 45, 51, 57, 64, 72}, {57, 64, 72, 80, 90, 102}} with j=0 . . . 1, k=0 . . . 5.

5.10. Embodiment #10

7.4.3.4 Picture Parameter Set RBSP Semantics

*pps_act_y_qp_offset_plus5* ,
*pps_act_cb_qp_offset_plus5* ,
*pps_act_cr_qp_offset_plus3 and*
*pps_act_jcbcr_qp_offset_plus7*
*are used to determine the offsets that are applied to the*
*quantization parameter values qP derived in clause 8.6.2 for the luma* ,
*Cb and Cr components* , *respectively* , *when tu residual act flag[ xTbY ][*
*yTbY ] is equal to* . *When not present* , *the values of pps*
*act_y_qp_offset_plus5* , *pps_act_cb_qp_offset_plus5 and*
*pps_act_cr_qp_offset_plus3* *are inferred to be equal to 0*.
*The variable PpsActQpOffsetY is*
 *set equal to pps_act_y_qp_offset_plus5 − 5*.
*The variable PpsActQpOffsetCb is*
 *set equal to pps_act_cb_qp_offset_plus5 − 5*.
*The variable PpsActQpOffsetCr*
*is set equal to pps_act_cb_qp_offset_plus3 − 3*.
*The variable PpsActQpOffsetCbCr*
*is set equal to pps_act_cb_qp_offset_plus7 − 7*.

8.7.3 Scaling Process for Transform Coefficients

Inputs to this process are:

a luma location (xTbY, yTbY) specifying the top-left sample of the current luma transform block relative to the top-left luma sample of the current picture, a variable nTbW specifying the transform block width, a variable nTbH specifying the transform block height, a variable predMode specifying the prediction mode of the coding unit, a variable cIdx specifying the colour component of the current block.

Output of this process is the (nTbW)×(nTbH) array d of scaled transform coefficients with elements d[x][y].

If cIdx is equal to 0, the following applies:

$qP=Qp'Y$      (1129)

*qP = Max(0, Qp'Y − (cu_act_enabled_flag[*
   *xTbY ][ yTbY ] ? PpsActQpOffsetY : 0))*

Otherwise, if TuCResMode[xTbY][yTbY] is equal to 2, the following applies:

− *If cu_act_enabled_flag[ xTbY ][ yTbY ]*
   *is equal to 1, the following applies:*
   *CuQpOffsetCbCr ) + QpBdOffset Cr    +*

− *Otherwise*

$qP=Qp'_{CbCr}$      (1130)

Otherwise, if cIdx is equal to 1, the following applies:

− *If cu_act_enabled_flag[ xTbY ][ yTbY ]*
   *is equal to 1, the following applies:*
   *CuQpOffsetCb ) + QpBdOffset Cb    +*

− *Otherwise*

$qP=Qp'_{Cb}$      (1131)

Otherwise (cIdx is equal to 2), the following applies:

− *If cu_act_enabled_flag[ xTbY ][ yTbY ]*
   *is equal to 1, the following applies:*
   *qP = Clip3( −QpBdOffset, 63 ,*
    *qPCr − PpsActQpOffsetCr*
    *+CuQpOffsetCr ) + QpBdOffset*

*Otherwise*

$qP=Qp'_{Cr}$      (1132)

The quantization parameter qP is modified and the variables rectNonTsFlag and bdShift are derived as follows:

If transform_skip_flag[xTbY][yTbY][cIdx] is equal to 0, the following applies:

$$qP=qP-(cu\_act\_enabled\_flag[xTbY][yTbY]?5:0) \quad (1133)$$

$$rectNonTsFlag=(((Log\ 2(nTbW)+Log\ 2(nTbH))\&1)==1)?1:0 \quad (1134)$$

$$bdShift=BitDepth+rectNonTsFlag+((Log\ 2(nTbW)+Log\ 2(nTbH))/2)-5+pic\_dep\_quant\_enabled\_flag \quad (1135)$$

Otherwise (transform_skip_flag[xTbY][yTbY][cIdx] is equal to 1), the following applies:

$$qP=Max(QpPrimeTs\ Min,qP)-(cu\_act\_enabled\_flag[xTbY][yTbY]?5:0) \quad (1136)$$

$$\textbf{\textit{qP = Max( QpPrimeTsMin, qP )}}$$

$$rectNonTsFlag=0 \quad (1137)$$

$$bdShift=10 \quad (1138)$$

The variable bdOffset is derived as follows:

$$bdOffset=(1<<bdShift)>>1 \quad (1139)$$

The list levelScale[ ][ ] is specified as levelScale[j][k]={{40, 45, 51, 57, 64, 72}, {57, 64, 72, 80, 90, 102}} with j=0 . . . 1, k=0 . . . 5.

. . . .

5.11. Embodiment #11

Syntax Change in PPS:

| | |
|---|---|
| act enabled flag | u(1) |
| if( act_enabled_flag ) { | |
|     *pps_slice_act_qp_offset_present_flag* | u(1) |
|     *pps_act_y_qp_offset* | se(v) |
|     *pps_act_cb_qp_offset* | se(v) |
|     *pps_act_cr_qp_offset* | se(v) |
|     *joint_cbcr_enabled_flag* | u(1) |
|     if( pps_joint_cbcr_qp_offset_present_flag && joint_cbcr_ enabled_flag) | |
|         *pps_act_cbcr_qp_offset* | se(v) |
| } | |

Syntax Change in Slice Header:

| | |
|---|---|
| if(pps_slice_act_qp_offset_present_flag && !( slicetype == I && qtbtt_dual_tree_intra_flag) ) { | |
|     *slice_act_y_qp_offset* | se(v) |
|     *slice_act_cb_qp_offset* | se(v) |
|     *slice_act_cr_qp_offset* | se(v) |
|     if( pps_joint_cbcr_qp_offset_present_flag && sps_joint_cbcr_enabled_flag) | |
|         *slice_act_cbcr_qp_offset* | se(v) |
| } | | pps_act_y_qp_offset, pps_act_cb_qp_offset, pps_act_cr_qp_offset and pps_act_cbcr_qp_offset specify the offsets to quantization parameter Qp'Y, Qp'Cb, Qp'Cr and Qp'CbCr, respectively, when cu_act_enabled_flag is 1. The values of pps_act_y_qp_offset, pps_act_cb_qp_offset and pps_act_cr_qp_offset may be in the range of −12 to +12, inclusive. When not present, the values of pps_act_y_qp_offset, pps_act_cb_qp_offset and pps_act_cr_qp_offset are inferred to be equal to 0.

pps_slice_act_qp_offsets_present_flag equal to 1 specifies that slice_act_y_qp_offset, slice_act_cb_qp_offset, slice_act_cr_qp_offset, slice_act_cbcr_qp_offset are present in the slice header. pps_slice_act_qp_offsets_present_flag equal to 0 specifies that slice_act_y_qp_offset, slice_act_cb_qp_offset, slice_act_cr_qp_offset, slice_act_cbcr_qp_offset are not present in the slice header. When not present, the value of pps_slice_act_qp_offset-s_present_flag is inferred to be equal to 0.

slice_act_y_qp_offset, slice_act_cb_qp_offset, slice_act_cr_qp_offset and slice_act_cbcr_qp_offset specify the offsets when determining the value of the Qp'Y, Qp'Cb, Qp'Cr and Qp'CbCr quantization parameter. The values of slice_act_y_qp_offset, slice_act_cb_qp_offset, slice_act_cr_qp_offset and slice_act_cbcr_qp_offset may be in the range of −12 to +12, inclusive. When not present, the values are inferred to be equal to 0.

8.7.1 Derivation Process for Quantization Parameters

. . .

The variable $Qp_Y$ is derived as follows:

$$Qp_Y=((qP_{Y\_PRED}+CuQpDeltaVal+\underline{\textbf{\textit{( cu\_act\_enabled\_flag[ xTbY ][ yTbY ] ) ?}}}$$
$$\underline{\textbf{\textit{(pps\_act\_y\_qp\_offset}}}+$$
$$\underline{\textbf{\textit{slice\_act\_y\_qp\_offset)}}}+64+2*QpBd-$$
$$Offset)\ \%(64+QpBdOffset))-QpBdOffset \quad (1116)$$

The luma quantization parameter Qp'$_Y$ is derived as follows:

$$Qp'_Y=Qp_Y+QpBdOffset \quad (1117)$$

When ChromaArrayType is not equal to 0 and treeType is equal to SINGLE_TREE or DUAL_TREE_CHROMA, the following applies:

When treeType is equal to DUAL_TREE_CHROMA, the variable $Qp_Y$ is set equal to the luma quantization parameter $Qp_Y$ of the luma coding unit that covers the luma location (xCb+cbWidth/2, yCb+cbHeight/2).

The variables qP$_{Cb}$, qP$_{Cr}$ and qP$_{CbCr}$ are derived as follows:

$$qP_{Chroma}=Clip3(-QpBdOffset,63,Qp_Y) \quad (1118)$$

$$qP_{Cb}=ChromaQpTable[0][qP_{Chroma}] \quad (1119)$$

$$qP_{Cr}=ChromaQpTable[1][qP_{Chroma}] \quad (1120)$$

$$qP_{CbCr}=ChromaQpTable[2][qP_{Chroma}] \quad (1121)$$

The chroma quantization parameters for the Cb and Cr components, Qp'$_{Cb}$ and Qp'$_{Cr}$, and joint Cb-Cr coding Qp'$_{CbCr}$ are derived as follows:

$$Qp'_{Cb}=Clip3(-QpBdOffset,63,qP_{Cb}+pps\_cb\_qp\_offset+slice\_cb\_qp\_offset+\underline{\textbf{\textit{( cu\_act\_enabled\_flag[ xTbY ][ yTbY ] ) ?}}}$$
$$\underline{\textbf{\textit{pps\_act\_cb\_qp\_offset}}}+$$
$$\underline{\textbf{\textit{slice\_act\_cb\_qp\_offset}}})+QpBdOffset \quad (1122)$$

$$Qp'_{Cr}=Clip3(-QpBdOffset,63,qP_{Cr}+pps\_cr\_qp\_offset+slice\_cr\_qp\_offset+\underline{\textbf{\textit{( cu\_act\_enabled\_flag[ xTbY ][ yTbY ] ) ?}}}$$
$$\underline{\textbf{\textit{pps\_act\_cr\_qp\_offset}}}+$$
$$\underline{\textbf{\textit{slice\_act\_cr\_qp\_offset}}}+QpBdOffset \quad (1123)$$

$$Qp'_{CbCr}=Clip3(-QpBdOffset,63,qP_{CbCr}+pps\_joint\_cbcr\_qp\_offset+slice\_joint\_cbcr\_qp\_offset+\underline{\textbf{\textit{( cu\_act\_enabled\_flag[ xTbY][ yTbY ] )}}}\quad ?$$

*pps_act_cbcr_qp_offset*+

*slice_act_cbcr_qp_offset* +*Cu*QpOff-
set*$_{CbCr}$*)+Qp*Bd*Offset       (1124)

8.7.3 Scaling Process for Transform Coefficients

. . .

*The variable QpActOffset is set equal to 5* .

The quantization parameter qP is derived as follows:

If cIdx is equal to 0, the following applies:

qP=Qp'$_Y$             (1129)

Otherwise, if TuCResMode[xTbY][yTbY] is equal to 2, the following applies:

qP=Qp'$_{CbCr}$          (1130)

Otherwise, if cIdx is equal to 1, the following applies:

qP=Qp'$_{Cb}$           (1131)

Otherwise (cIdx is equal to 2), the following applies:

qP=Qp'$_{Cr}$           (1132)

*QpActOffset = 3*

The quantization parameter qP is modified and the variables rectNonTsFlag and bdShift are derived as follows:

If transform_skip_flag[xTbY][yTbY][cIdx] is equal to 0, the following applies:

qP=*Clip3(0, 63+ QpBdOffset* ,qP–
(*cu*_act_enabled_flag[*xTbY*][*yTbY*]?

*QpActOffset* 5:0)*)*      (1133)

rectNon*Ts*Flag=(((Log 2(*nTbW*)+Log 2(*nTbH*))&1)
==1)?1:0          (1134)

*bd*Shift=BitDepth+rectNon*Ts*Flag+((Log 2(*nTbW*)+
Log 2(*nTbH*))/2)–5+pic_dep_quant_enabled-
_flag           (1135)

Otherwise (transform_skip_flag[xTbY][yTbY][cIdx] is equal to 1), the following applies:

qP=Max(QpPrime*Ts* Min,qP)–(*cu*_act_enabled_flag
[*xTbY*][*yTbY*]?5:0)      (1136)

*qP = Clip3( QpPrimeTsMin ,*

*63+*
*QpBdOffset, qP– (cu_act_enabled*
*flag[ xTbY ][ yTbY ] ?*
*QpActOffset : 0 ) )*     (1136)

Figure 7:
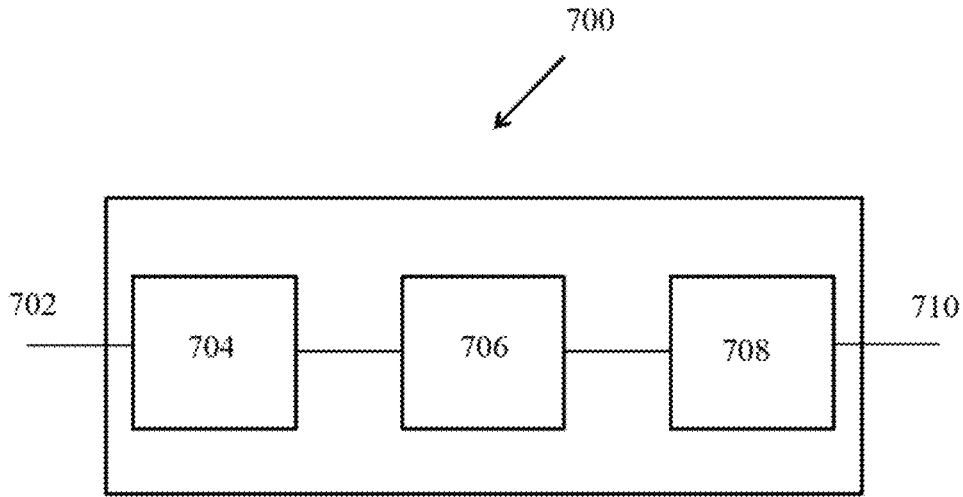
FIG. 7 is a block diagram showing an example video processing system according to various embodiments of the disclosure.

FIG. 7 is a block diagram showing an example video processing system 700 in which various techniques disclosed herein may be implemented. Various implementations may include some or all of the components of the system 700. The system 700 may include input 702 for receiving video content. The video content may be received in a raw or uncompressed format, e.g., 8 or 10 bit multi-component pixel values, or may be in a compressed or encoded format. The input 702 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 700 may include a coding component 704 that may implement the various coding or encoding methods described in the present document. The coding component 704 may reduce the average bitrate of video from the input 702 to the output of the coding component 704 to produce a coded representation of the video. The coding techniques are therefore sometimes called video compression or video transcoding techniques. The output of the coding component 704 may be either stored, or transmitted via a communication connected, as represented by the component 706. The stored or communicated bitstream (or coded) representation of the video received at the input 702 may be used by the component 708 for generating pixel values or displayable video that is sent to a display interface 710. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include serial advanced technology attachment (SATA), peripheral component interconnect (PCI), integrated drive electronics (IDE) interface, and the like. The techniques described in the present document may be embodied in various electronic devices such as mobile phones, laptops, smartphones or other devices that are capable of performing digital data processing and/or video display.

Figure 8:
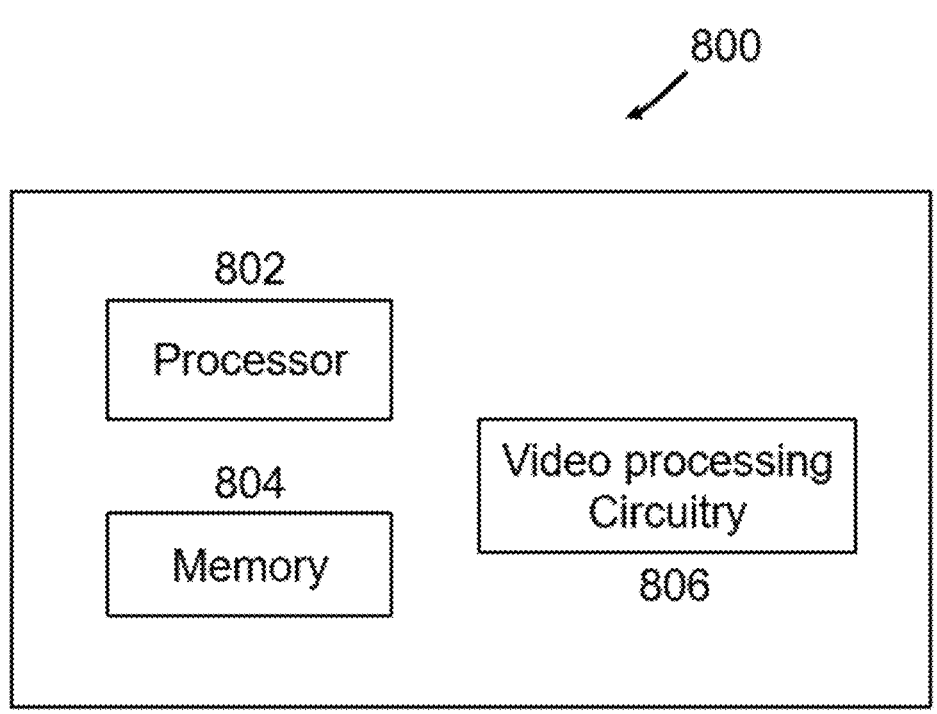
FIG. 8 is a block diagram of an example hardware platform used for video processing.

FIG. 8 is a block diagram of a video processing apparatus 800. The apparatus 800 may be used to implement one or more of the methods described herein. The apparatus 800 may be embodied in a smartphone, tablet, computer, Internet of Things (IoT) receiver, and so on. The apparatus 800 may include one or more processors 802, one or more memories 804 and video processing hardware/circuitry 806. The processor(s) 802 may be configured to implement one or more methods described in the present document (e.g., in FIGS. 5A and 5B). The memory (memories) 804 may be used for storing data and code used for implementing the methods and techniques described herein. The video processing hardware 806 may be used to implement, in hardware circuitry, some techniques described in the present document. In some embodiments, the hardware 806 may be partly or entirely in the processors 802, e.g., a graphics processor.

Figure 9:
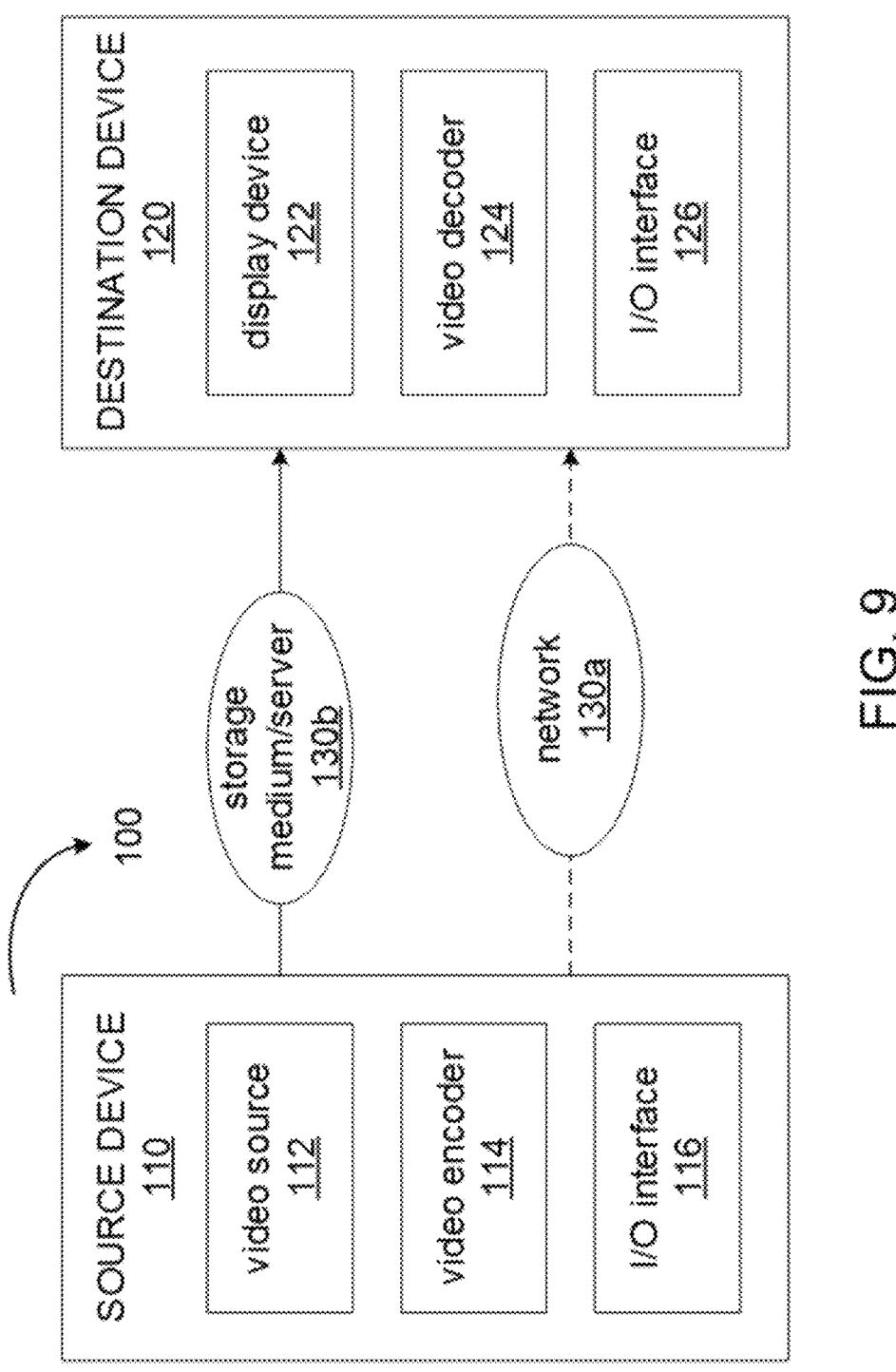
FIG. 9 is a block diagram that illustrates a video coding system according to various embodiments of the disclosure.

FIG. 9 is a block diagram that illustrates an example video coding system 100 that may utilize the techniques of this disclosure. As shown in FIG. 9, video coding system 100 may include a source device 110 and a destination device 120. Source device 110 generates encoded video data which may be referred to as a video encoding device. Destination device 120 may decode the encoded video data generated by source device 110 which may be referred to as a video decoding device. Source device 110 may include a video source 112, a video encoder 114, and an input/output (I/O) interface 116.

Video source 112 may include a source such as a video capture device, an interface to receive video data from a video content provider, and/or a computer graphics system for generating video data, or a combination of such sources. The video data may comprise one or more pictures. Video encoder 114 encodes the video data from video source 112 to generate a bitstream. The bitstream may include a sequence of bits that form a coded representation of the video data. The bitstream may include coded pictures and associated data. The coded picture is a coded representation of a picture. The associated data may include sequence parameter sets, picture parameter sets, and other syntax structures. I/O interface 116 may include a modulator/demodulator (modem) and/or a transmitter. The encoded video data may be transmitted directly to destination device 120 via I/O interface 116 through network 130a. The encoded video data may also be stored onto a storage medium/server 130b for access by destination device 120.

Destination device 120 may include an I/O interface 126, a video decoder 124, and a display device 122.

I/O interface 126 may include a receiver and/or a modem. I/O interface 126 may acquire encoded video data from the source device 110 or the storage medium/server 130b. Video decoder 124 may decode the encoded video data. Display device 122 may display the decoded video data to a user. Display device 122 may be integrated with the destination device 120, or may be external to destination device 120 which be configured to interface with an external display device.

Video encoder 114 and video decoder 124 may operate according to a video compression standard, such as the High Efficiency Video Coding (HEVC) standard, Versatile Video Coding (VVM) standard and other current and/or further standards.

Figure 10:
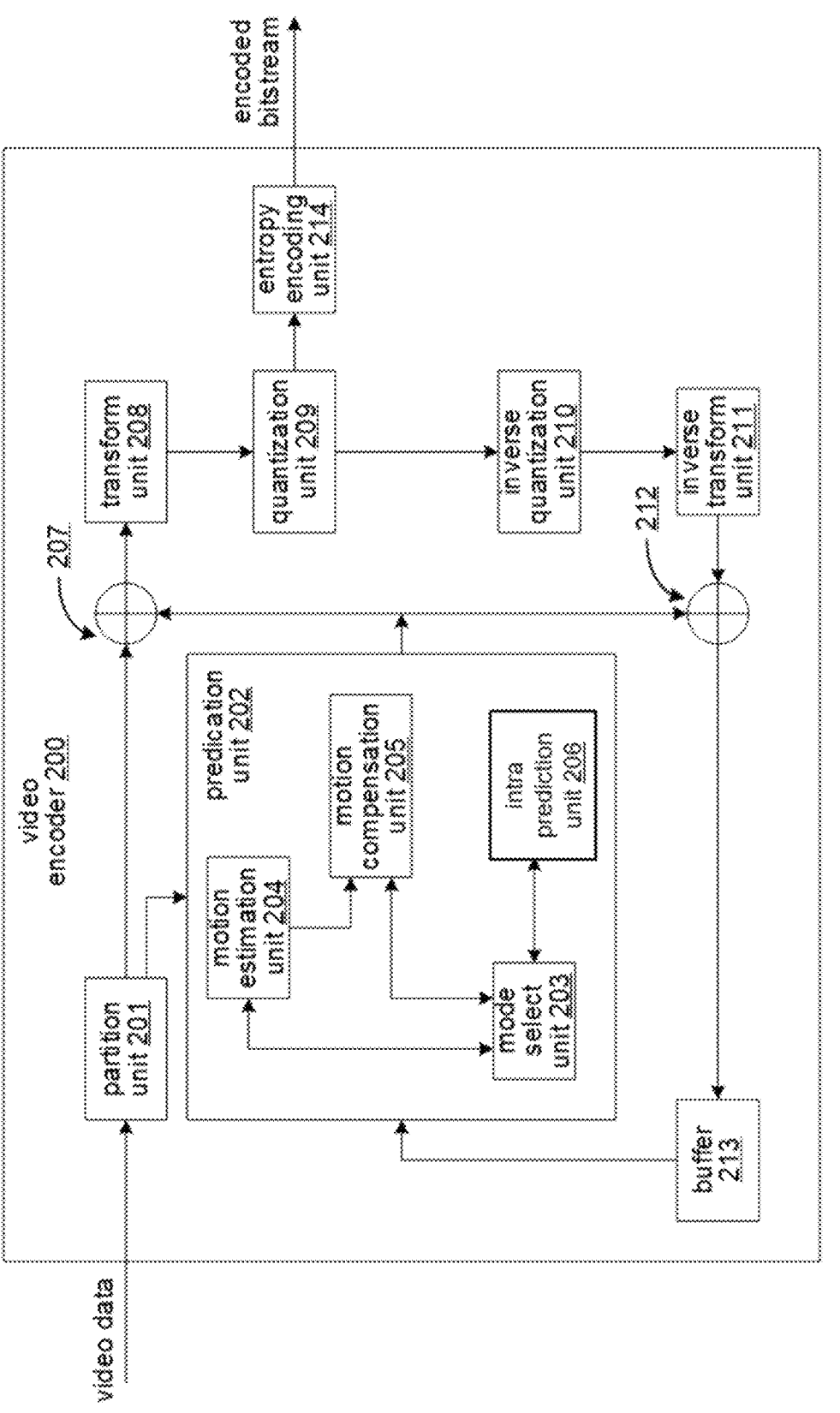
FIG. 10 is a block diagram that illustrates an encoder according to various embodiments of the disclosure.

FIG. 10 is a block diagram illustrating an example of video encoder 200, which may be video encoder 114 in the system 100 illustrated in FIG. 9.

Video encoder 200 may be configured to perform any or all of the techniques of this disclosure. In the example of FIG. 10, video encoder 200 includes a plurality of functional components. The techniques described in this disclosure may be shared among the various components of video encoder 200. In some examples, a processor may be configured to perform any or all of the techniques described in this disclosure.

The functional components of video encoder 200 may include a partition unit 201, a predication unit 202 which may include a mode select unit 203, a motion estimation unit 204, a motion compensation unit 205, an intra prediction unit 206, a residual generation unit 207, a transform unit 208, a quantization unit 209, an inverse quantization unit 210, an inverse transform unit 211, a reconstruction unit 212, a buffer 213, and an entropy encoding unit 214.

In other examples, video encoder 200 may include more, fewer, or different functional components. In an example, predication unit 202 may include an intra block copy (IBC) unit. The IBC unit may perform predication in an IBC mode in which at least one reference picture is a picture where the current video block is located.

Furthermore, some components, such as motion estimation unit 204 and motion compensation unit 205 may be highly integrated, but are represented in the example of FIG. 10 separately for purposes of explanation.

Partition unit 201 may partition a picture into one or more video blocks. Video encoder 200 and video decoder 300 may support various video block sizes.

Mode select unit 203 may select one of the coding modes, intra or inter, e.g., based on error results, and provide the resulting intra- or inter-coded block to a residual generation unit 207 to generate residual block data and to a reconstruction unit 212 to reconstruct the encoded block for use as a reference picture. In some example, Mode select unit 203 may select a combination of intra and inter predication (CIIP) mode in which the predication is based on an inter predication signal and an intra predication signal. Mode select unit 203 may also select a resolution for a motion vector (e.g., a sub-pixel or integer pixel precision) for the block in the case of inter-predication.

To perform inter prediction on a current video block, motion estimation unit 204 may generate motion information for the current video block by comparing one or more reference frames from buffer 213 to the current video block.

Motion compensation unit 205 may determine a predicted video block for the current video block based on the motion information and decoded samples of pictures from buffer 213 other than the picture associated with the current video block.

Motion estimation unit 204 and motion compensation unit 205 may perform different operations for a current video block, for example, depending on whether the current video block is in an I slice, a P slice, or a B slice.

In some examples, motion estimation unit 204 may perform uni-directional prediction for the current video block, and motion estimation unit 204 may search reference pictures of list 0 or list 1 for a reference video block for the current video block. Motion estimation unit 204 may then generate a reference index that indicates the reference picture in list 0 or list 1 that contains the reference video block and a motion vector that indicates a spatial displacement between the current video block and the reference video block. Motion estimation unit 204 may output the reference index, a prediction direction indicator, and the motion vector as the motion information of the current video block. Motion compensation unit 205 may generate the predicted video block of the current block based on the reference video block indicated by the motion information of the current video block.

In other examples, motion estimation unit 204 may perform bi-directional prediction for the current video block, motion estimation unit 204 may search the reference pictures in list 0 for a reference video block for the current video block and may also search the reference pictures in list 1 for another reference video block for the current video block. Motion estimation unit 204 may then generate reference indexes that indicate the reference pictures in list 0 and list 1 containing the reference video blocks and motion vectors that indicate spatial displacements between the reference video blocks and the current video block. Motion estimation unit 204 may output the reference indexes and the motion vectors of the current video block as the motion information of the current video block. Motion compensation unit 205 may generate the predicted video block of the current video block based on the reference video blocks indicated by the motion information of the current video block.

In some examples, motion estimation unit 204 may output a full set of motion information for decoding processing of a decoder.

In some examples, motion estimation unit 204 may not output a full set of motion information for the current video. Rather, motion estimation unit 204 may signal the motion information of the current video block with reference to the motion information of another video block. For example, motion estimation unit 204 may determine that the motion information of the current video block is sufficiently similar to the motion information of a neighboring video block.

In one example, motion estimation unit 204 may indicate, in a syntax structure associated with the current video block, a value that indicates to the video decoder 300 that the current video block has the same motion information as the other video block.

In another example, motion estimation unit 204 may identify, in a syntax structure associated with the current video block, another video block and a motion vector difference (MVD). The motion vector difference indicates a difference between the motion vector of the current video block and the motion vector of the indicated video block. The video decoder 300 may use the motion vector of the indicated video block and the motion vector difference to determine the motion vector of the current video block.

As discussed above, video encoder 200 may predictively signal the motion vector. Two examples of predictive signaling techniques that may be implemented by video encoder 200 include advanced motion vector predication (AMVP) and merge mode signaling.

Intra prediction unit 206 may perform intra prediction on the current video block. When intra prediction unit 206 performs intra prediction on the current video block, intra prediction unit 206 may generate prediction data for the current video block based on decoded samples of other video blocks in the same picture. The prediction data for the current video block may include a predicted video block and various syntax elements.

Residual generation unit 207 may generate residual data for the current video block by subtracting (e.g., indicated by the minus sign) the predicted video block(s) of the current video block from the current video block. The residual data of the current video block may include residual video blocks that correspond to different sample components of the samples in the current video block.

In other examples, there may be no residual data for the current video block for the current video block, for example in a skip mode, and residual generation unit 207 may not perform the subtracting operation.

Transform processing unit 208 may generate one or more transform coefficient video blocks for the current video block by applying one or more transforms to a residual video block associated with the current video block.

After transform processing unit 208 generates a transform coefficient video block associated with the current video block, quantization unit 209 may quantize the transform coefficient video block associated with the current video block based on one or more quantization parameter (QP) values associated with the current video block.

Inverse quantization unit 210 and inverse transform unit 211 may apply inverse quantization and inverse transforms to the transform coefficient video block, respectively, to reconstruct a residual video block from the transform coefficient video block. Reconstruction unit 212 may add the reconstructed residual video block to corresponding samples from one or more predicted video blocks generated by the predication unit 202 to produce a reconstructed video block associated with the current block for storage in the buffer 213.

After reconstruction unit 212 reconstructs the video block, loop filtering operation may be performed to reduce video blocking artifacts in the video block.

Entropy encoding unit 214 may receive data from other functional components of the video encoder 200. When entropy encoding unit 214 receives the data, entropy encoding unit 214 may perform one or more entropy encoding operations to generate entropy encoded data and output a bitstream that includes the entropy encoded data.

Figure 11:
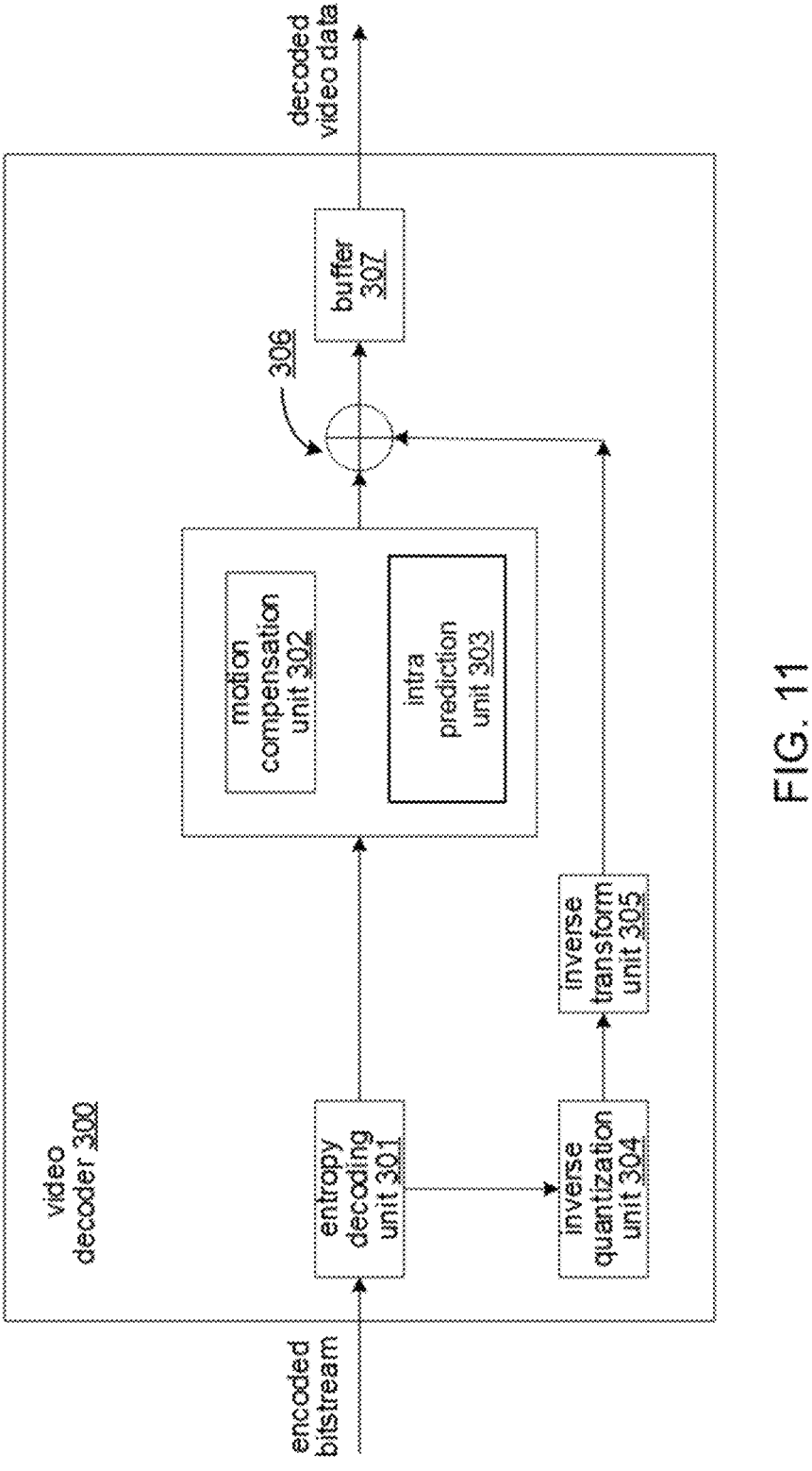
FIG. 11 is a block diagram that illustrates a decoder according to various embodiments of the disclosure.

FIG. 11 is a block diagram illustrating an example of video decoder 300 which may be video decoder 114 in the system 100 illustrated in FIG. 9.

The video decoder 300 may be configured to perform any or all of the techniques of this disclosure. In the example of FIG. 11, the video decoder 300 includes a plurality of functional components. The techniques described in this disclosure may be shared among the various components of the video decoder 300. In some examples, a processor may be configured to perform any or all of the techniques described in this disclosure.

In the example of FIG. 11, video decoder 300 includes an entropy decoding unit 301, a motion compensation unit 302, an intra prediction unit 303, an inverse quantization unit 304, an inverse transformation unit 305, and a reconstruction unit 306 and a buffer 307. Video decoder 300 may, in some examples, perform a decoding pass generally reciprocal to the encoding pass described with respect to video encoder 200 (FIG. 10).

Entropy decoding unit 301 may retrieve an encoded bitstream. The encoded bitstream may include entropy coded video data (e.g., encoded blocks of video data). Entropy decoding unit 301 may decode the entropy coded video data, and from the entropy decoded video data, motion compensation unit 302 may determine motion information including motion vectors, motion vector precision, reference picture list indexes, and other motion information. Motion compensation unit 302 may, for example, determine such information by performing the AMVP and merge mode.

Motion compensation unit 302 may produce motion compensated blocks, possibly performing interpolation based on interpolation filters. Identifiers for interpolation filters to be used with sub-pixel precision may be included in the syntax elements.

Motion compensation unit 302 may use interpolation filters as used by video encoder 200 during encoding of the video block to calculate interpolated values for sub-integer pixels of a reference block. Motion compensation unit 302 may determine the interpolation filters used by video encoder 200 according to received syntax information and use the interpolation filters to produce predictive blocks.

Motion compensation unit 302 may use some of the syntax information to determine sizes of blocks used to encode frame(s) and/or slice(s) of the encoded video sequence, partition information that describes how each macroblock of a picture of the encoded video sequence is partitioned, modes indicating how each partition is encoded, one or more reference frames (and reference frame lists) for each inter-encoded block, and other information to decode the encoded video sequence.

Intra prediction unit 303 may use intra prediction modes for example received in the bitstream to form a prediction block from spatially adjacent blocks. Inverse quantization unit 304 inverse quantizes, i.e., de-quantizes, the quantized video block coefficients provided in the bitstream and decoded by entropy decoding unit 301. Inverse transform unit 305 applies an inverse transform.

Reconstruction unit 306 may sum the residual blocks with the corresponding prediction blocks generated by motion compensation unit 302 or intra-prediction unit 303 to form decoded blocks. If desired, a deblocking filter may also be applied to filter the decoded blocks in order to remove blockiness artifacts. The decoded video blocks are then stored in buffer 307, which provides reference blocks for subsequent motion compensation/intra predication and also produces decoded video for presentation on a display device.

FIGS. 12-16 show example methods that can implement the technical solutions described above in, for example, the embodiments shown in FIGS. 7-11.

FIG. 12 shows a flowchart for an example method 1200 of video processing includes, at operation 1210, determining, for a current video block of a video coded using an adaptive color transform (ACT) mode, whether a joint coding of chroma residuals (JCCR) coding tool is enabled for the current video block.

The method 1200 includes, at operation 1220, performing, based on the determining, a conversion between the video and a bitstream of the video, the bitstream conforming to a rule that specifies that one or more quantization parameter (QP) offsets used for coding the current video block are signaled when the JCCR coding tool is enabled.

FIG. 13 shows a flowchart for an example method 1300 of video processing includes, at operation 1310, performing a conversion between a current video block of a video and a bitstream of the video, the bitstream conforming to a format rule that specifies that a manner by which a delta quantization parameter (QP) is derived or signaled based on a coding information of the current video block.

FIG. 14 shows a flowchart for an example method 1400 of video processing includes, at operation 1410, performing a conversion between a current video block of a video and a bitstream of the video, the bitstream conforms to a format rule that specifies that that one or more quantization parameter (QP) offsets used for coding the current video block are signaled in a picture parameter set (PPS) associated with the current video block independently of information signaled in a sequence parameter set (SPS) associated with the current video block.

FIG. 15 shows a flowchart for an example method 1500 of video processing includes, at operation 1510, performing a conversion between a current video block of a video and a bitstream of the video, the bitstream conforming to a format rule that specifies a video level at which to signal one or more quantization parameter (QP) offsets used for coding the current video block, and the video level being a first level or a second level that is lower than the first level.

FIG. 16 shows a flowchart for an example method 1600 of video processing includes, at operation 1610, performing a conversion between a current video block of a video and a bitstream of the video, the bitstream conforming to a format rule that specifies whether or how an overwriting mechanism is used for signaling a quantization parameter (QP) offset used for coding the current video block.

A listing of solutions preferred by some embodiments is provided next.

A1. A method of video processing, comprising determining, for a current video block of a video coded using an adaptive color transform (ACT) mode, whether a joint coding of chroma residuals (JCCR) coding tool is enabled for the current video block; and performing, based on the determining, a conversion between the video and a bitstream of the video, wherein the bitstream conforms to a rule, and wherein the rule specifies that one or more quantization parameter (QP) offsets used for coding the current video block are signaled when the JCCR coding tool is enabled.

A2. The method of solution A1, wherein the one or more QP offsets are signaled in a slice header (SH) when the JCCR coding tool is enabled.

A3. The method of solution A1, wherein the rule further specifies whether to signal a syntax element indicating whether the one or more QP offsets are present is based on the JCCR coding tool being enabled.

A4. The method of solution A3, wherein the syntax element is in a picture parameter set (PPS) or a slice header (SH).

A5. The method of solution A3 or A4, wherein the syntax element is pps_joint_cbcr_qp_offset_present_flag or slice_joint_cbcr_qp_offset_present_flag.

A6. A method of video processing, comprising performing a conversion between a current video block of a video and a bitstream of the video, wherein the bitstream conforms to a format rule, and wherein the format rule specifies that a manner by which a delta quantization parameter (QP) is derived or signaled based on a coding information of the current video block.

A7. The method of solution A6, wherein the coding information comprises a coding mode of the current video block or a previously coded neighboring block of the current video block.

A8. The method of solution A7, wherein the coding mode comprises an adaptive color transform (ACT) mode.

A9. The method of solution A6, wherein deriving and/or signaling the delta QP is further based on whether the current video block and a previously coded neighboring block of the current video block used to derive a QP predictor share the same coding information.

A10. The method of solution A6, wherein the coding information comprises a coding tool applied to the current video block, and wherein a derivation of a QP predictor is based on one or more video blocks to which the coding tool has been applied.

A11. A method of video processing, comprising performing a conversion between a current video block of a video and a bitstream of the video, wherein the bitstream conforms to a format rule, and wherein the format rule specifies that that one or more quantization parameter (QP) offsets used for coding the current video block are signaled in a picture parameter set (PPS) associated with the current video block independently of information signaled in a sequence parameter set (SPS) associated with the current video block.

A12. The method of solution A11, wherein a first indication of a color format of the video and/or a second indication of enabling a coding mode for the current video block are signaled in the PPS.

A13. A method of video processing, comprising performing a conversion between a current video block of a video and a bitstream of the video, wherein the bitstream conforms to a format rule, and wherein the format rule specifies a video level at which to signal one or more quantization parameter (QP) offsets used for coding the current video block, wherein the video level is a first level or a second level that is lower than the first level.

A14. The method of solution A13, wherein the first level is a picture level and a second level is a slice level.

A15. The method of solution A14, wherein the one or more QP offsets is signaled in the first level.

A16. The method of solution A14, wherein the one or more QP offsets are excluded from the first level due to the one or more QP offsets being signaled in the second level.

A17. The method any of solutions A11 to 16, wherein the one or more QP offsets are signaled in a picture header (PH) or a slice header (SH).

A18. The method of any of solutions A1 to A17, wherein the conversion comprises decoding the video from the bitstream.

A19. The method of any of solutions A1 to A17, wherein the conversion comprises encoding the video into the bitstream.

A20. The method of any of solutions A1 to A17, wherein the conversion comprises generating the bitstream from the current video block, and wherein the method further comprises storing the bitstream in a non-transitory computer-readable recording medium.

A21. A method of storing a bitstream representing a video to a computer-readable recording medium, comprising generating a bitstream from a video according to a method described in any one or more of solutions A1 to A17; and writing the bitstream to the computer-readable recording medium.

A22. A video processing apparatus comprising a processor configured to implement a method recited in any one or more of solutions A1 to A17.

A23. A computer readable medium that stores the bitstream generated according to a method recited in any one or more of solutions A1 to A17.

A24. A computer-readable medium having instructions stored thereon, the instructions, when executed, causing a processor to implement a method recited in one or more of solutions A1 to A23.

A25. A video processing apparatus for storing a bitstream, wherein the video processing apparatus is configured to implement a method recited in any one or more of solutions A1 to A23.

Another listing of solutions preferred by some embodiments is provided next.

B1. A method of video processing, comprising performing a conversion between a current video block of a video and a bitstream of the video, wherein the bitstream conforms to a format rule, and wherein the format rule specifies whether or how an overwriting mechanism is used for signaling a quantization parameter (QP) offset used for coding the current video block.

B2. The method of solution B1, wherein a first value of the QP offset is signaled in a first level, and wherein the first value is overwritten by a second value of the QP offset signaled in a second level.

B3. The method of solution B2, wherein the first level is higher than the second level.

B4. The method of solution B2 or B3, wherein a difference between the first set of values and the second set of values is signaled in the second level.

B5. The method of solution B2 or B3, wherein a first syntax element indicating whether the QP offset is allowed to be overwritten is signaled in the first level or the second level.

B6. The method of solution B5, wherein the first syntax element being equal to one indicates that a QP delta information is signaled in a picture header (PH) and excluded from a slice header (SH) that refers to the first level.

B7. The method of solution B6, wherein a second syntax element indicates that the QP delta information in the PH is used to determine an initial value of a QP, and wherein the initial value of the QP is used for coding the current video block.

B8. The method of solution B5, wherein the first syntax element being equal to zero indicates that a QP delta information is excluded from a picture header (PH) and signaled in a slice header (SH) that refers to the first level.

B9. The method of solution B8, wherein a second syntax element indicates that the QP delta information in the SH is used to determine an initial value of a QP, and wherein the initial value of the QP is used for coding the current video block.

B10. The method of any of solutions B5 to B9, wherein the first syntax element is pps_qp_delta_info_in_ph_flag.

B11. The method of any of solutions B2 to B10, wherein the first level comprises a picture parameter set (PPS).

B12. The method of any of solutions B2 to B10, wherein the second level comprises a picture header (PH) or a slice header (SH).

B13. The method of solution B1, wherein a first value of the QP offset is excluded from a first level due to a second value of the QP offset, which is configured to overwrite the first value, is signaled in a second level.

B14. The method of any of solutions B1 to B13, wherein the conversion comprises decoding the video from the bitstream.

B15. The method of any of solutions B1 to B13, wherein the conversion comprises encoding the video into the bitstream.

B16. The method of any of solutions B1 to B13, wherein the conversion comprises generating the bitstream from the current video block, and wherein the method further comprises storing the bitstream in a non-transitory computer-readable recording medium.

B17. A method of storing a bitstream representing a video to a computer-readable recording medium, comprising generating a bitstream from a video according to a method described in any one or more of solutions B1 to B13; and writing the bitstream to the computer-readable recording medium.

B18. A video processing apparatus comprising a processor configured to implement a method recited in any one or more of solutions B1 to B13.

B19. A computer readable medium that stores the bitstream generated according to any one or more of solutions B1 to B13.

B20. A computer-readable medium having instructions stored thereon, the instructions, when executed, causing a processor to implement a method recited in one or more of solutions B1 to B19.

B21. A video processing apparatus for storing a bitstream, wherein the video processing apparatus is configured to implement a method recited in any of solutions B1 to B19.

Yet another listing of solutions preferred by some embodiments is provided next.

P1. A method of video processing, comprising performing a determination whether to enable a chroma block-based delta pulse code modulation (BDPCM) mode for a video block of a video based on whether a usage of an adaptive color transform (ACT) mode and/or a luma BDPCM mode for the video block is enabled; and performing a conversion between the video block and a bitstream representation of the video according to the determinization.

P2. The method of solution P1, wherein a signaling for a first value for a first flag associated with enabling the chroma BDPCM mode is determined based on a signaling of the ACT mode being enabled for the video block and a signaling of a second value for a second flag associated with the usage of the luma BDPCM mode.

P3. The method of solution P2, wherein the first value for the first flag has a false value in response to the ACT mode being enabled and the second value for the second flag having a false value.

P4. The method of solution P2, wherein the first value for the first flag has a true value in response to the second value for the second flag having a true value.

P5. The method of solution P1, wherein a signaling of the ACT mode for the video block is conditionally based on a same BDPCM prediction direction being used for luma samples and chroma samples of the video block.

P6. The method of solution P5, wherein the signaling of the ACT mode is indicated after a signaling of the chroma BDPCM mode and the luma BDPCM mode.

P7. The method of solution P1, wherein in response to the usage of the ACT mode being enabled, a first value indicative of a first prediction direction of the chroma BDPCM mode is derived from a second value indicative of a second prediction direction of the luma BDPCM mode.

P8. The method of solution P7, wherein the first value indicative of the first prediction direction of the chroma BDPCM mode is same as the second value indicative of the second prediction direction of the luma BDPCM mode.

P9. The method of solution P8, wherein the first prediction direction of the chroma BDPCM mode and the second prediction direction of the luma BDPCM mode are in a horizontal direction.

P10. The method of solution P8, wherein the first prediction direction of the chroma BDPCM mode and the second prediction direction of the luma BDPCM mode are in a vertical direction.

P11. The method of solution P1, wherein in response to the usage of the ACT mode being disabled, a first value indicative of a first prediction direction of the chroma BDPCM mode is zero.

P12. A method of video processing, comprising performing a determination whether to enable a block-based delta pulse code modulation (BDPCM) mode for a video block of a video based on whether a usage of an adaptive color transform (ACT) mode for the video block is enabled; and performing a conversion between the video block and a bitstream representation of the video according to the determination.

P13. The method of solution P12, wherein the BDPCM mode is disabled for the video block in response to the ACT mode being enabled for the video block.

P14. The method of solution P13, wherein a first flag indicative of the BDPCM mode is signaled after a second flag indicative of the ACT mode.

P15. The method of solution P13, wherein a flag indicative of the BDPCM mode is not signaled, wherein the flag is determined to be a false value or zero.

P16. The method of solution P12, wherein the ACT mode is disabled for the video block in response to the BDPCM mode being enabled for the video block.

P17. The method of solution P16, wherein a first flag indicative of the BDPCM mode is signaled before a second flag indicative of the ACT mode.

P18. The method of solution P16, wherein a flag indicative of the ACT mode is not signaled, wherein the flag is determined to be a false value or zero.

P19. The method of any of solutions P12 to P18, wherein the BDPCM mode includes a luma BDPCM mode and/or a chroma BDPCM mode.

P20. The method of solution P1, wherein the ACT mode is applied when the chroma BDPCM mode and the luma BDPCM mode are associated with different prediction modes.

P21. The method of solution P20, wherein a forward ACT mode is applied after the chroma BDPCM mode or the luma BDPCM mode.

P22. The method of any of solution P1 to P21, wherein a quantization parameter (QP) for the video block is clipped in response to the ACT mode being enabled.

P23. The method of solution P22, wherein a clipping function for clipping the QP is defined as (l, h, x), where l is a lowest possible value of an input x and h is a highest possible value of an input x.

P24. The method of solution P23, wherein l is equal to zero.

P25. The method of solution P23, wherein h is equal to 63.

P26. The method of solution P22, wherein the QP for the video block is clipped after the QP is adjusted for the ACT mode.

P27. The method of solution P23, wherein in response to a transform skip being applied to the video block, l is equal to a minimal allowed QP for a transform skip mode.

P28. The method of any of solution P23 to P26, wherein l, h, m, n and/or k are integer numbers that depend on (i) a message signaled in the DPS/SPS/VPS/PPS/APS/picture header/slice header/tile group header/Largest coding unit (LCU)/Coding unit (CU)/LCU row/group of LCUs/TU/PU block/Video coding unit, (ii) a position of CU/PU/TU/block/Video coding unit, (iii) coded modes of blocks containing the samples along the edges, (iv) transform matrices applied to the blocks containing the samples along the edges, (v) block dimension/Block shape of current block and/or its neighboring blocks, (vi) indication of the colour format (such as 4:2:0, 4:4:4, RGB or YUV), (vii) a coding tree structure (such as dual tree or single tree), (viii) a slice/tile group type and/or picture type, (ix) a colour component (e.g. may be only applied on Cb or Cr), (x) a temporal layer ID, or (xi) profiles/Levels/Tiers of a standard.

P29. The method of any of solution P23 to P26, wherein l, h, m, n and/or k are signaled to a decoder.

P30. The method of any of solution P30, wherein a color format is 4:2:0 or 4:2:2.

P31. The method of any of solutions P1 to P30, wherein an indication for the ACT mode or the BDPCM mode or the chroma BDPCM mode or the luma BDPCM mode is signaled in a sequence, a picture, a slice, a tile, a brick, or a video region-level.

P32. A method of video processing, comprising determining that a joint coding of chroma residuals (JCCR) tool is used on a video block of a video for which an adaptive color transform (ACT) mode is enabled; and performing, based on the determining, a conversion between the video block and a bitstream representation of the video, wherein a quantization parameter (QP) of the ACT mode is based on a mode of the JCCR tool.

P33. The method of solution P32, wherein the QP is −5 or −6 upon a determination that the mode of the JCCR tool is 1.

P34. The method of solution P32, wherein the QP is −4 or −5 upon a determination that the mode of the JCCR tool is 3.

P35. The method of any of solutions P1 to P34, wherein the conversion comprises parsing and decoding the coded representation to generate video pixels.

P36. The method of any of solutions P1 to P34, wherein the conversion comprises generating the coded representation by encoding the video.

P37. A video decoding apparatus comprising a processor configured to implement a method recited in one or more of solutions P1 to P36.

P38. A video encoding apparatus comprising a processor configured to implement a method recited in one or more of solutions P1 to P36.

P39. A computer program product having computer code stored thereon, the code, when executed by a processor, causes the processor to implement a method recited in any of solutions P1 to P36.

In the present document, the term "video processing" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory (EPROM), electrically EPROM (EEPROM), and flash memory devices; magnetic disks, e.g., internal hard disks or removable disks; magneto optical disks; and compact disc read-only memory (CD ROM) and digital versatile disc read-only memory (DVD-ROM) disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments. Only a few implementations and examples are described and other implementations, enhancements and variations can be made based on what is described and illustrated in this patent document.

What is claimed is:

1. A method of processing video data, comprising:
performing a conversion between a first video block of a video and a bitstream of the video,
wherein the bitstream conforms to a rule, and
wherein the rule specifies that one or more quantization parameter (QP) offsets used for coding the first video block are signaled at a first level or a second level that is lower than the first level;
wherein the method further comprises:
determining, for a second video block of the video, whether a joint coding of chroma residuals (JCCR) coding tool is enabled for the second video block;
wherein performing the conversion is further based on the determining whether the JCCR coding tool is enabled for the second video block, and
wherein the rule further specifies that one or more quantization parameter (QP) offsets for a joint chroma component are signaled in a slice header (SH) when the JCCR coding tool is enabled.

2. The method of claim 1, wherein the first level is a picture level and the second level is a slice level.

3. The method of claim 2, wherein the one or more QP offsets are signaled in the first level when a first syntax element is included in the bitstream with a value indicating that the one or more QP offsets are signaled in the first level.

4. The method of claim 3, wherein the one or more QP offsets are excluded from the first level and signaled in the second level when the value of the first syntax element indicates that the one or more QP offsets are signaled in the second level or when the first syntax element is not present in the bitstream.

5. The method of claim 4, wherein the first syntax element is included in a picture parameter set (PPS) when the first syntax element is included in the bitstream.

6. The method of claim 2, wherein the one or more QP offsets are signaled in a picture header (PH) or a slice header (SH).

7. The method of claim 1, wherein the rule further specifies a second syntax element indicating whether the one or more QP offsets for the joint chroma component are present in a picture parameter set (PPS).

8. The method of claim 7, wherein the second syntax element is pps_joint_cbcr_qp_offset_present_flag.

9. The method of claim 1, wherein the conversion comprises decoding the video from the bitstream.

10. The method of claim 1, wherein the conversion comprises encoding the video into the bitstream.

11. An apparatus for processing video data comprising a processor and a non-transitory memory with instructions thereon, wherein the instructions upon execution by the processor, cause the processor to:
    perform a conversion between a first video block of a video and a bitstream of the video,
    wherein the bitstream conforms to a rule, and
    wherein the rule specifies that one or more quantization parameter (QP) offsets used for coding the first video block are signaled at a first level or a second level that is lower than the first level;
    wherein the processor is further caused to:
    determine, for a second video block of the video, whether a joint coding of chroma residuals (JCCR) coding tool is enabled for the second video block;
    wherein the conversion is performed further based on the determining whether the JCCR coding tool is enabled for the second video block, and
    wherein the rule further specifies that one or more quantization parameter (QP) offsets for a joint chroma component are signaled in a slice header (SH) when the JCCR coding tool is enabled.

12. The apparatus of claim 11, wherein the first level is a picture level and the second level is a slice level,
    wherein the one or more QP offsets are signaled in the first level when a first syntax element is included in the bitstream with a value indicating that the one or more QP offsets are signaled in the first level,
    wherein the one or more QP offsets are excluded from the first level and signaled in the second level when the value of the first syntax element indicates that the one or more QP offsets are signaled in the second level or when the first syntax element is not present in the bitstream,
    wherein the first syntax element is included in a picture parameter set (PPS) when the first syntax element is included in the bitstream, and
    wherein the one or more QP offsets are signaled in a picture header (PH) or a slice header (SH).

13. The apparatus of claim 11,
    wherein the rule further specifies a second syntax element indicating whether the one or more QP offsets for the joint chroma component are present in a picture parameter set (PPS), and
    wherein the second syntax element is pps_joint_cbcr_qp_offset_present_flag.

14. A non-transitory computer-readable storage medium storing instructions that cause a processor to:
    perform a conversion between a first video block of a video and a bitstream of the video,
    wherein the bitstream conforms to a rule, and
    wherein the rule specifies that one or more quantization parameter (QP) offsets used for coding the first video block are signaled at a first level or a second level that is lower than the first level;
    wherein the processor is further caused to:
    determine, for a second video block of the video, whether a joint coding of chroma residuals (JCCR) coding tool is enabled for the second video block;
    wherein the conversion is performed further based on the determining whether the JCCR coding tool is enabled for the second video, and
    wherein the rule further specifies that one or more quantization parameter (QP) offsets for a joint chroma component are signaled in a slice header (SH) when the JCCR coding tool is enabled.

15. The non-transitory computer-readable storage medium of claim 14, wherein the first level is a picture level and the second level is a slice level,
    wherein the one or more QP offsets are signaled in the first level when a first syntax element is included in the bitstream with a value indicating that the one or more QP offsets are signaled in the first level,
    wherein the one or more QP offsets are excluded from the first level and signaled in the second level when the value of the first syntax element indicates that the one or more QP offsets are signaled in the second level or when the first syntax element is not present in the bitstream,
    wherein the first syntax element is included in a picture parameter set (PPS) when the first syntax element is included in the bitstream, and
    wherein the one or more QP offsets are signaled in a picture header (PH) or a slice header (SH).

16. The non-transitory computer-readable storage medium of claim 14,
    wherein the rule further specifies a second syntax element indicating whether the one or more QP offsets for the joint chroma component are present in a picture parameter set (PPS), and
    wherein the second syntax element is pps_joint_cbcr_qp_offset_present_flag.

17. A non-transitory computer-readable recording medium storing a bitstream of a video which is generated by a method performed by a video processing apparatus, wherein the method comprises:
    generating the bitstream for a first video block of the video,
    wherein the bitstream conforms to a rule, and
    wherein the rule specifies that one or more quantization parameter (QP) offsets used for coding the first video block are signaled at a first level or a second level that is lower than the first level;
    wherein the method further comprises:
    determining, for a second video block of the video, whether a joint coding of chroma residuals (JCCR) coding tool is enabled for the second video block;
    wherein generating the bitstream is further based on the determining whether the JCCR coding tool is enabled for the second video block, and
    wherein the rule further specifies that one or more quantization parameter (QP) offsets for a joint chroma component are signaled in a slice header (SH) when the JCCR coding tool is enabled.

18. The non-transitory computer-readable recording medium of claim 17, wherein the first level is a picture level and the second level is a slice level, wherein the one or more QP offsets are signaled in the first level when a first syntax element is included in the bitstream with a value indicating that the one or more QP offsets are signaled in the first level, wherein the one or more QP offsets are excluded from the first level and signaled in the second level when the value of the first syntax element indicates that the one or more QP offsets are signaled in the second level or when the first syntax element is not present in the bitstream, wherein the first syntax element is included in a picture parameter set (PPS) when the first syntax element is included in the bitstream, and wherein the one or more QP offsets are signaled in a picture header (PH) or a slice header (SH), and wherein the rule further specifies a second syntax element indicating whether the one or more QP offsets for the joint chroma component are present in a picture parameter set (PPS), and wherein the second syntax element is pps_joint_cbcr_qp_offset_present_flag.

\* \* \* \* \*